United States Patent [19]

Davis et al.

[11] Patent Number: 4,821,202
[45] Date of Patent: * Apr. 11, 1989

[54] APPARATUS MICROPROCESSOR CONTROLLED WELDING

[75] Inventors: Clint A. Davis, League City; Melvin P. Trail, Houston, both of Tex.

[73] Assignee: Beckworth Davis International, Inc., Houston, Tex.

[*] Notice: The portion of the term of this patent subsequent to Dec. 24, 2002 has been disclaimed.

[21] Appl. No.: 879,318

[22] Filed: Jun. 27, 1986

Related U.S. Application Data

[63] Continuation of Ser. No. 817,258, Jan. 8, 1986, abandoned, which is a continuation of Ser. No. 762,696, Aug. 5, 1985, abandoned, which is a continuation of Ser. No. 469,519, Feb. 24, 1983, Pat. No. 4,561,059.

[51] Int. Cl.$^4$ .......................... G06F 15/46; B23K 9/10
[52] U.S. Cl. .................................... 364/477; 364/513; 219/124.02; 219/130.21; 901/42
[58] Field of Search ................................ 364/477, 513; 219/121 EA, 121 EM, 124.02, 124.03, 130.1, 130.21, 130.33, 130.5, 137 R, 137 PS; 901/42

[56] References Cited

U.S. PATENT DOCUMENTS

| | | | |
|---|---|---|---|
| 3,883,714 | 5/1975 | James | 219/131 WR |
| 4,024,371 | 5/1977 | Drake | 219/110 |
| 4,063,075 | 12/1977 | Cullom | 364/477 X |
| 4,071,885 | 1/1978 | Bilczo et al. | 219/130.33 X |
| 4,093,844 | 6/1978 | Fellure et al. | 219/124.02 |
| 4,104,724 | 8/1978 | Dix et al. | 364/477 |
| 4,109,130 | 8/1978 | Oku | 219/130.21 |
| 4,301,351 | 11/1981 | Mathews | 219/114 |
| 4,390,954 | 6/1983 | Manning | 364/477 |
| 4,442,339 | 4/1984 | Mizuno et al. | 219/130.33 |
| 4,445,022 | 4/1984 | Mori | 219/130.5 X |
| 4,448,342 | 5/1984 | Abe et al. | 364/477 X |
| 4,456,808 | 6/1984 | Wilkinson et al. | 364/477 X |
| 4,531,192 | 7/1985 | Cook | 364/513 |
| 4,561,059 | 12/1985 | Davis et al. | 364/477 |

Primary Examiner—Emanuel S. Kemeny
Attorney, Agent, or Firm—Arnold, White & Durkee

[57] ABSTRACT

A microprocessor-controlled arc welding power supply. A silicon controlled rectifier ("SCR") bank is used to generate a direct current arc welding current under program control. Positive synchronization is provided by the microprocessor using a phase locked loop and a polarity detector, so that the gating signals applied to the SCRs are correctly timed. Optimum tradeoffs between hardware and software are accomplished by using look up tables to store correction factors that can be quickly accessed during execution, and by using timers as smart interface chips to fire the SCRs at the same angle during each cycle until changed or updated by the microprocessor. The arc welding power supply is capable of operating in a constant current or constant voltage mode without rewiring the circuit.

29 Claims, 12 Drawing Sheets (ONE OF SIX IDENTICAL CIRCUITS)

APPARATUS MICROPROCESSOR CONTROLLED WELDING

This is a continuation of application Ser. No. 817,258, filed Jan. 8, 1986, now abandoned, which was a continuation of application Ser. No. 762,696, filed Aug. 5, 1985, now abandoned, which was a continuation of application Ser. No. 469,519, filed Feb. 24, 1983, now U.S. Pat. No. 4,561,059.

BACKGROUND OF THE INVENTION

This invention relates to arc welding power supplies, and, more specifically, to an improved apparatus providing a programmable arc welding power supply capable of operating in a constant current mode, constant voltage mode, constant power mode, or other welding modes without hardware reconfiguration, as well as providing great flexibility and capabilities not present in conventional systems.

In the past, it was not possible to use a single arc welding power supply to operate in a constant current mode and also a constant voltage mode without a hardware reconfiguration. A separate arc welding power supply would have to be used for each mode. Precise control of arc welding modes was not practical. The quality of a weld performed with an arc welding mode was dependent upon operator skill, and consistency of welds could be very difficult to obtain.

Some attempts have been made in the past to monitor a weld, sometimes in a crude fashion. For example, U.S. Pat. No. 4,093,844, issued to Fellure et al., represents an attempt to use an optical device to optically sense an arc, which is a crude way to monitor an arc welding procedure. Efforts to control arc length by optical scanning have been less than satisfactory. It is hardly possible to maintain a constant voltage during arc welding, or to maintain a constant current during arc welding, using nothing more than optical scanning to monitor the weld.

In the past, attempts have been made to tap the primary of the transformer used in a welding power supply. For example, U.S. Pat. No. 4,024,371, issued to Drake, represents an attempt to simply monitor a weld, and to measure the power factor on the primary of the transformer. The impedance of the weld is monitored. A computer is proposed to monitor the weld, compute statistical information concerning the weld, compute statistical information concerning the weld, and if the impedance value measured for the weld is outside certain user defined limits, the computer may indicate to an operator that the weld should be rejected. The Drake device is limited to use in connection with a pulse type welder. Drake proposes the use of a timing circuit and a clock circuit which generates pulses which are counted as a means for timing a period which is assumed to be sufficient for a particular welding procedure. The technique of counting pulses in a pulse welder or resistance welder is an unsatisfactory means for controlling power output in an arc welding device.

Others have attempted to use a microprocessor's cycle time or time for executing one instruction cycle for timing purposes, the microprocessor becoming little more than a digital timer. Such attempts have often involved the use of the microprocessor to count weld cycles. An example of such a device is proposed in U.S. Pat. No. 4,104,724, issued to Dix et al. It is unsatisfactory to have to program a welding procedure in terms of number of weld cycles, because the number of weld cycles necessary may vary for a given weld, must be determined empirically, and such control techniques are totally generally inapplicable to arc welding modes. The Dix device is a spot welder, using a single phase alternating current power supply. Such control techniques are not applicable to three-phase direct current arc welding power supplies. In Dix, significantly, the illustrative microprocessor is not inside a feedback loop, but is generally used as a sophisticated timer.

There is a need for a programmable arc welding power supply, capable of controlling three phase direct current arc welding power supplies. There is need for a programmable controller which senses current, voltage, or both, directly (instead of attempting to measure the impedance of a weld), and which is capable of adjusting the circuit parameters in a manner which causes the current, or voltage, or both, to conform to program control. There is a need for a programmable control system which directly measures current, voltage, or both and computes the first derivative of the welding current or voltage function and uses that computation as an indication of the rate of change of the welding current or voltage, which may then be used for positive control of the current or voltage, or both.

In the past, it has been necessary to completely rewire a device if it was necessary to switch from, for example, a constant voltage mode to a constant current mode. There is a need for a programmable arc welding power supply that is capable of operating in a constant voltage mode, a constant current mode, or even a constant power mode, without requiring the circuit to be rewired. There is a need for a single welding power supply which is capable of operating in all common arc welding modes.

In the past, robot devices, which are typically digital, have had to interface with welding devices, which were analog or only accepted analog input. Control has often been accomplished by translating information to a zero to ten volt analog signal, for example, which is then sent from one device to the other where the analog signal must be used, or perhaps translated back to a digital signal. This has not provided precise positive control or communication between the robot device and the welding device. Such an approach requires precise calibration of the analog to digital conversion process, and may be susceptible to the introduction of noise and errors. There has been a need for a programmable arc welding power supply controller which is capable of accomplishing direct communication to a robot device using digital data.

Conventional methods of starting a TIG weld have involved the use of high frequency pulses at voltages on the order of 15,000 to 20,000 volts. Such methods tend to cause electromagnetic interference (EMI) or radio frequency interference (RFI). EMI or RFI can interfere with the proper operation of robots, as well as other devices and instruments. There is then a need for a TIG start weld method which avoids the use of high frequency, high voltage pulses.

Other conventional attempts to start TIG welding procedures have involved the use of what is commonly referred to as a scratch start. The tungsten tip of a welding lead is quickly scratched across the metal to be welded in order to start an arc. This must be done quickly in order to avoid the tungsten tip from being welded to the metal work piece. This procedure often damages the tungsten tip and tends to contaminate the metal work piece with tungsten.

There is a need in the art for an intelligent or smart arc welding power supply which is capable of sensing contact with the metal work piece, capable of sensing the establishment of an arc utilizing a background supply, and capable of ramping up the main power supply current upon establishment of an arc.

SUMMARY OF THE INVENTION

It will be appreciated from the above discussion that arc welding supplies in the prior art leave room for significant improvement. The present invention is believed to represent an advance and improvement over prior art arc welding power sources.

A microprocessor controlled arc welding apparatus may, in a preferred embodiment, include the features of a three-phase transformer, preferably six SCRs connected between the transformer and a common welding lead, where the SCRs are used to control the amount of current or voltage which is output onto the common welding lead. A sensor is coupled to the common welding lead for directly sensing either the current, or the voltage, or both.

The present invention includes the feature of a microprocessor, having an input port coupled to the voltage and current sensors, a memory, and an output port coupled to the SCRs so that the microprocessor can control the firing angle of the SCRs in order to control the voltage or current which is output to the common welding lead.

A significant feature of the present invention involves the method of synchronizing to both the frequency and the phase of the AC power signal. If the firing angle of the SCRs is to be controlled by the microprocessor, it is extremely important that the microprocessor have a means for positively synchronizing to the AC wave form which appears at the secondary of the transformer and which is coupled to the anode of the SCRs. The present invention features a phase locked loop which locks onto the frequency of the AC waveform, and which provides the capability of operation over a variable range of AC line frequencies, and also maintains synchronization even if the AC line frequency varies, as could easily be the case where a portable diesel generator may be used to generate the AC line signal in the case of a portable welding apparatus. However, the phase locked loop sacrifices phase information in accomplishing its frequency lock on. THe signal generated by the phase locked loop will typically be out of phase with the AC wave form. The present invention includes the feature of a polarity detector, which generates signals that are coupled to the microprocessor and evaluated by the microprocessor to synchronize with the phase of the AC waveform.

The present invention includes the feature of timing circuits which are set by the microprocessor responsive to the information provided by the phase locked loop and the polarity detector, in order to generate interrupts at six times the AC line frequency. These interrupts, which are synchronized with the AC waveform, may then be used to control the timing circuits which are used to generate firing signals for the SCRs. The present invention includes the significant feature of positive synchronization of the firing signals which are supplied to the SCR bank with the AC line frequency, thereby accomplishing positive control of the output applied to the common welding lead. This feature is superior to prior crude proposals which involved counting weld cycles using an internal crystal oscillator or the microprocessor's instruction cycle time as a means for timing welding procedures.

The present invention includes the feature of providing an economical and efficient microprocessor controlled arc welding supply which provides an optimum trade off between hardware and software. The invention includes the feature of a look-up table which is stored in memory and which permits the microprocessor to quickly determine a proper correction to be applied to the gating signal which is used to fire the SCRs when the microprocessor determines an error between the sensed voltage or current and a reference voltage or current which is desired to be maintained by the arc welding power supply.

The invention includes the feature of providing the capability of computing a first derivative parameter which is indicative of the rate of change of the welding current or voltage, and the capability of utilizing this first derivative parameter to accurately control the output of the apparatus.

The invention includes the capability of sensing external switches or other devices, and the capability for responding intelligently to such sensed inputs in accordance with program control. For example, the invention includes the capability for sensing the appropriate location at which to start a weld, and the ability to sense a location at which a weld should be stopped. The invention includes the capability of receiving input from an operator defining a desired welding procedure and either a constant current mode, constant voltage mode, or some other desired welding mode, and then controlling the arc welding power supply precisely to provide the user desired welding procedure. The invention includes the capability of sensing signals from a robot and responding intelligently to such signals.

The invention includes the capability for controlling various outputs. The invention includes the capability for controlling weld functions such as wire feed, inert gas flow (such as shielding gases), turning on and off a background voltage, signaling a robot to begin movement of a work piece to be welded, outputting to a printer a stream of data indicating quality control data such as the voltage and current which occurred at selected intervals during a welding procedure, prompts to an operator to perform certain operator initiated functions, as well as numerous other functions. The invention even includes the feature of automatically disconnecting the transformer when the apparatus is in a standby mode in order to reduce the amount of wasted power consumed by the transformer. The machine further includes the feature of providing an input/output data port which is capable of providing direct digital communication of digital data to an external digital device such as a host computer controller, a robot device, etc.

The invention provides the feature of intelligently touch starting a TIG welding mode by turning on a small background voltage, for example a 0.5 volt supply, moving the welding tip toward the work piece and sensing contact of the welding tip with the work piece by determining when the small background voltage drops to 0, turning on a higher background voltage such as an 80 volt current limited supply and withdrawing the welding tip from the work piece, measuring the establishment of a thin arc between the welding tip and work piece by sensing the voltage or current when the welding tip has been withdrawn from the work piece, then ramping up the main welding current once an arc has been established.

The invention includes the feature of providing a capability of assisting an operator in learning how to weld. In such a mode, the apparatus is capable of teaching an inexperienced operator how to weld. The machine can automatically change its settings to compensate for welder errors, and can also generate prompts and other outputs designed to instruct the welder how to correct welding errors.

In another mode referred to as "bio-feedback", the apparatus provides the capability of sensing welder's signals, which may be provided for example by momentarily dipping the welding lead closer to the work piece to cause a momentary change in the sensed voltage or current, which the microprocessor may then be programmed to interpret as a signal to change the setting of the welding apparatus, such as increase voltage, increase current or perform some other function as increase the rate of wire feed, etc.

The invention includes the feature of providing an optimum trade off between hardware and software, not only by the use of look-up tables, but also by providing timers which are configured to fire the SCRs at the same firing angle until the information in the timers is changed or updated by the microprocessor. This feature takes the load off the microprocessor of generating the gating signals which must be used to fire the SCRs, and the microprocessor's computer power is only needed in order to update the information in the timers. In other words, the timers function as smart interface chips which interface directly to the SCRs and control the SCRs responsive to information provided by the microprocessor.

DETAILED DESCRIPTION OF A PREFERRED EMBODIMENT

Figure 1:
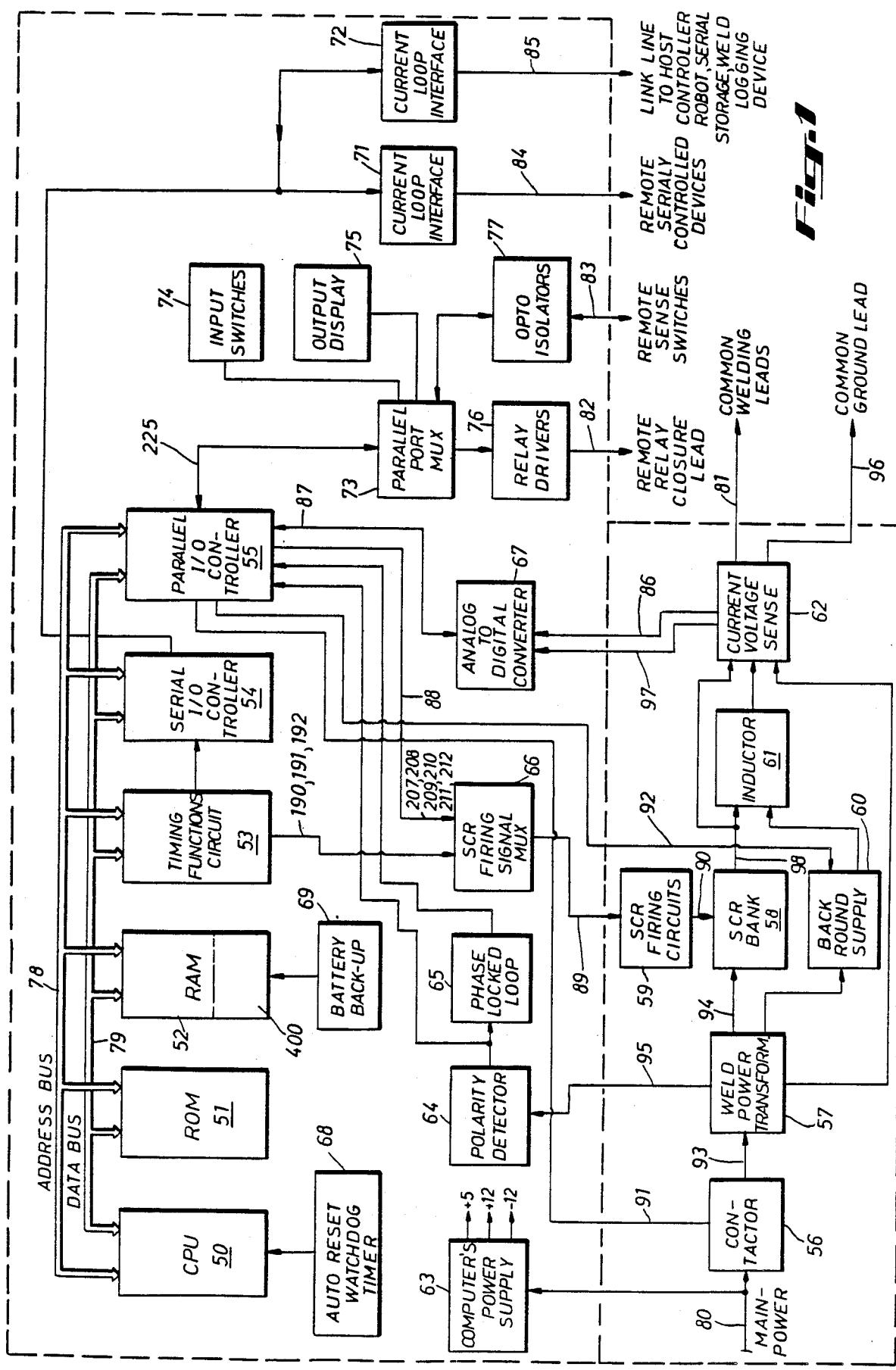
FIG. 1 is a block diagram illustrating schematically the interrelationship of the significant circuit components forming an embodiment of the present invention.

FIG. 1 shows the interrelationship of various circuits which form the present invention.

The welding apparatus draws AC power from a main power source 80. The apparatus yields a welding current or voltage between a common welding lead 81 and a common ground lead 96. A workpiece appropriately connected between the welding lead 81 and the ground lead 96 will be welded by the flow of current (in a conventional sense) from the positive common welding lead 81 to the negative common ground lead 96. The flow of welding current is developed and controlled by the circuit element illustrated in FIG. 1.

Significant components of the invention include a weld power transformer 57, an SCR bank 58, a CPU 50, and current and voltage sense elements 62. Assuming that the power is on and a welding mode has been selected by an appropriate configuration of memory 51 and 52 along with necessary inputs, power flows through the weld power transformer 57, is rectified and controlled by the SCR bank 58, and is supplied to the common welding lead 81. The sense elements 62 monitor the condition of the welding arc. The sense elements 62 communicate with the CPU 50 which compares, under program control, the actual welding conditions with the selected welding mode. The CPU signals and controls the SCRs to achieve the proper welding condition in accordance with the selected welding mode. This circuitry is capable of achieving, for example, either constant current or constant voltage arc welding, which are selectable without requiring the rewiring of circuits. Program control for both constant current and constant voltage procedures are contained in the memory 51 and 52, and are selectable by transmitting the appropriate command to the CPU 50. Since SMAW and TGAW usually require a constant current machine and MGAW requires a constant voltage machine, at least two separate conventional welding machines would have been required in the past to weld in these three most common arc welding modes. This invention provides one apparatus capable of functioning in a constant current mode, or a constant voltage mode, and which is capable of SMAW, TGAW, MGAW, SAW, as well as all arc welding modes, without hardware reconfiguration.

The invention is capable of switching substantially instantaneously between a constant voltage mode and a constant current mode, even during the course of a welding procedure. For example, the MGAW process is most easily started in a constant voltage mode, and then once the arc has been initiated, may be switched to a constant current mode. The invention is also capable of operating in a constant power mode.

The illustrated implementation of these capabilities can best be understood by referring to FIG. 1. Main power 80 is supplied to the weld power transformer 57. In a preferred embodiment, the weld power transformer 57 is a three phase transformer. The main power voltage is preferably stepped down by the weld power transformer 57 and coupled to the SCR bank 58 through conductor 94. The SCR bank 58 rectifies the alternating current on conductor 94. The SCR bank 58 preferably comprises six SCRs in a full wave, three phase rectifier configuration, sometimes referred to in the art as a six phase star. This results in a direct current output on conductor 98 having a 360 Hz ripple, if the power line frequency is 60 Hz.

In a preferred embodiment, the 360 Hz ripple may be smoothed by an inductor 61. The DC welding current is coupled to the common welding lead 81.

A significant feature of the present invention involves the direct sensing of current and voltage. Current and voltage sense elements 62 are provided which are directly connected to the common welding lead 81. In the present invention, samples of the current and voltage representative of the welding conditions at a given point in time are monitored directly at the common welding lead 81 or the common ground lead 96, rather than on the primary side of the weld power transformer 57 (such as at conductor 93). This provides more accurate control of welding conditions, and eliminates the time delays which can occur if current or voltage is sensed through the inductive winding of a transformer 57.

The amount of current or the amount of voltage appearing on conductor 98 will be determined by the SCR bank 58 responsive to gating signals fed to the SCR bank 58 through a conductor 90. The gating signals are developed by SCR firing circuits 59. The SCR firing circuits 59 develop gating signals on conductor 90 responsive to signals from the CPU 50.

It is desirable to communicate welding conditions to the CPU 50 which may be analyzed in order for the CPU 50 to provide the appropriate signals to the SCR firing circuits 59. In the illustrated embodiment, this is essentially accomplished by an analog-to-digital converter 67 which is coupled to the current and voltage sense elements 62.

The analog-to-digital converter 67 transforms the voltage signals appearing on a voltage sense conductor 86 to a digital signal which can be processed by the CPU 50. Similarly, the analog-to-digital converter 67 transforms the analog current signal appearing on a current sense conductor 97 to a digital signal which may be processed by the CPU 50. In a preferred embodiment, the analog-to-digital converter 67 is a two channel A/D converter.

In a preferred embodiment, communication to and from the CPU 50 is accomplished through a parallel I/O circuit 55. Current or voltage signals from the current or voltage sense elements 62 are transformed to digital signals by the A/D converter 67 and gated to a data bus 79 by the parallel I/O circuit 55. The digital signals from the A/D converter 67 may be stored in a random access memory or RAM 52, or temporarily placed in the CPU 50.

Timing considerations can be very significant. It is necessary that gating signals be applied to an SCR during the alternating current phase when the SCR is forward biased. Equally important, in order to correctly control the firing of the SCRs 58, it is necessary to have an accurate reference to the phase and frequency of the alternating current signal from the main power source 80 (which may vary). In the illustrated embodiment, this is essentially accomplished by a polarity detector 64, a phase locked loop 65, in cooperation with a timing function circuit 53. The phase locked loop 65 gives a reliable indication of the frequency of the AC power signal. The polarity detector 64 is used to determine phase information concerning the AC power signal.

The polarity detector 64 is coupled to the weld power transformer 57 through a conductor 95. The polarity detector 64 is tied to one phase of the alternating current signal (in the illustrated three phase embodiment), coupled to the polarity detector 64 by the conductor 95.

The phase locked loop 65 locks to the AC line frequency. The phase locked loop 65 has an internal oscillator which locks onto and synchronizes with the AC line frequency, and thus follows it. The phase locked loop 65 delivers a clean frequency reference signal to the CPU 50. This is significant, because the AC power signal is difficult to measure by other techniques, such as zero crossing detectors, due to noise, non-linearities in loads, non-linearities in the transformer 57, "ringing" introduced by inductance or otherwise, and other factors.

The frequency reference signal provided by the phase locked loop 65 is used by the CPU 50 to determine the period of the AC signal. Specifically, the CPU 50 sets section three of the triple timer 152 to zero at the start of one cycle of the frequency reference signal. Upon completion of a cycle, the phase locked loop 65 generates an interrupt to the CPU 50. When the CPU 50 receives this interrupt, it goes to the timer 152 and reads the value of section three of the triple timer 152. The elapsed time represents the period of the AC signal. Inasmuch as the period of an alternating signal is inversely related to its frequency, the frequency of the AC power signal can also be determined readily. The CPU 50 then sets section one of the triple timer 152 to generate interrupts at six times the AC line frequency. Each interrupt may be used as a reference for firing each of the six SCRs 100.

The phase locked loop 65 sacrifices phase information to obtain a frequency lock. The phase of the frequency reference signal provided by the phase locked loop 65 to the CPU 50 will typically be shifted in phase. It is desirable to obtain phase information regarding the AC power signal. In the illustrated embodiment, this is essentially accomplished by the polarity detector 64. At each interrupt, the polarity detector 64 is sampled and the timer interrupt rate is modified if necessary to cause the interrupts to occur in phase with the AC line signal.

The interrupts are used, under program control, as a reference for determining the proper control signals to be applied to the SCRs 58. Once the frequency and phase of the AC power signal are known, and interrupts are generated at six times the AC line frequency, the interrupt associated with each of the six SCRs 100 provides a reference so that each SCR 100 may be signaled after a predetermined delay from the interrupt to fire during only a portion of the AC phase (which can be accurately controlled by the CPU 50).

A significant feature of the illustrated circuit involves the ability to communicate directly with a host controller, a robot, or a remote control device using digital data. In the past, it has been common to generate an analog signal which is fed to a welding device from a robot device, which must then be converted to a digital signal. This, of course, introduces errors and has been a less than satisfactory arrangement. In the present invention, two serial I/O ports are provided. Each port is connected to a current loop interface 71 or 72 which provides a digital output 84 and 85, respectively. The output 85 or the output 84 may provide digital data to a host controller, a robot, or other digital device. Further, the present invention may be used advantageously in connection with a robot device. For example, the CPU 50 may signal a robot device to position a workpiece, such as an automobile chassis, in a manner convenient for welding. The CPU 50 may then generate a welding current between the common welding lead 81 and the common ground lead 96 in accordance with a desired welding procedure. The robot, responsive to signals from the CPU 50, may be used to move the workpiece in a manner necessary to accomplish the desired welding procedure. The robot may then signal the CPU 50 when the workpiece arrives at a position indicative of the completion of the welding procedure. The robot may then pass the workpiece to the next station in the assembly procedure, and these steps may be repeated. Significantly, the link line 85 carries digital data in the illustrated embodiment which results in significant advantages in positive communication between the CPU 50 and the robot.

Additional current loop interfaces 71 may be provided if additional outputs 84 are desired for communicating digital data to remote serially controlled devices.

It is desirable to provide means for accomplishing data input into the CPU 50 from an operator or remote switches which are sensed. It is further desirable to provide for the output of information in a form which may be recognized by a human operator, or which may be used to activate remotely controlled relays. In the present instance, this is accomplished by a parallel port multiplexer 73 which is electrically coupled to the parallel I/O controller 55.

The parallel port multiplexer 73 may be used to route signals to output displays 75. The output displays 75 may be in the form of panel mounted LEDs which are visible to an operator and which display information indicative of the status of current welding conditions, program control information, mode of operation, etc.

In a preferred embodiment, an operator may input information to the CPU 50 using input switches 74. The RAM 52 could be programmed in this manner. The input switches 74 are electrically coupled to the parallel I/O controller 55 through the parallel port multiplexer 73. The desired operating mode, such as constant current or constant voltage, may be entered by the input switches 74. Control information such as the desired voltage level or current level could also be entered using the input switches 74. Additionally, operator interrupts could be entered in a similar manner.

It is oftentimes desirable to sense remote switches. For example, limit switches may be used to sense remote conditions. In a preferred embodiment, opto-isolators 77 are used to isolate the parallel port multiplexer 73 from the remote sense switch output 83. The opto-isolators 77 are used to provide electro-isolation of noise and switch bounce so that a clean signal may be provided to the parallel port multiplexer 73.

It is oftentimes desirable for the CPU 50 to control remote relays or other devices through a remote relay output 82. In the present instance, this is accomplished by relay drivers 76 which are electrically coupled to the parallel port multiplexer 73. Using the relay drivers 76, the CPU 50 may signal remote relays through the remote relay output 82 which may be used to feed wire which is to be used for welding, turn on the flow of an inert gas used for shielding, activate cooling fans used to direct cooling air flow over the SCRs, etc.

It is oftentimes desirable to output information from the CPU 50 to an operator in a manner in which it can be perceived visually. In the illustrated circuit, this is essentially accomplished by the provision of output displays 75. The output displays 75 may be LED type displays. The output displays 75 may be used to output the voltage and current at any given moment during a welding procedure. The output displays 75 may be used to indicate and verify data or commands which are entered through input switches 74, or from peripherals connected to the serial ports, such as paper tape, keyboard, computer, robot, disk drive, tape drive, etc.

The parallel port multiplexer 73 controls the flow of signals to or from the input switches 74, the output displays 75, the opto-isolators 77, and the relay drivers 76. The parallel port multiplexer 73 insures that a signal from the CPU 50 which is directed to the output displays 75 is correctly routed to the displays 75, for example.

It is oftentimes desirable to provide means for supplying a voltage of a predetermined level between the common welding lead 81 and the common ground lead 96. It is often desirable to present a certain open voltage between the leads 81 and 96. This is often used to assist in overcoming the resistance at the surface of the workpiece which is typically present during a cold start of a welding operation. Initially, a workpiece presents a higher resistance. After welding current begins to flow and an arc is developed, the ionization of the immediately surrounding area and the heating of the workpiece will present a lower resistance to the welding apparatus.

In a preferred embodiment, a background supply 60 is provided. The background supply 60 is electrically coupled to the common welding lead 81. The background supply 60 may be used to develop an open circuit voltage between the leads 81 and 96. In addition, the background supply 60 may be used to smooth ripples in the welding current provided by the SCR bank 58.

In the illustrated embodiment, the weld power transformer 57 draws a significant amount of power even when the SCR bank 58 is not conducting. Much of this power is dissipated in the form of undesirable heat. A contractor 56 is preferably provided to disengage the weld power transformer 57 from the main power source 80 during periods when welding operations are not being performed. The contactor 56 is electrically coupled to the parallel I/O controller 55 through conductor 91. The CPU 50 signals the contactor 56 on conductor 91 through the parallel I/O controller 55. The contactor 56 disengages power coupled on conductor 93 to the weld power transformer 57 responsive to the signals from the CPU 50. To prolong the life of the contactor, it should not be switched while the power source is under load.

After a predetermined delay, the CPU 50 may signal the contactor 56 to disconnect the weld power transformer 57. Alternatively, the CPU 50 may be instructed, using program control contained in memories 51 or 52, to signal the contactor 56 at a predetermined time. Once disconnected, the contractor 56 is responsive to signals from CPU 50 to reconnect the weld power transformer 57 when desired. The provision of the contactor 56 to disconnect the weld power transformer 57 significantly reduces the amount of power that the circuit draws when the circuit is on standby.

A computer power supply 63 is connected directly to the main power source 80, and is preferably not disconnected by the contactor 56. The computer power supply 63 provides power to the CPU 50, the ROM 51, the RAM 52, the time and function circuit 53, the serial I/O controller 54, the parallel I/O controller 55, etc. It will be appreciated that the CPU 50 remains activated even when the weld power transformer 57 is disconnected by the contactor 56. In other words, the invention retains its control ability even when the apparatus is in a standby mode.

An auto reset 68 is provided coupled to the CPU 50. The auto reset 68 may be used to boot the system when the circuit is initially powered up. A watch dog timer 68 is also provided to reset the CPU 50 if a malfunction occurs.

A battery backup 69 is preferably provided for the RAM 52 to prevent the loss of data during a temporary loss of power, and to retain the information in memory during periods when power to the apparatus is shut down.

Figure 2:
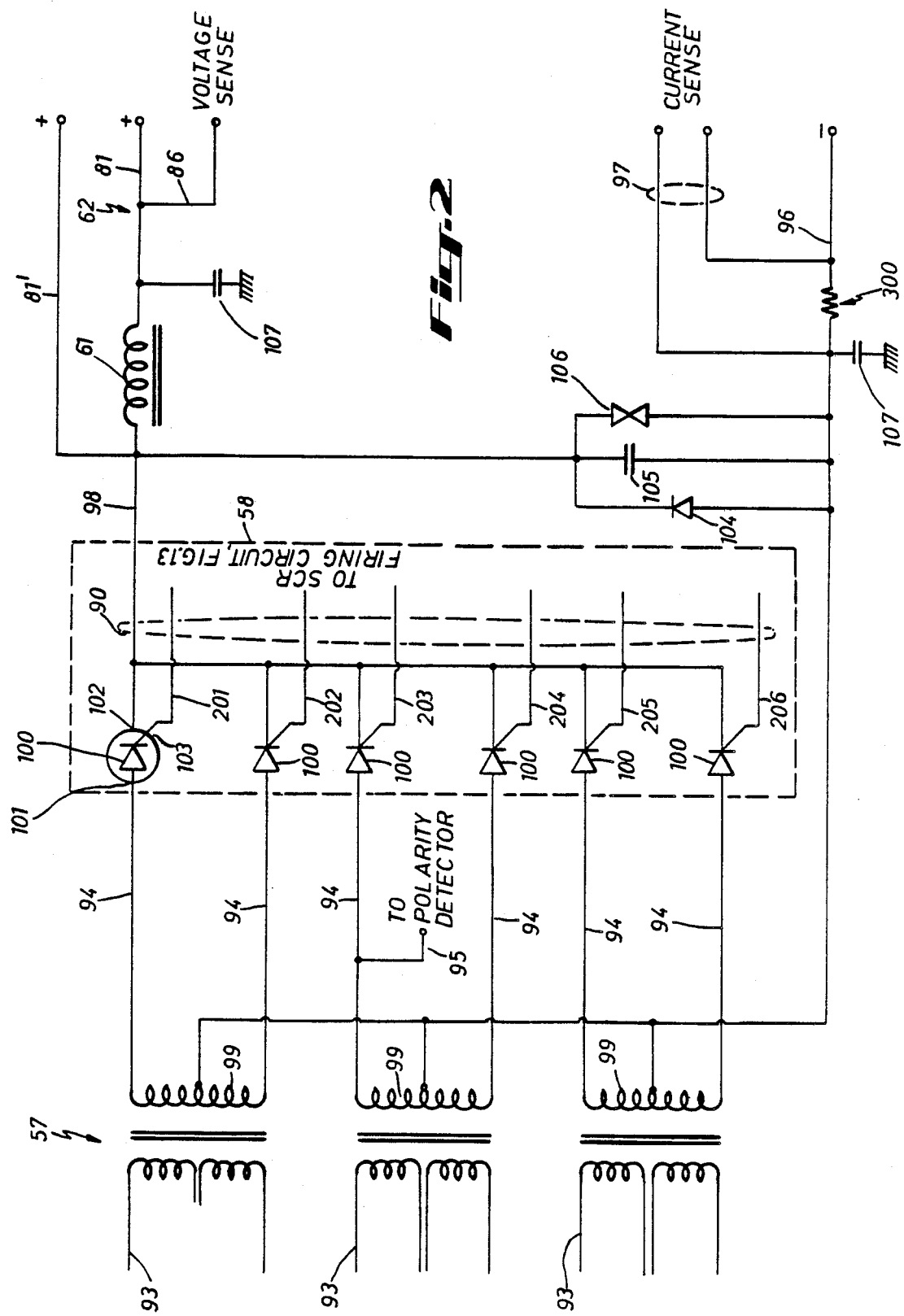
FIG. 2 is a schematic diagram of the weld power transformer, the SCR bank, the inductor, and the current and voltage sense circuits.

The operation of the SCR bank 58 may be better understood with reference to FIG. 2. In a preferred embodiment, the weld power transformer 57 is a three-phase power transformer. Conductors 93 connect primary windings of the three-phase transformer 57 to a main source of power 80. The three-phase transformer 57 has secondary windings coupled through conductors 94 to SCRs 100. In the illustrated embodiment, the conductors 94 are connected to the anodes of the SCRs 100.

The cathodes of the SCRs 100 are connected together to a conductor 98 and fed to the inductor 61.

The electrical signal on conductors 94 is an alternating current signal, preferably a sine wave. The SCRs 100 will be forward-biased during one-half of the AC cycle. When the SCR 100 becomes forward-biased, the SCR 100 will not conduct current through to the conductor 98 until a firing signal is applied to the gate 103 of the SCR 100. Using the gates 103 of the SCRs 100, it is possible to control the flow of welding current on the conductor 98.

If a firing signal is applied to the gate 103 at the SCR 100 during the initial portion of the forward-biased half of the AC wave form, the maximum amount of current will flow through the SCR 100 to the conductor 98. Conversely, if a gating signal is applied to the gate 103 late in the alternating current cycle, the average current flowing through the SCR 100 to the conductor 98 will be less.

In a preferred embodiment, six SCRs 100 are utilized. Under normal conditions, an individual SCR 100 will conduct only during a portion of the AC cycle. However, the output from all six SCRs 100 are summed together and fed to the conductor 98 to provide a smoother direct current signal to the common welding lead 81. The DC current flowing on conductor 98 will ordinarily have a ripple at six times the line frequency. In the case of a 60 Hz power line frequency, the ripple will be at 360 Hz.

An inductor 61 is provided to smooth the 360 Hz ripple on the signal appearing on conductor 98. This results in a smoother DC signal at the common welding lead 81.

In a preferred embodiment, a voltage sense element 62 is connected to the common weld lead 81 and coupled through conductor 86 to the analog-to-digital converter 67. In the illustrated embodiment shown in FIG. 2, the voltage sense element 62 is a direct connection 86 to the lead 81.

It may be desirable to provide a means for eliminating the inductor 61 when its filtering action is not desired. In the embodiment illustrated in FIG. 2, an alternative common welding lead 81' is provided which bypasses the inductor 61 and is connected directly to the conductor 98.

In the illustrated embodiment shown in FIG. 2, a current sense cable 97 is connected as shown to a shunt 300 inserted in the common ground lead 96. The voltage developed across the shunt 300 will be directly proportional to the valve of the current.

In the illustrated embodiment, further filtration and voltage spike protection is provided by a diode 104, a capacitor 105, and an MOV device 106, which are connected in parallel between the conductor 98 and the common ground lead 96. Additional filtering and noise suppression may be provided by capacitors 107 connected as shown in FIG. 2.

Figure 13:
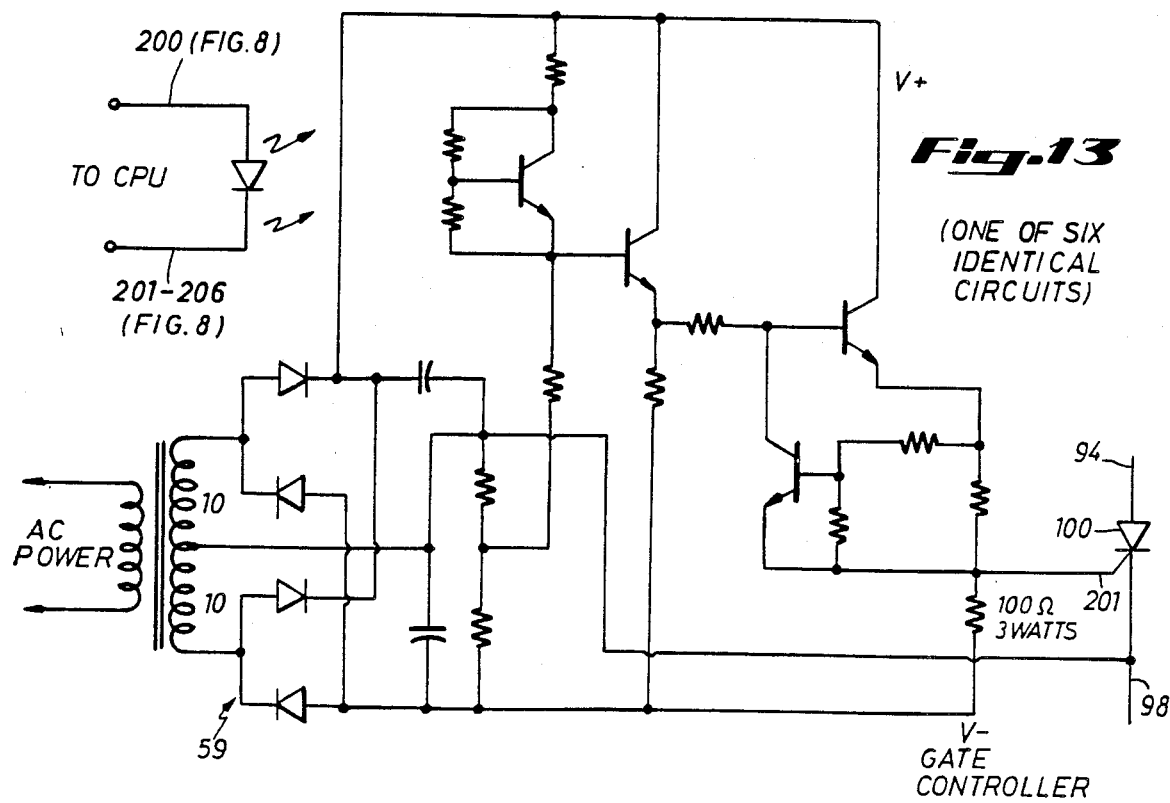
FIG. 13 is a schematic diagram showing one of the SCR firing circuits in more detail.

The gates 103 of the SCRs 100 are connected through conductors 90 to SCR firing circuits 59 (shown in more detail in FIG. 13). The SCR firing circuits 59 provide signals in response to signals received from the CPU 50 to fire the SCRs 100 during the appropriate portion of the AC cycle in order to obtain the desired welding current on conductor 98. The timing of the gating signals applied to the gates 103 of the SCRs 100 determines the average current or average voltage which appears on the conductor 98. The average current or average voltage on conductor 98 may be increased by shortening the delay between the time that the AC signal on conductor 94 crosses zero and forward biases the SCR 100, and the time that the firing signal is applied to the gate 103 of the SCR 100. Conversely, the average current or average voltage on conductor 98 may be decreased by lengthening the delay between the zero crossing of the AC signal on conductor 94 and the firing signal applied to the gate 103 of the SCRs 100. This timing is determined by the CPU 50 under program control.

In order to accurately calculate the delay in initiating the SCR firing circuit signal, it is desirable to have a reference to the phase and frequency of the AC signal from the secondary 99 of the transformer 57. In the illustrated embodiment, this is accomplished by conductor 95 which is connected to one side of a secondary winding 99 of the transformer 57. The conductor 95 is connected to the polarity detector circuit 64. The signal sensed through conductor 95 may be used as a reference which may be used by the CPU 50 to synchronize the interrupts generated by the timer chip 152 so that the interrupts are in phase with the AC line frequency. Then the CPU 50 may accurately determine the appropriate delay for the firing signals to be supplied to the gates 90.

The preferred embodiment includes the capability of individually controlling the delay for the gating signal supplied to each gate 103 of each SCR 100. This provides the capability of generating complex wave forms, if desired, or to compensate for variations in circuit components, or both.

A significant feature of the present invention involves the calculation of the desired timing for the SCR firing signals during each alternating current phase of the signal at conductor 95. As described more fully above, the phase locked loop 65 is synchronized with the frequency of the AC power signal, and provides a reliable measure of the period of the AC power signal. The elapsed time since the last zero crossing of the frequency reference signal is computed to determine the period of the AC wave form. Six interrupts are generated for each period (one interrupt for each SCR 100). During each cycle of the AC wave form, the zero crossing of the AC signal is sensed, and used to synchronize the interrupts with the phase of the AC wave form. The six interrupts divide the period of the AC wave form preferably into six equal subperiods, which are used as a reference for firing each individual SCR 100. (It may be desirable to make the subperiods unequal, as described more fully hereinafter).

The period of the AC wave form is recalculated for each cycle of the phase locked loop. Variations in the alternating current frequency will not affect circuit operation. Significantly, the apparatus will work on 60 Hz AC power, 50 Hz AC power (as is common in Europe), or even on a variable frequency source such as that generated by a diesel generator, or various alternating current frequencies which may be available. This feature of the present invention provides positive synchronization which is crucial in accurately controlling the welding signal which is developed on conductor 98. If the circuit is not appropriately synchronized to the AC wave form, then the delay in firing the gate 103 of the SCRs 100 cannot be accurately determined.

Figure 3:
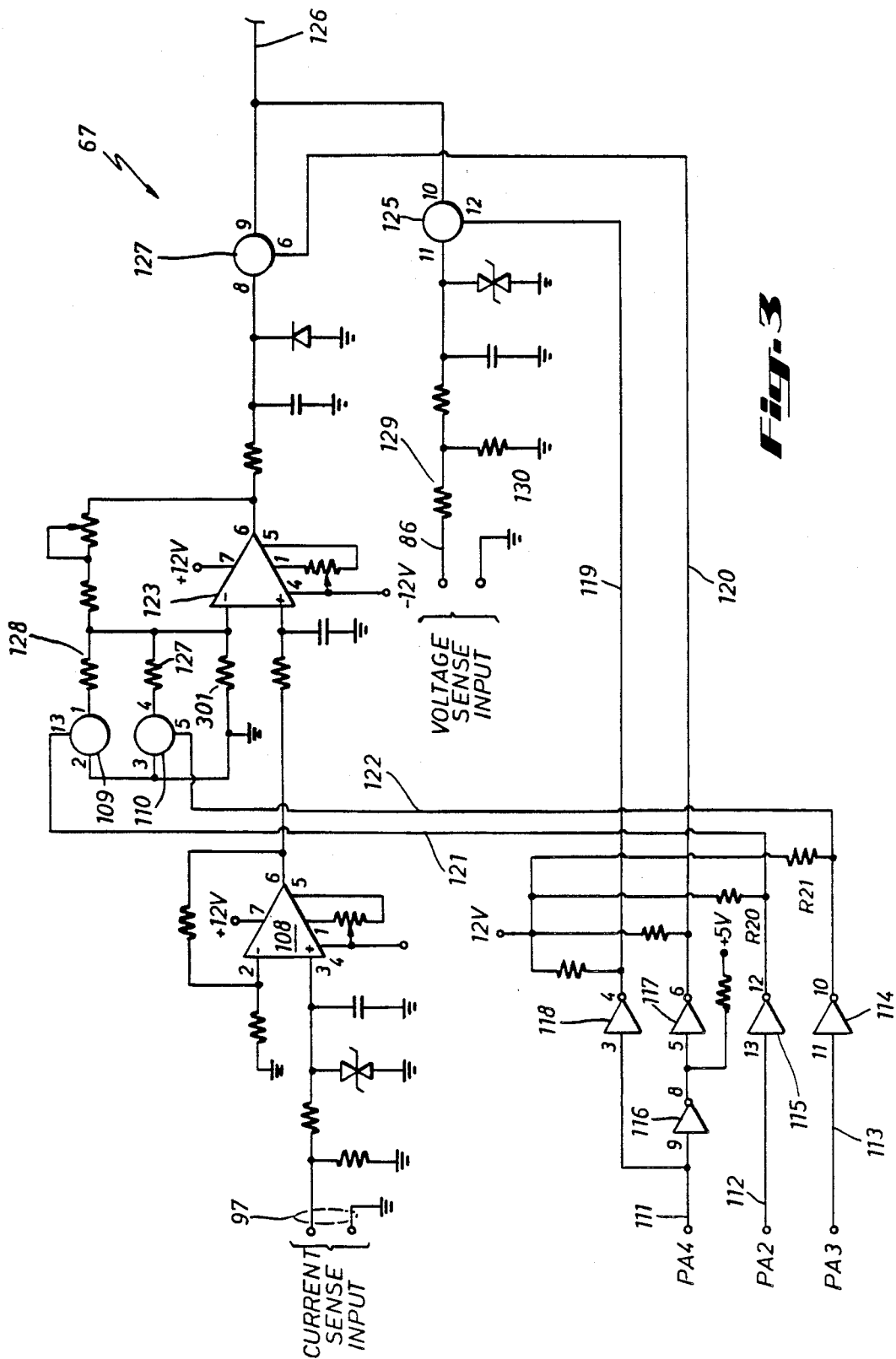
FIGS. 3 and 4 are schematic diagrams illustrating the analog-to-digital converter.
Figure 4:
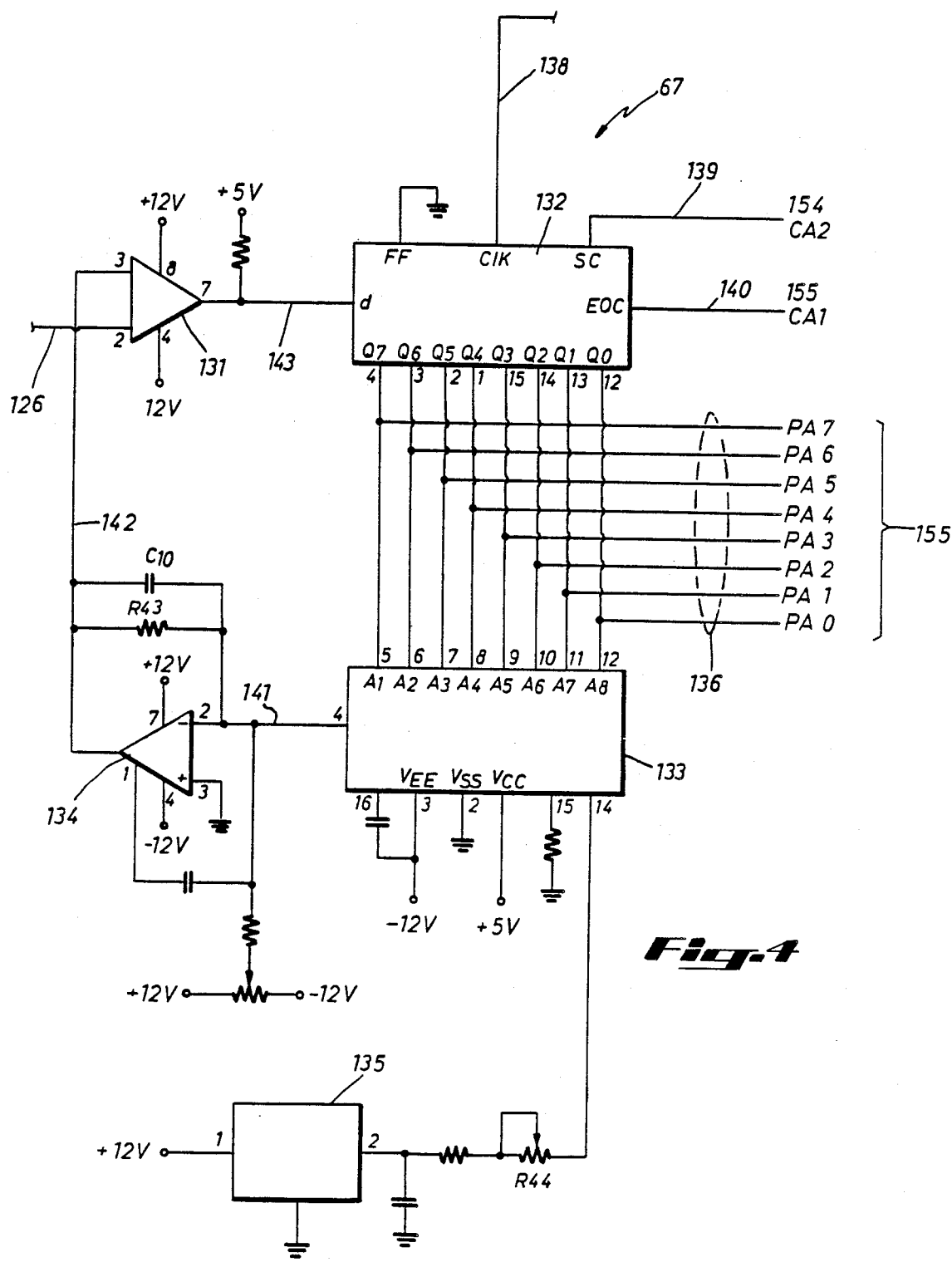

The operation of the analog-to-digital converter circuit 67 can best be understood with reference to FIG. 3 and FIG. 4.

It is desirable to sense the current and/or voltage representative of the welding conditions. A current sense input is provided through cable 97 to the analog-to-digital converter circuit 67, as shown in FIG. 3. It is desirable to amplify the signal on conductor 97 prior to converting the signal, in an analog form, to a digital signal which may be processed by the CPU 50. In the illustrated embodiment, this is accomplished initially by an operational amplifier 108. The current sense input is coupled through the conductor 97 to the op amp 108. In a preferred embodiment, the op amp 108 is designed to have a gain of 12.54.

The output from the op amp 108 is then electrically coupled to a second operational amplifier 123. It is desirable to vary the gain of the op amp 123 to provide a series of ranges for the current sense input 97. It is further desirable that this range selection be provided in response to signals from the CPU 50. In the illustrated embodiment, this is essentially accomplished through conductors 112 and 113, which are coupled to the CPU 50. In a preferred embodiment, the signal at conductors 112 and 113 will have a value which may be interpreted as either a logic one or logic zero.

The gain of op amp 123 is determined in part by feedback resistor 301. The gain of op amp 123 may be varied by reducing, or increasing, the effective feedback resistance. The effective feedback resistance may be reduced by connecting a second feedback resistor 127 in parallel with the first feedback resistor 301. In the illustrated embodiment, this is accomplished by an analog switch 110.

The analog switch 110, responsive to a signal on conductor 122, will effectively connect or disconnect the second feedback resistor 127 from the circuit. Signals from the CPU 50 are fed through conductor 113, through inverter 114 to conductor 122, which is in turn connected to the analog switch 110.

Thus, the CPU 50, by signaling the analog switch 1j10 through conductor 113, may change the gain of op amp 123 by coupling a second feedback resistor 127 in parallel with the first feedback resistor 301. The CPU 50 can therefore adjust the range of values which may be conveniently sensed through the current sense input 97.

Similarly, the CPU 50 may apply a logic signal to conductor 112 through inverter 115, through conductor 121 to a second analog switch 109. The second analog switch 109 is operative to connect a third feedback resistor 128 in parallel with the first feedback resistor 301 and the second feedback resistor 127, to adjust the effective feedback resistance to a desired value. As a result, the operational amplifier 123 is capable of providing three ranges of amplification to the input provided at conductor 97 in response to signals from the CPU 50.

In the illustrated example, the three ranges of the op amp 123 result in a scale such that a register 132 shown in FIG. 4 has one count per ampere for one range, one count per two amps for a second range, and one count per four amps for a third range.

In the embodiment illustrated in FIG. 3, the amplification provided by op amps 108 and 123 is required because the value of the shunt resistor 62 is preferably kept small to minimize the voltage drop which appears across the shunt 62.

When the analog switch 124 is enabled, the output from the current sense amplifiers 108 and 123 is coupled to conductor 126. A voltage sense input may also be applied to conductor 86. This is coupled through a voltage dividing network 129 to an analog switch 125.

When the analog switch 125 is enabled, the voltage sense input is coupled to conductor 126.

It is desirable to allow the processor to selectively determine whether the current will be sensed, or whether the voltage will be sensed by the CPU 50. In the illustrated embodiment, this is essentially accomplished by providing a sense select control line 111 which is coupled to the CPU 50. In a preferred embodiment, the signal at conductor 111 will be interpreted as either a logic one or a logic zero. The signal at the sense select control input 111 is coupled through an inverter 118 along conductor 119 to the analog switch 125. The signal on conductor 111 is also connected through inverters 116 and 117 along conductor 120 to the analog switch 124. It will be appreciated that the logic signal on conductor 119 will be the complement of the logic signal on 120. In other words, when the signal on conductor 119 is in a logic state of one, the signal on conductor 120 will be in a logic state of zero. This insures that the current sense input and the voltage sense input cannot both be simultaneously coupled to conductor 126. Thus, depending on whether conductor 119 or conductor 120 is enabled, the analog switches 125 and 124, respectively, will couple either the voltage sense input or the current sense input to conductor 126. Thus, the CPU 50 may select the desired input to be sensed.

It is desirable to convert the analog signal appearing on conductor 126 into a digital signal which may be processed by the CPU 50. In the illustrated embodiment, this is essentially accomplished by the circuit illustrated in FIG. 4. In the illustrated embodiment, the signal appearing on conductor 126 may have a range from 0.0 to 5.12 volts. This analog signal is converted into a digital signal having a value between hexadecimal zero and FF (which is between 0 and 255 in the decimal counting system).

Referring to FIG. 4, the analog signal on conductor 126 is representative of either the current or the voltage of the weld, which is selected by the CPU 50. This signal is fed to a two-input comparator 131. The analog signal on conductor 126 is compared with the signal on conductor 142.

The output of the comparator 131 is fed to a successive approximation register 132. The successive approximation register 132 is coupled as shown to an eight bit D to A converter 133. The D to A converter 133 has an output 141 connected to an operational amplifier 134, the output of which is fed through conductor 142 back to the two-input comparator 131. A voltage reference is provided by a precision voltage reference 135.

The circuit operation starts when the CPU 50 signals the successive approximation register 132 by enabling a start convert line 139. Responsive to the start convert signal from the CPU 50, the successive approximation register 132, in essence, guesses the value of the signal on conductor 126. This "guess" is converted by the eight bit D to A converter 133 to an analog signal at output 141. This signal is amplified by the op amp 134 and fed through conductor 142 into the two-input comparator 131. The comparator 131 compares the guess with the signal on conductor 126. The comparator 131 generates an output on comparator output line 143 which is fed back to the successive approximation register 132. The comparator output 143 will be a logic one or zero depending upon whether the "guess" is too great or too little. The successive approximation register 132 then selects a second guess responsive to the comparator error signal 143. The process is repeated and the output at conductor 142 is again compared with the current or voltage signal appearing on conductor 126. Generally speaking, each "guess" of the successive approximation register 132 will be closer and closer to the actual value of the voltage or current on conductor 126. In other words, the value in the successive approximation register 132 will converge upon a limit represented by the value of the signal on conductor 126.

The successive approximation register 132 continues to change the value in its register to a value closer and closer to the value of the current or voltage signal at conductor 126 until, for the illustrated example, eight successive guesses have been made. This results in a value that is within less than ½ of one percent of the actual voltage. The CPU 50 waits a sufficient period of time to allow the register 132 to complete its conversion, then reads out the value contained in the eight bit successive approximation register 132 through the input port, indicated generally in FIG. 4 by reference numeral 136.

The D to A converter 133 is preferably an MC 1408L8 chip. The successive approximation register 1332 is preferably a 40549 chip.

In the illustrated embodiment, a clock signal is provided through conductor 138 to the register 132. This clock signal comes from the serial I/O port. In other words, the successive approximation register 132 uses a clock signal derived from the baud rate generator of the serial I/O port. In the illustrated example, the clock for the register 1332 runs at a frequency of 147.8 KHz.

Resistor R44 shown in FIG. 4 may be used to trim or fine tune the range of the A/D converter 67. Resistor R43 should preferably be a 0.1% resistor. Resistor R43 must have a precise and stable value because its value determines the range of the A/D converter 67.

Figure 5:
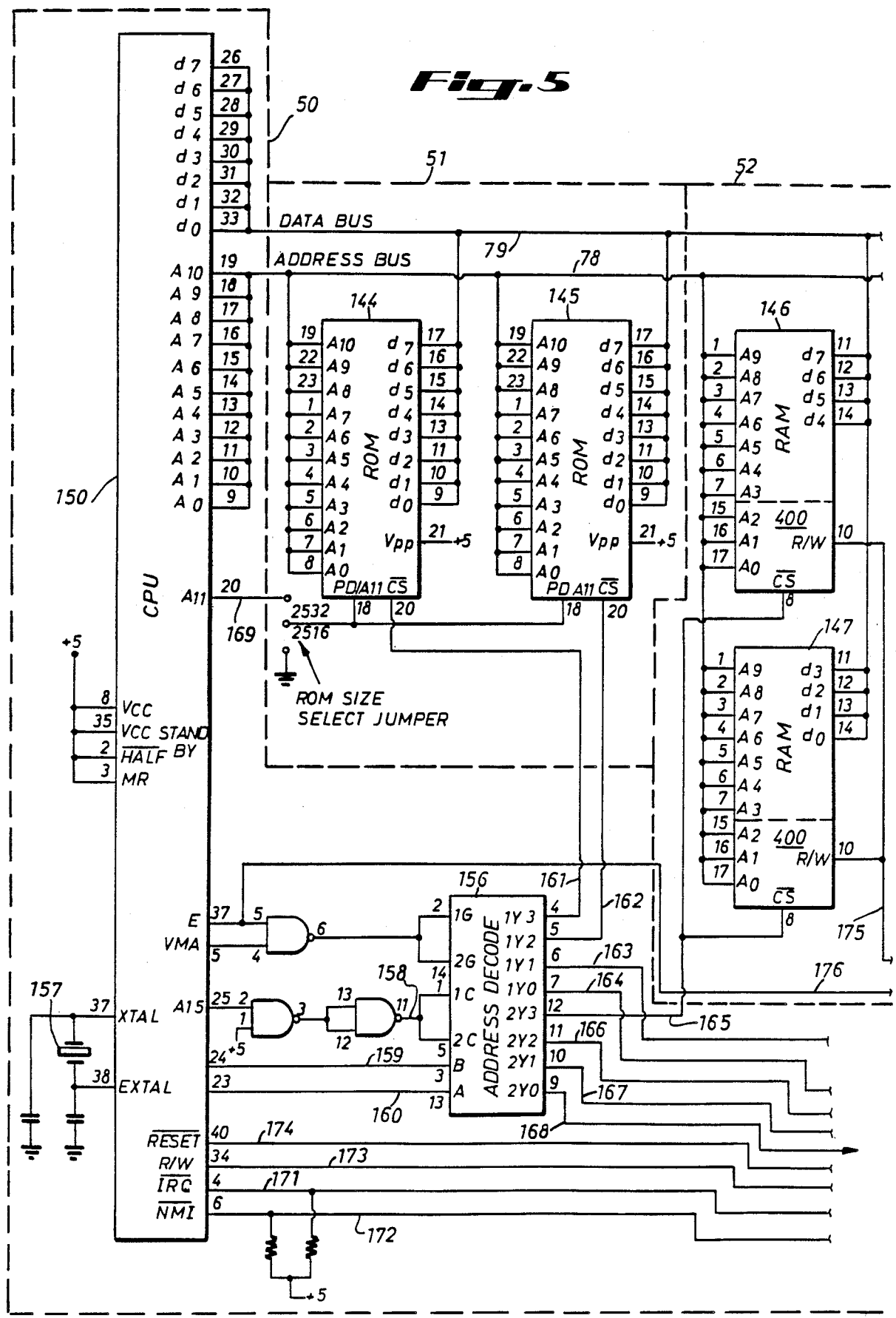
FIGS. 5 and 6 are schematic diagrams illustrating the CPU, the ROM, the RAM, and the bus interfaces for the timing function circuit, the serial I/O circuits, and the parallel I/O circuits.
Figure 6:
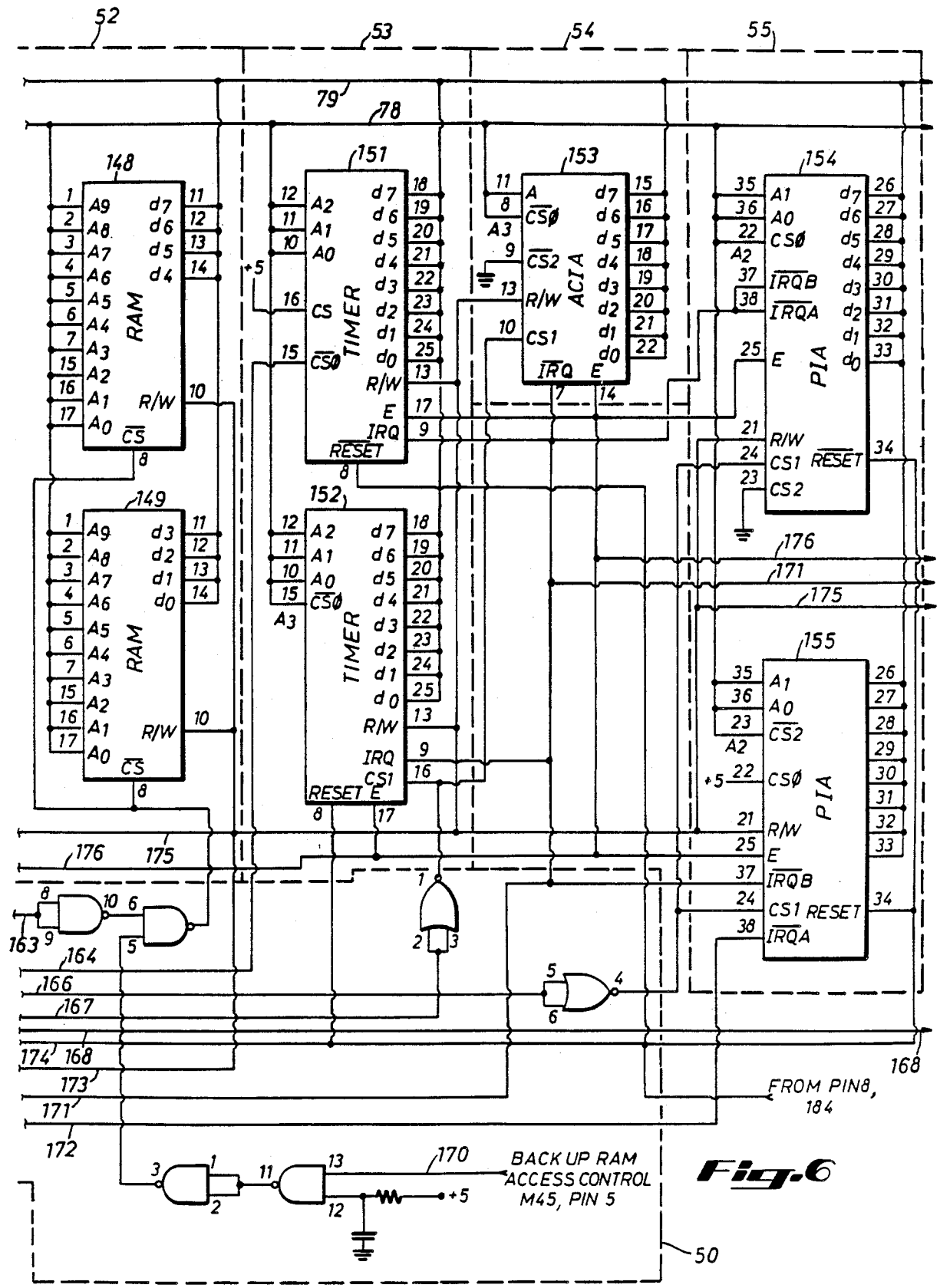
Figure 12:
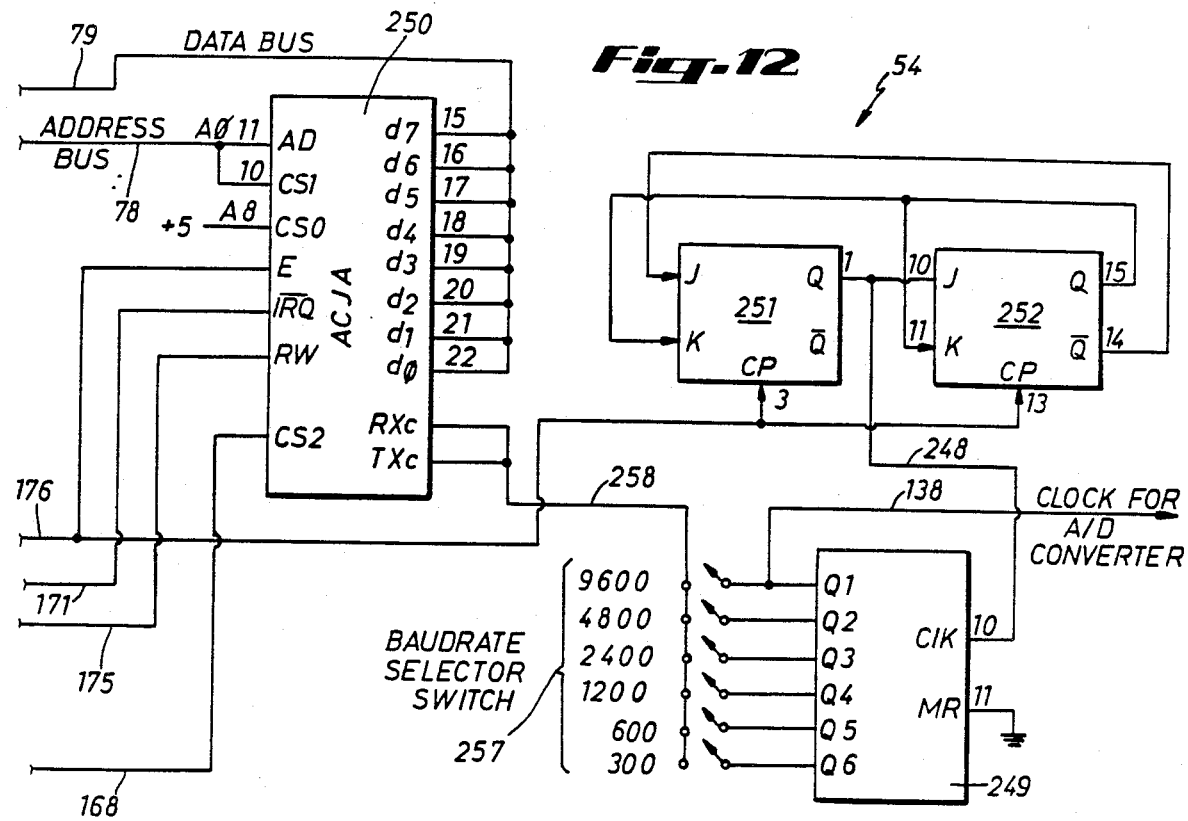
FIG. 12 is a schematic diagram illustrating the bus interface to one of the serial I/O circuits and its associated baud rate generator.

Operation of the CPU 50, ROM 51, RAM 52, timing function circuit 53, serial I/O controller 54 and parallel I/O controller 55 can best be understood with reference to FIGS. 5, 6, and 12.

In the illustrated embodiment shown in FIG. 5, the ROM 51 comprises two ROM chips 144 and 145.

In the illustrated embodiment, the RAM 52 includes RAM chips 146, 147, 148 and 149.

The CPU 50 includes a microprocessor 150. In a preferred embodiment, the microprocessor 150 may be a Motorola 6802 microprocessor. The microprocessor 150 may select a desired location of memory using the address bus 78 which is coupled to the ROM chips 144 and 145, and to the RAM chips 146, 147, 148 and 149. Information contained in memory is passed back and forth between the microprocessor 150 and memory 51 and 52 on the data bus 79.

The timer control circuit 53 includes a first triple timer chip 151 and a second triple timer chip 152.

The serial I/O controller 54 includes two asynchronous communication interface adaptors (ACIA), one of which is indicated in FIG. 6 by the reference numeral 153. The other ACIA is indicated with the reference numeral 250 in FIG. 12.

The parallel I/O controller 55 includes a first sixteen bit parallel port 154 and a second sixteen bit parallel port 155.

The second parallel port 155 includes output ports to output displays 75 and the SCR firing signal multiplexing circuit 66. Other outputs, which are illustrated in FIG. 1, are connected between the parallel port chips 154 and 155, but are not shown in FIG. 6.

Figure 11:
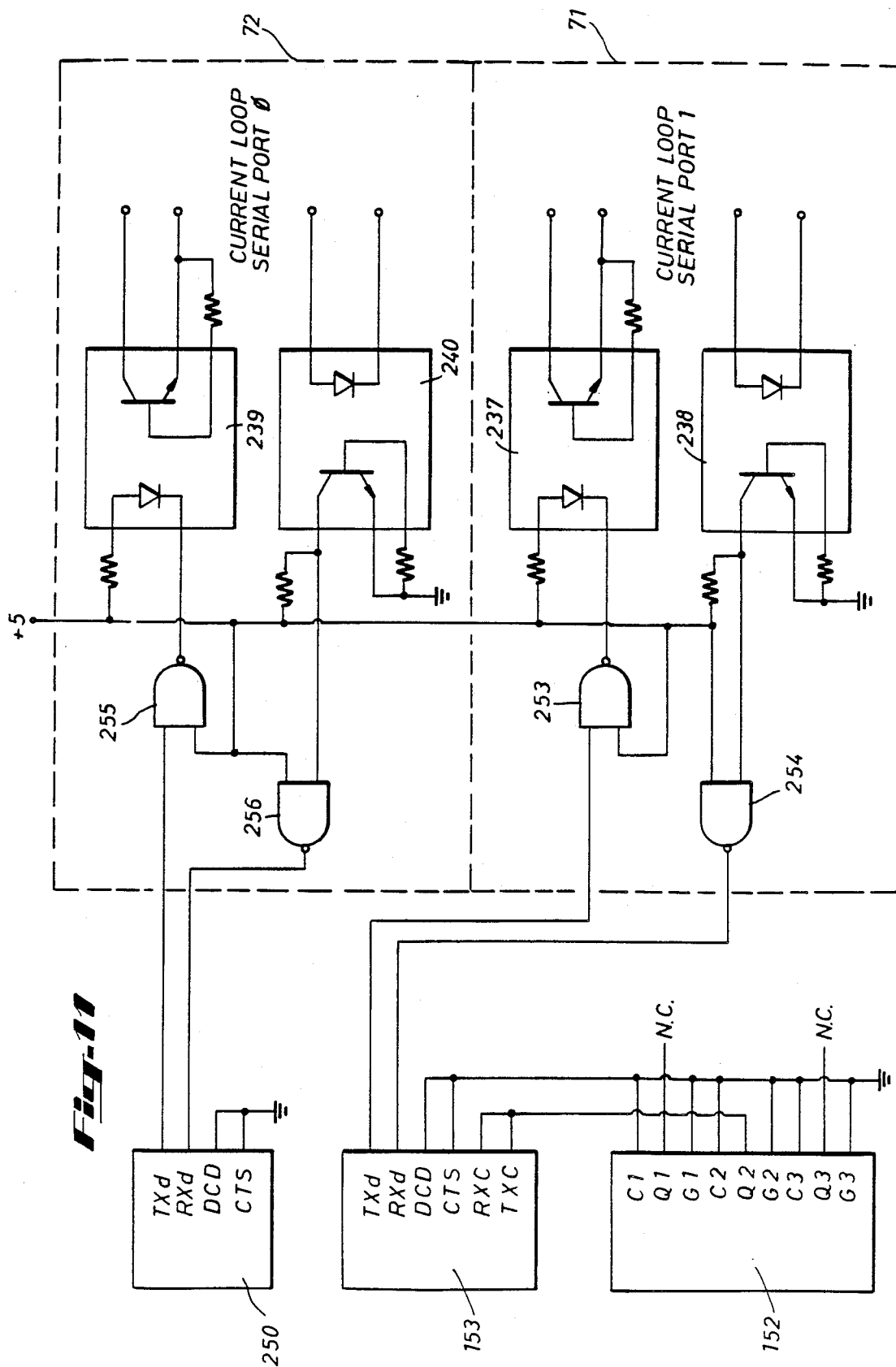
FIG. 11 is a schematic diagram illustrating the serial ports circuit, and current loop interface circuits associated therewith.

The interface adaptor (ACIA) 153 is connected to the current loop interface 71, as shown in FIG. 11 and FIG. 1, but which is omitted from FIG. 6.

A crystal 157 is provided for the microprocessor 150 to determine the clock frequency. In a preferred embodiment, the crystal 157 is a 3.579545 MHz crystal.

A ROM size select jumper 169 is provided to accommodate different sizes of the read only memory.

The microprocessor 150 uses a 74155 chip 156 as a means for signaling the ROM chips 144 and 145, the RAM chips 146, 147, 148 and 149, the triple timers 151 and 152, the interface adaptors 153 and 250, and the parallel ports 154 and 155. The chip 156 functions as a means for decoding a three bit signal on control bit input lines 158, 159 and 160. The chip 156 has outputs 161, 162, 163, 164, 165, 166, 167 and 168. One of the outputs will go to a logic zero depending upon the three bit input appearing on control bit input lines 158, 159 and 160. This provides the CPU 50 with a means for signaling the ROM 51, RAM 52, timing function circuit 53, serial I/O controller 54 and parallel I/O controller 55 selectively, depending upon which device the CPU 50 needs to address.

If the microprocessor 150 is operating correctly and power is turned on, a signal on conductor 170 will enable the RAM chips 148 and 149.

Low priority interrupts may be communicated between the microprocessor 150 and the parallel ports 154 and 155, the interface adaptors 153 and 250, or the timers 151 and 152 along an interrupt request line 171. The microprocessor can elect to ignore or postpone response to interrupts which appear on the interrupt request line 171. The microprocessor 150 reads the polarity detector 64 to determine the polarity of the AC signal.

A read/write line 173 is used by the microprocessor 150 to determine the direction of the data bus 79.

In the embodiment illustrated in FIG. 6, the RAM chips 148 and 149 are used as battery back-up RAM.

Figure 7:
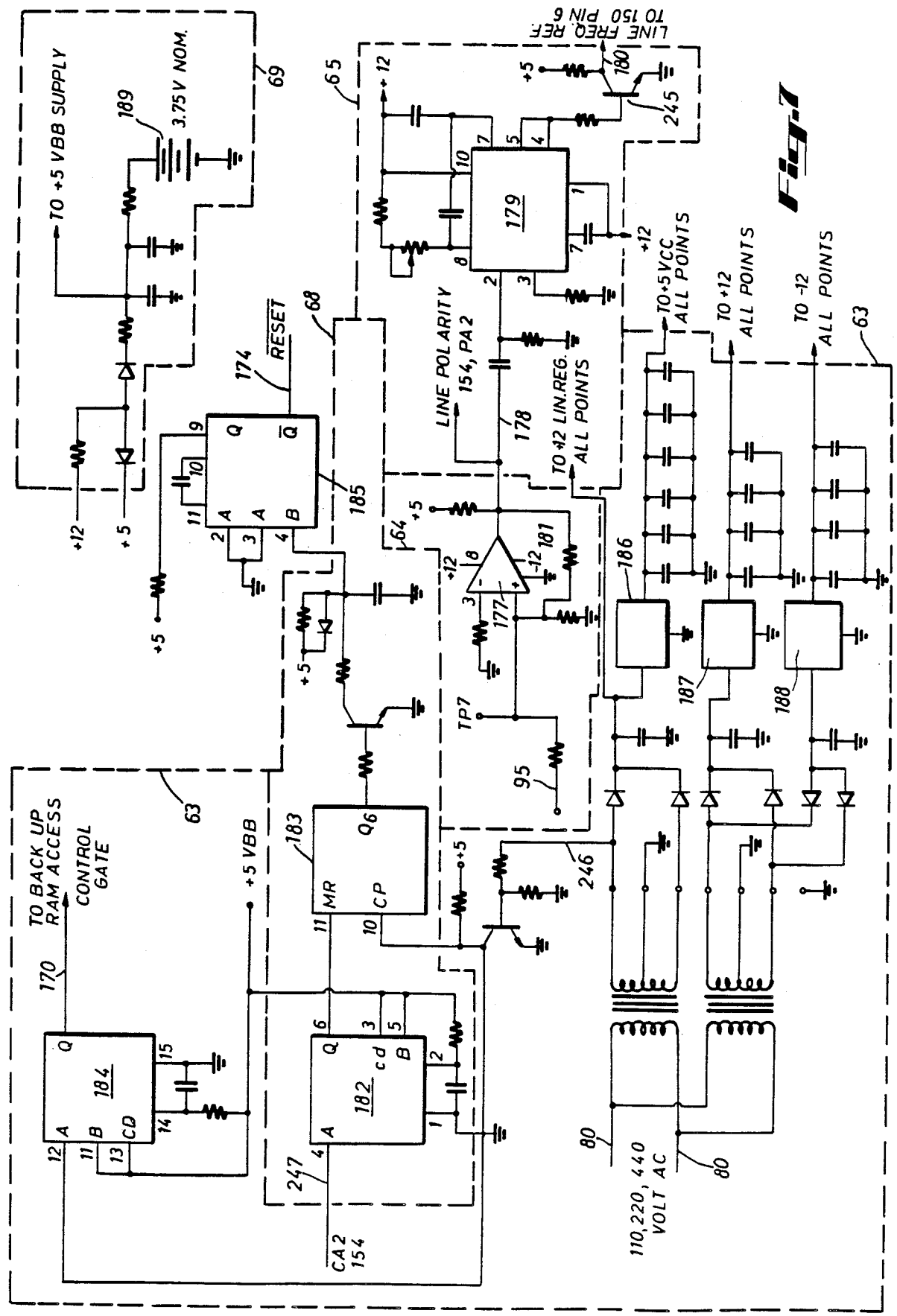
FIG. 7 is a schematic diagram illustrating the computer power supply, the phase locked loop and line polarity detector, the power on reset and watchdog reset circuit, and a portion of the battery backup circuit.

FIG. 7 illustrates in more detail the RAM battery back-up 69, the power supply 63, the phase locked loop 65, and the auto reset and watch dog timer circuit 68.

The phase locked loop 65 receives an input by conductor 95. The input signal is routed through a comparator 177. The output 178 of the comparator 177 can be used to detect the polarity of the alternating current signal on conductor 95. The output 178 of the comparator 177 is fed to an NE565 chip 179. The chip 179 will generate a sync output signal on conductor 180. The sync output signal may then be used to determine the period (and thus the frequency) of the alternating current signal. The sync output 180 provides non-maskable interrupts to the microprocessor 150. The transistor 245 is used as a level shifter. A resistor 181 is used to provide hysteresis to de-bounce the signal from the transformer 57.

The auto reset and watch dog circuit 68 includes a one shot 182, a twelve bit binary counter 183, and a one shot 185. In the illustrated example, a 60 Hz count pulse is provided on conductor 246. If left to continue counting, the counter 183 would count up its maximum value and generate a reset signal on conductor 174 through one shot 185. However, if the CPU 50 is functioning properly, every few moments it signals on line 247 through one shot 182 to reset the counter 183. This keeps output Q6 of the counter 183 from going "high", which would generate a reset signal on line 174. The software program control is written so that the counter 183 will be reset periodically so that it never reaches its maximum value. However, if noise interference, radio frequency interference, or other factors cause the CPU 50 to hang up or get "lost," the CPU 50 will in most cases fail then to reset the counter 183 and a reset signal will be generated on line 174 to reset the CPU 50.

The power supply 63 includes a one shot 184 to provide an enabling signal to back-up RAM. A five volt voltage regulator 186, and two twelve volt voltage regulators 187 and 188, are also provided.

The battery back-up circuit 69 includes a battery 189 which is connected to RAM chips 148 and 149.

Figure 8:
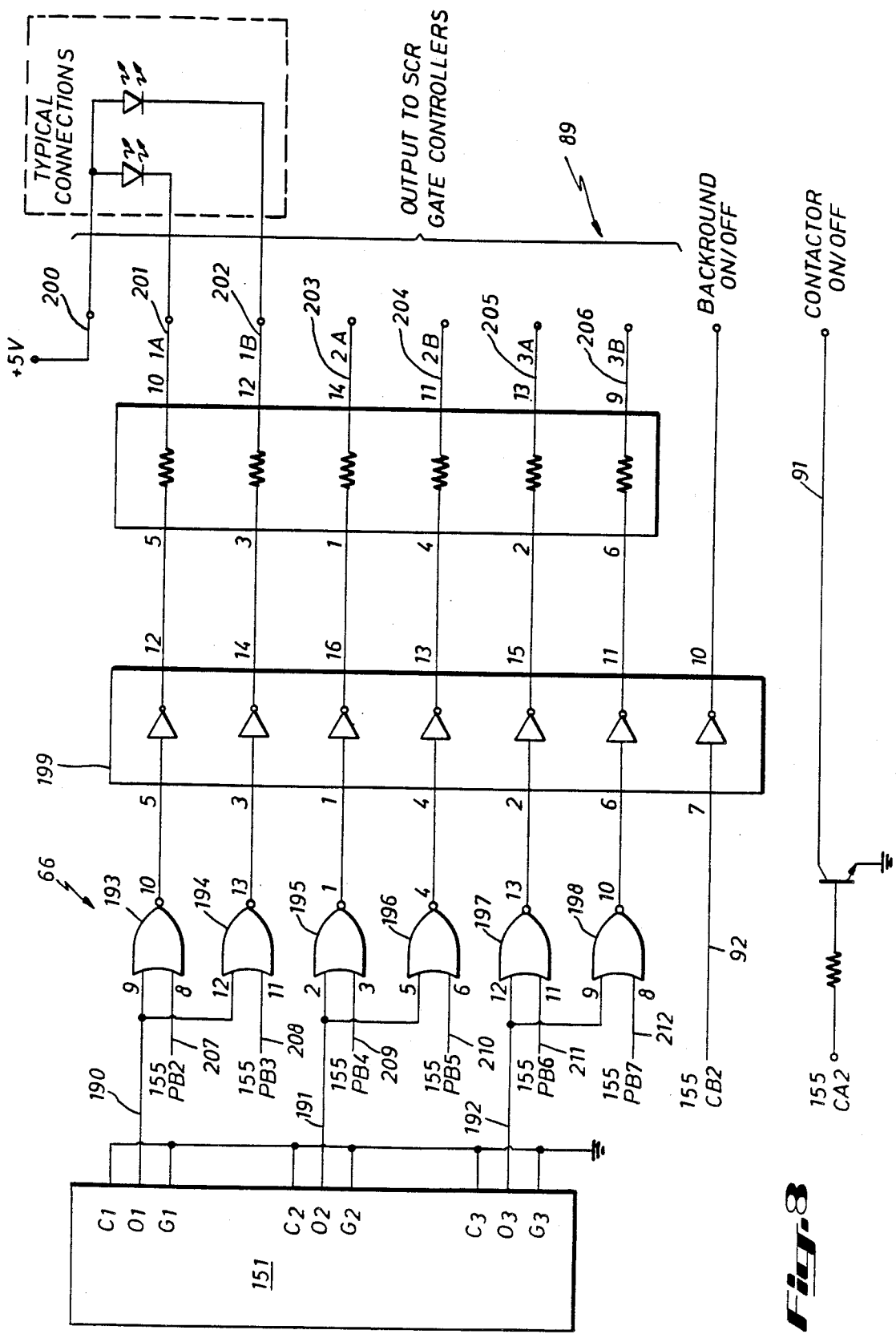
FIG. 8 is a schematic diagram illustrating the SCR timers and the SCR firing signal multiplexer.

FIG. 8 illustrates in more detail the SCR firing signal multiplexing network 66.

The microprocessor 150 selects a digital number to be loaded into each of the three timers contained in the triple timer 151. Each timer corresponds to one of the three phases. The multiplexing circuit selects one of two SCRs 100 which share the same phase.

When the microprocessor 150 loads a number into one of the counters 151, the counter begins to count down or decrement until it counts to zero. When the counter reaches zero, the timer output 190 (in the case of the first timer) changes logical state from a logical one to a logical zero.

In the case of the first timer, when the timer counts to zero, the first timer output line 190 will change from a logical one to a logical zero. This signal will be fed to a NOR gate 193 and NOR gate 194. One of the NOR gates 193 or 194 will be enabled by an enable signal on NOR gate enable line 207 or 208. The NOR gates 193 and 194 provide multiplexing means for selecting the appropriate SCR to be fired when the first counter decrements to zero and generates a logical transition at the first timer output 190.

The signal from either gate 193 or 194 is coupled through a bank of drivers 199 and a bank of resistors 200 to gate signal line 201 or 202 respectively. Gate signal line 201 is connected through an SCR gate controller to one of the SCRs 100. Similarly, gate signal line 202 is connected through an SCR gate controller to one of the SCRs 100.

The second timer output 191 and the third timer output 192 are similarly coupled to an appropriate SCR 100 through multiplexing means including NOR gates 195, 196, 197 and 198.

As will be explained more fully hereafter, the microprocessor 150 selects the appropriate value to be loaded to the three timers in the triple timer circuit 151 in order to generate timer output signals at the first, second and third timer outputs 190, 191 and 192 at an appropriate time to fire the SCRs 100 in a manner which will achieve the desired level of current or voltage.

Figure 9:
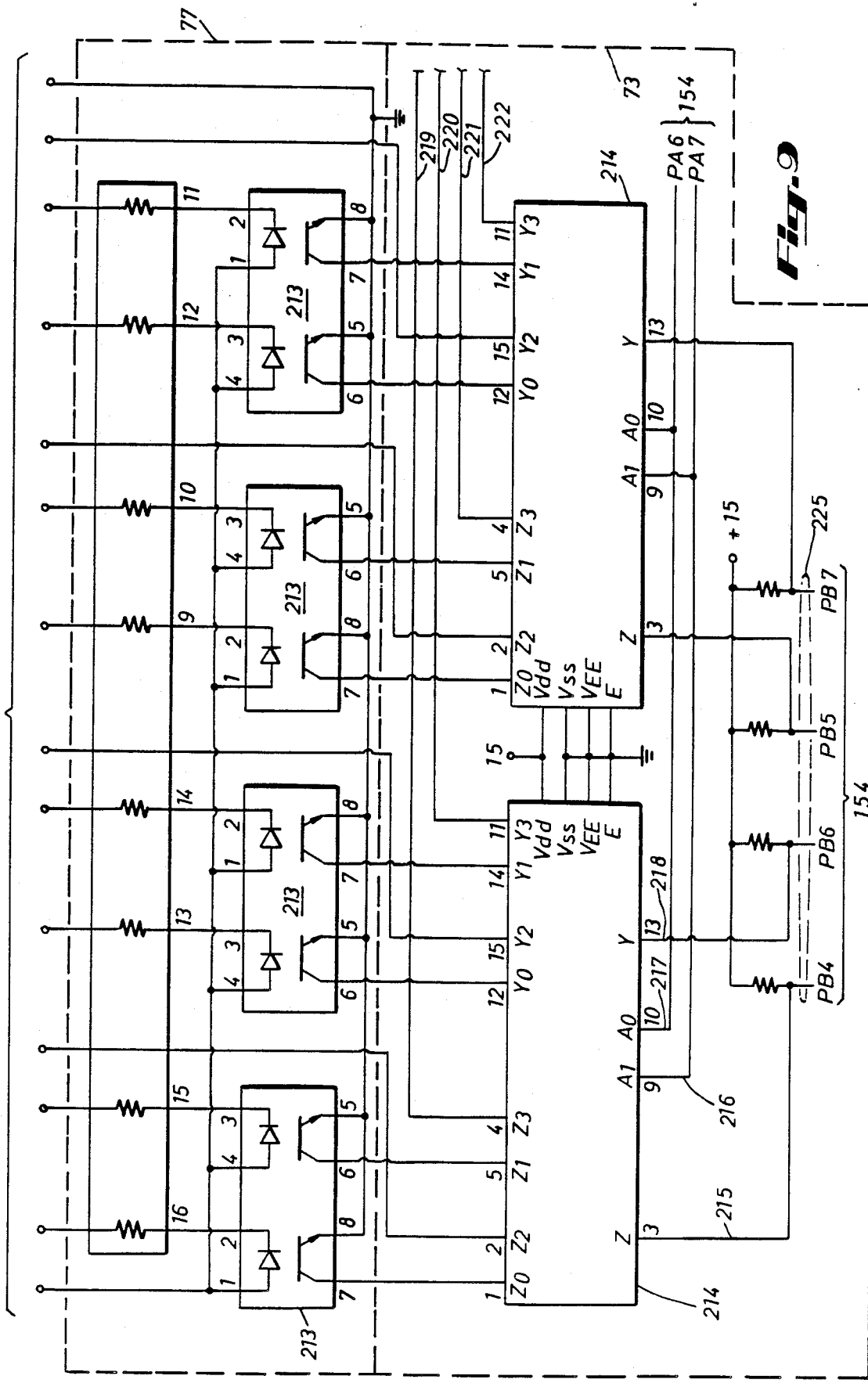
FIG. 9 is a schematic diagram illustrating the parallel port multiplexer and the opto-isolators circuit.

The parallel port multiplexer 73 and the opto-isolators 77 are illustrated in further detail in FIG. 9.

The opto-isolators 77 shown in the illustrated embodiment include four dual opto-isolator chips 213. The dual opto-isolator chips 213 are connected to external contact closures, such as panel switches, wire feed trigger switches, overhead trigger switches, and other external switches which provide input to the CPU 50. The dual opto-isolator chips 213 are fed into dual four input analog switches 214, which provide clean, bounceless signals which are more readily processed without error by the CPU 50.

The analog switches 214 function as the parallel port multiplexing circuit 73. The outputs 215 and 218 are selectively connected depending on the combination of bits appearing on select lines 216 and 217. The outputs 215 and 218 may then be selectively fed through the parallel I/O controller 55 to the CPU 50. Information is fed to the CPU 50 through a parallel port connected to cable 225.

Figure 10:
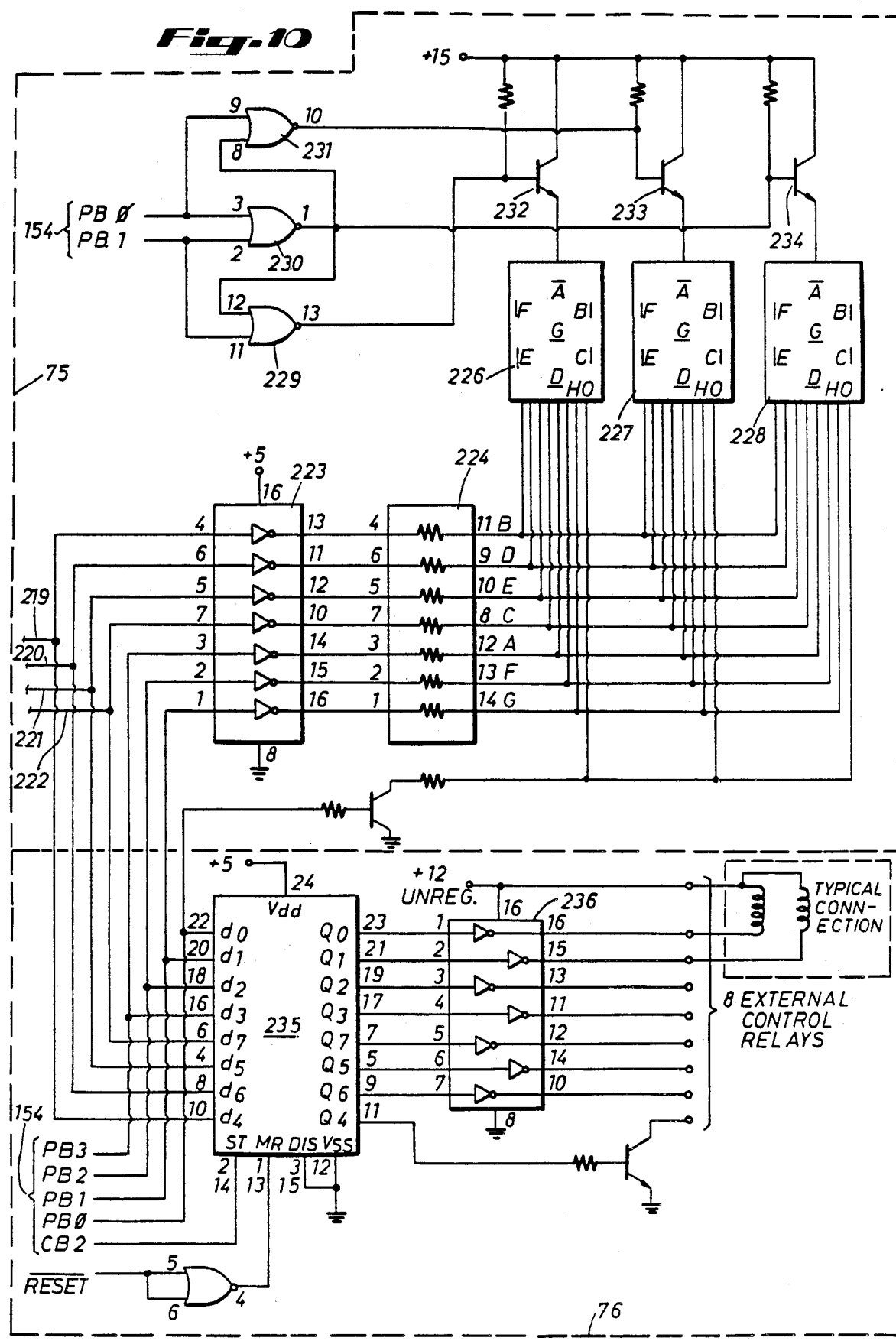
FIG. 10 is a schematic diagram illustrating the output displays and relay drivers circuits.

Driver bank 223 and resistor bank 224 illustrated in FIG. 10 are used to drive LEDs 226, 227 and 228 used for output displays 75. The LED displays 226, 227 and 228 are multiplexed using multiplexing means including gates 229, 230 and 231, and transistors 232, 233 and 234.

The relay driver circuit 76 is illustrated in further detail in FIG. 10, and includes an eight bit latch 235 and a driver bank 236. The output from the driver bank 236 may be fed to external contact relays to control the positioning of a workpiece, the feeding of wire during a welding operation, the actuation of the flow of inert gas to use as a shield during welding operations, etc.

FIG. 11 illustrates in further detail the current loop interfaces 71 and 72, and the interface side of serial I/O ports 153 and 250.

The asynchronous communication adaptor (ACIA chip) 153 is gated through NAND gates 253 and 254 to opto-isolators 237 and 238, which forms current loop 71. Section 2 of timer 152 generates the baud rate for ACIA chip 153. (Section 1 of timer 152 is used to generate interrupts at six times the line frequency.) Section 3 of timer 152 is used to measure the period of the phase locked loop 65, and thus the period of the AC line waveform.

The ACIA chip 250 is similarly gated through NAND gates 255 and 256 to opto-isolators 239 and 240, which forms current loop 72. The baud rate of serial I/O port 250 is determined by the circuit illustrated in FIG. 12. A square wave clock signal is coupled along clock line conductor 176 to JK flip flops 251 and 252. The flip flops 251 and 252 are configured to provide a divide by three function. This divided down signal is coupled along conductor 248 to a binary counter 249. The baud rate for serial I/O controller 250 is determined by the manual baud rate selector switch, indicated generally by the reference numeral 257. This is fed to the serial I/O controller 250 on line 258.

The clock for the A/D converter 67 is also conveniently provided by the baud rate circuit for the serial I/O controller 250.

It is desirable in a microprocessor controlled arc welding supply, to achieve an optimum trade off between hardware and software. If too much is left to the software, the program can become compute bound. Since this invention involves the real time control of welding operations, the apparatus is unlikely to function properly if it become compute bound. In the disclosed apparatus, interrupts are generated at six times the line frequency. The software must perform the task assigned to it fast enough so that it can adequately process the interrupts which are generated.

The disclosed apparatus senses the voltage and current. This is accomplished by the current and voltage sense elements 62. The CPU 50 processes this information by comparing it with the desired current or voltage level. The CPU 50 determines the amount of correction which must be signaled to the timing function circuit 53 so that the correct adjustment may be made in the firing signals fed along conductors 90 to the SCR bank 58 to adjust the welding signal appearing on conductor 98. The CPU 50 determines an appropriate adjustment to the amount of delay which is allowed to elapse between the moment in time that an SCR becomes forward biased, and the moment in time that a firing signal is sent to the gate 103 of the SCR 100 to cause it to conduct or "fire".

A significant feature of the present invention involves the use of look-up tables to determine the amount of adjustment which should be made to the SCR firing angles in order to correct the output on the common welding lead 81. Look-up tables are preferably precalculated and placed in RAM 52 prior to welding in order to save computer time.

The implementation of these and other features is accomplished in the illustrated embodiment. A review of the software program will assist in understanding the implementation of these features, a listing of which is appended hereto and labeled "Listing No. 1". The attached listings are incorporated herein by reference.

Consider, for example, that the arc welding supply is running in a constant voltage mode. The circuit would sample and store the value of the voltage at a particular moment in time, which value we may refer to as $V_t$. The next voltage sample may be referred to as $V_{t+1}$. At any particular moment during a welding procedure, the apparatus will have in memory a most recent voltage sample value $V_{t+1}$ and a previous sample value $V_t$. In a preferred embodiment, the apparatus will average $V_{t+1}$ and $V_t$, which we may refer to as $V_{avg}$. The apparatus will then compare $V_{avg}$ with a reference voltage, which we may refer to as $V_{ref}$.

The reference voltage $V_{ref}$ represents the value that the voltage should have at that particular moment in time. In a constant voltage mode, of course, the value of $V_{ref}$ will be constant. However, it should be appreciated that $V_{ref}$ may change over time. For example, the voltage may be programmed to ramp from one value to another at a specified rate. In such an example, $V_{ref}$ will change over time, and the circuit will operate to adjust the welding voltage output to ramp in accordance with the changes in $V_{ref}$.

In a preferred embodiment it is also desirable to determine the first derivative of the voltage or current, as the case may be. More specifically, the first difference is determined for successive voltage samples. The first difference is computed as $V_{t+1} - V_t$.

It is undesirable to compute according to an algorithm the amount of adjustment which should be applied to the angle at which the SCRs 58 are fired. To do so would involve too much compute time and would not represent an optimum trade off between the hardware and software, which is critical in this invention. Significantly, in this invention look up tables 400 are utilized for determining the correction which should be applied to the SCR firing angles. An error is computed based upon the formula:

$V_e = V_{avg} - V_{ref}$ and a first difference is computed based upon the formula:

$$V_d = V_{t+1} - V_t$$

The CPU 50 uses the value of $V_e$ to point to a location in a look up table 400 which contains the value by which the SCR angle should be changed. The CPU 50 then takes the value obtained from the table 400 and transfers it to the timing function circuit 53 so that the value may be used to change the amount of delay used to determine the SCR firing angles.

The appropriate value in the look up table 400 for a given $V_e$ will vary based upon the value of the first difference $V_d$. Thus, the value of $V_d$ is used to determine which table 400 should be used by the CPU 50. That is, one table 400 is provided where $V_d$ is negative. A second table 400 of look up values is provided where $V_d$ is positive. The CPU 50 first selects the appropriate table by examining the value of $V_d$, then selects the appropriate element of the look up tables 400 by examining the value of $V_e$.

Alternatively, this process may be conceptualized as a two dimensional table 400 in which $V_d$ is used to determine the column and $V_e$ is used to determine the row of the appropriate element whose value is used by the CPU 50 to signal the timing circuits 53 to adjust the firing angles of the SCR bank 58.

The look up tables 400 utilized in the preferred embodiment of the invention provide the speed which is necessary for an effective implementation of real time control of arc welding functions utilizing the features of the present invention. Although the above description is with reference to a constant voltage mode, the same principle applies for a constant current mode. The value of the elements in the look up tables 400 may be determined empirically.

In other words, it is desirable to provide a strong correction table and a weak correction table. The strong correction table provides a table of correction factors which provide relatively strong corrections to the variable, such as voltage or current, which is being controlled. Conversely, a weak correction table provides a table of weak correction factors which are applied to yield relatively weak changes in the factor, such as voltage or current, which is being controlled. The appropriate table may be selected by comparing the current voltage sample $V_{t+1}$ (or $V_{avg}$) with the reference voltage $V_{ref}$ to determine whether the voltage is above or below the desired setting. Then the first difference $V_d$ is examined to determine whether the voltage is rising or dropping. These two factors are used to determine whether the voltage is moving toward or away from the desired setting $V_{ref}$. If the voltage is moving toward the desired voltage setting, a weak correction table is used to adjust the voltage. If the voltage is moving away from the desired setting, the strong correction table is selected.

For example, if $V_{avg}$ is greater than $V_{ref}$ and $V_d$ is positive (indicating that the voltage is rising), the CPU 50 selects the strong correction table as the appropriate table to use as a look up table because the voltage sample is above the desired setting and rising, and is thus moving away from the desired setting.

The sign of the error $V_e$ is used to determine whether to add or subtract the adjustment which is provided by the look up table. The number which is obtained from the look up table is used as an adjustment which is applied to the current firing angle of the SCR bank 58.

Circuit operation may be best understood by referring to the software listing which is appended hereto and incorporated herein by reference. Skipping over the initialization procedures and service routines, the most recent voltage sample is picked up and processed by the steps near the label "DISOUT". The value of $V_{avg}$ is first computed. The value of the previous sample $V_t$ is stored in memory location labeled "DVSAM+3". This value is loaded in accumulator B. The current sample $V_{t+1}$ is then loaded from accumulator A into memory location "DVSAM+3". This saves the value of $V_{t+1}$, which will become the previous sample value for the next time $=t+2$.

The first difference is computed and stored in memory location "DVSAM+1". The sign of the first difference is stored in memory location "DVSAM+2". $V_{avg}$ is stored in memory location "DVSAM".

In a preferred embodiment, the values of memory locations which are used to output information to output display 75 are also updated.

It is desirable to be able to select a constant current or constant voltage mode without requiring hardware reconfiguration of the apparatus. In the present invention, this is significantly accomplished by software control. Specifically, the routine labeled "RAMP6" selects constant voltage or constant current operation of the apparatus. Importantly, this invention also allows for operation in other modes. For example, the apparatus is capable of operating in a constant power mode where the power (which is the product of the current times the voltage) is held constant.

In the example of a constant voltage mode, control branches to the routine labeled "FIXCV". It will be recalled that the value of $V_{avg}$ was previously loaded in memory location "DVSAM". The contents of DVSAM are loaded into accumulator B. The contents of accumulator B are then compared with the value of $V_{ref}$, which is stored in memory location "SETING". Program control then branches to routines "DECRV" or "INCRV" based upon the results of the comparison. If $V_{avg}$ is higher than $V_{ref}$, program control branches to routine "DECRV". Conversely, if $v_{avg}$ is less than $v_{ref}$, program control branches to routine "INCRV".

In the case where program control branches to routine "INCRV", the value of $V_{ref}$ is loaded into accumulator A. The apparatus then computes the value of $V_{avg} - V_{ref}$, which is the value of $V_e$. The circuit then loads register X with the contents of memory location "#TERRNM". Accumulator B is loaded with the contents of memory location "DVSAM+2", which contains the sign of the difference $V_d$.

The contents of accumulator B are shifted right one bit. Program control then branches on a carry clear (which is one means for branching depending on the sign of the first difference $V_d$). If the carried bit is not clear, then the next statement will be executed which causes the contents of memory location "#TERRM" to be loaded into register X, and consequently overwritten over the previous contents of register X. Then, in any event, program execution branches to routine "TVLOOK" which looks up the appropriate value of the table.

These steps are intended to load into register X the address of the first value in the appropriate look up table. The memory location "#TERRNM" contains the address of the first value in the strong correction table. The memory location "#TERRM" contains the address of the first value in the weak correction table. Thus, if the program logic determines that the strong correction table is not needed, the address of the first value of the weak correction table is overwritten over the previous contents of register X.

The routine "TVLOOK" takes the value of the error in the voltage $V_e$ which is at that time contained in accumulator A and adds it to the value of the address of the first element of the look up table (which at this time is in register X). This operation then gives the address of the table location which contains the correct adjustment value to be used to adjust the firing angles of the SCRs 58.

After returning from routine "TVLOOK", control then branches to subroutine "INCR". Routine "INCR" is used to modify the firing angle of the SCRs 58 and applies the correction to the firing angle of the SCRs which is obtained from the look up table. The routine subtracts the adjustment to the firing angle and then returns.

Similarly, if $V_{avg}$ were higher than $V_{ref}$, control would have branched to routine "DECRV". In order to obtain a positive result, the order of subtraction of $V_{avg}$ from $V_{ref}$ is reversed in subroutine "DECRV". After branching to subroutine "TVLOOK" to look up the appropriate value for the look up tables, control branches to subroutine "DECR" which modifies the firing angle of the SCRs 58 by adding an adjustment to the firing angles.

Although the above example is described with reference to voltage, program control is similar in the example of a constant current control mode. In such a case, the routines "FIXCA", "INCRA", and "DECRA" are utilized along with subroutines "TVLOOK", "INCR" and "DECR" to determine the appropriate correction to the firing angles of the SCRs 58.

The look up tables, or error correction tables, may be calculated and set up in the case of voltage corrections, by the routine labeled "CALCVT", and subsequent routines. A separate voltage look up table is computed for converging voltage values, and for diverging voltage values, which are preferably calculated prior to welding to save computer time. In the case of current control, such as a constant current mode, look up tables or error correction tables may be calculated and set up using the routine "CALCAT" and subsequent routines. The tables are preferably precalculated to save computer time. A separate error look up table is provided for a converging current circumstances, and for a diverging current.

The look up tables may be modified during welding in order to empirically adjust the calculated values based upon results experienced while welding. This could be done during welding by the CPU 50. This would take the form of an artificial intelligence routine, where the CPU 50 evaluated the results of a correction applied to the firing angles of the SCRs 100, and used the results of that evaluation to "learn" a better adjustment parameter which would more closely approximate the adjustment parameter that was necessary to bring the welding output into correspondence with the reference value that was desired. A simple form of such a routine would be to add or subtract, as appropriate, a small amount from an adjustment parameter anytime that use of the adjustment parameter failed to bring the welding output into correspondence with the reference value (within predetermined tolerances, if desired). In other words, the CPU 50 could "tweak" the values in the look up tables and, in effect, make itself "smarter" as it modifies the tables on the fly during welding.

The routines beginning with the label "LINEIN" are used to read in and interpret user commands which are used to establish mode of operation and configuration, and, for example, to set values such as $V_{ref}$ which will be used for program control. In the case of a constant current mode, the user commands may be used to set the value of $I_{ref}$.

User commands may take the form of eight different types of commands. The different types of commands are "A" commands, "C" commands, "F" commands, "H" commands, "P" commands, "L" commands, "U" commands, and "Y" commands. These various commands form what may be referred to as the "user code".

Some examples of user commands are given in "Listing No. 2", which is incorporated herein by reference. "Listing No. 2" contains a listing of user codes to initiate a MIG welding procedure using the present invention. The left column contains line numbers. The center column contains the user code. The right column contains explanatory comments which describe the action taken by the welding apparatus in response to each user command.

Each user command has a two digit suffix, and a three digit operand field.

"A" commands are commands to set amps in the welding apparatus. "A" commands take the form:

Ann XXX where the letter "A" identifies the command as an "A" command, "nn" is a two digit suffix which identifies the particular "A" command that is used, and "XXX" is a three digit operand field. For example, "A00 XXX" sets the amps to zero (the operand is not used in this command).

The command "A01 XXX" sets amps equal to the value "XXX" (which must be in the range 0–255 amps). That is, the command "A01 050" would set up a constant current mode where the current was set equal to 50 amps. The command "A11 XXX" achieves the same function, except that "XXX" may be 0–510 amps. "A21 XXX" is similar, but "XXX" may be 0–996 amps.

The command "A02 XXX" will ramp to a current setting of "XXX" amps (0–255 amps). The ramp time must have been previously set with an appropriate ramp command. The command "A03 XXX" is similar, but program execution will not continue until the amp setting is reached. The range of amps that may be ramped to is increased to 0–510 amps for the "A12" and "A13" commands. The range is 0–996 amps for the "A22" and "A23" commands.

The command "A04 XXX" is used to compare the value of amps (where "XXX" is 0 to 255 amps), and is executed prior to a branch command which tests the results of such comparison and branches accordingly. Similarly, the commands "A14 XXX" and "A24 XXX" extend the range of comparison to 0–510 amps and 0–996 amps, respectively.

The commands "A05", "A15", and "A25" are used to set the bio-feedback off limit. These commands set the amps at which welding power will down slope or shut down when output current falls or passes through this limit. Of course, the commands take the form "A05 XXX". The biofeedback mode must have been previously turned on.

The commands "A06", "A16" and "A17" set the biofeedback high limit. These commands set amps to an upper limit, when in the bio-feedback mode, which the output current cannot exceed while welding.

The "C" commands are also referred to as "GO TO" commands. The command "C01 XXX" branches unconditionally to an even line number given by the operand "XXX". It can be in the range 0–998.

The command "C02 XXX" is a branch if true command. It must be preceded by a test or compare command. If the test or compare returned a true condition (or "1"), then execution will branch to the even line number set in the operand "XXX". The test flag is used by this command. If the test flag is a "0", i.e., the test was false, execution passes to the user command on the next even line. The command "C03 XXX" is just the opposite, and will branch if false.

The command "C04 XXX" will branch if equal. It branches based on a test of a previous test or compare statement. The compare statement and branch statement must be in the same format, i.e., amps, volts, counter, etc. The command "C05 XX" will branch if greater than. For example, if the voltage output of the apparatus is greater than the compare value, the program execution can be made to branch with this command. The "C06 command is similar, but the effect is branch if less than.

The commands "C07" and "C08" branch if the counter is 0, or not equal to zero, respectively. "C09" will cause a branch if the arc circuit is open, i.e., the arc failed.

Other "C" commands include "C10" (branch if ramping), "C11" (branch if clock elapsed), "C12" (branch if clock not elapsed), "C13" (branch subroutine), and "C14" (set start point for beginning execution of program).

The "F" commands are peripheral commands. The "F" commands may be used to generate the communication of digital data to the serial output ports 84 or 85. This data can be interpreted by a peripheral device to perform some function, such as turn on a motor to position the part to be welded, rotate a turntable at a predetermined speed, feed wire at a predetermined rate, etc. In the form "Fnn XXX" the command may be used to send device "nn" the message "XXX", which may be coded as desired for the particular device used. The command "Fnn XXX" may be used to signal motor "nn" to rotate at speed "XXX".

The "H" commands are miscellaneous commands. "H00" is a no operation command, or null command. "H01" is a halt command, and waits for a manual stop or hand reset. "H02" stops execution of a program. "H03" causes the program to single step.

"H04 XXX" increases the counter by "XXX" (0-255). "H05 XXX" decreases the counter by the value of the operand "XXX". "H06 XXX" may be used to set the counter to the value "XXX" (0-255). "H07 XXX" compares the counter to the value "XXX". This command is used immediately prior to a branch command.

The command "H08 000" turns the background supply 60 off. The command "H08 001" turns the background supply 60 on. Similarly, "H09 000" turns the main contactor 56 off, and "H09 001" turns the main contactor 56 on.

The commands "H10" and "H11" increase or decrease respectively, the volts or current, setting a taper condition.

The command "H13" is a subroutine return.

The command "H18 000" turns off the bio-feedback loop. The command "H18 XXX" turns on the bio-feedback loop, where XXX is not equal to 000. The operant "XXX" sets a slow response time or slow steps if low, and a fast response time, large steps and very sensitive response if "XXX" is high. The operand "XXX" may be in the range of 0–255.

The "L" commands are time commands. For example, the command "O01 XXX" sets a delay for "XXX" seconds. For the L01 command, "XXX" may not exceed 25.5 seconds. The command "L11" allows a delay in the range of 0–255 seconds. "L" commands may be stacked for longer delays. "L02" sets the clock and proceeds. "L12" sets the clock in the range 0–255 seconds and proceeds.

The command "L03 XXX" sets the ramp time. The operand "XXX" may be 0–25.5 seconds. Usually used immediately preceding a ramp command, such as "A02 XXX". "L13 XXX" is a similar ramp function, where "XXX" is 0-255 seconds.

The "P" commands are test commands, and usually precede a branch command. "P02" tests a local switch "x" to determine if it is closed. In "Listing No. 2", this command is used to determine whether a turntable has been rotated to the proper position to open a microswitch, used to signal when the turntable is positioned properly for the weld. The operand "x" may be 1-8. The commands "P03" to "P31" similarly test banks of eight switches selected individually by an operand "x".

The "U" commands are voltage commands. The command "U01 XXX" sets the voltage to a value "XXX" in the range 0 to 45.0 volts DC. The command "U02 XXX" ramps the voltage to the value "XXX" (0–45.0 v). An "L03" or "L13" command should immediately precede this command, to set the time of the ramp. Similarly, "U03 XXX" ramps the voltage and waits. "U04 XXX" is used to compare the voltage output of the apparatus with the operand "XXX". The "U04" command is usually used immediately preceding a branch command.

The "Y" commands are relay commands. "Y01" opens all relays. "Y02 XXX" will close local relays 1–8 for "XXX" =1–8, will close all 8 local relays for "XXX" =9, will open local relays 1–8 for "XXX" =11–18, and will open all local relays for "XXX" =19. Similarly, commands "Y03" to "Y31" will open or close banks of eight individually selectable relays for each instruction.

The user code is used to control the resilient operating program, referred to as the "executive code", which is listed in "Listing No. 1". Welding procedures are programmed using the user code, which is placed in the RAM 52. In the illustrated embodiment, the RAM 52 has a capacity of 1000 lines of user code, with each line consisting of three characters or digits. User program lines are numbered 000 to 999. In the illustrated example, even numbered lines are executable commands, for example, of the form "Ann". Odd numbered lines contain a three digit operand for the preceding even numbered line.

Programs may be manually loaded into RAM 52 by switches 74, preferentially four switches 74. Line numbers and program contents may be displayed on the LEDs. Each switch 74 may have a specific function.

The input switches 74 may be used to increase or decrease voltage or current, start execution, stop execution, modify the user code and program, load a new program, dump an existing program, etc. The user code in RAM 52 may be sent to a remote printer, tape punch, cassette tape, disk drive, magnetic tape drive, terminal, or computer for storage or recording for future use. Similarly, user code programs may be loaded into RAM 52 from similar such devices (including a card reader, paper tape reader, keyboard, as well as many of the above listed devices).

The present invention includes the significant feature of having the capability of switching from a constant current mode to a constant voltage mode, or vice versa, during a weld, without extinguishing or disturbing the arc. An example of this is shown in the user code of "Listing No. 3", which is incorporated herein by reference.

The MIG torch is switched down and local switch 1 tested until the torch locks in place. The command "Y02 005" closes relay 5 of switch bank 2 to switch the MIG gas on (i.e., the inert shield gas). The command "L01 02.0" delays for 2 seconds to allow the gas to purge air from the MIG torch. The command "Y02 006" closes relay 6 to switch the wire on. The command "U01 05.0" changes the voltage to 5 volts. The oscillator is switched on. The command "C09 352" retries if the arc fails. The commands "L03 00.2" and "U03 19.0" then ramp to a constant 19 volts in 0.2 seconds (once the arc has started). After a delay of 1 second, motor 1 moves forward at 26 percent of its maximum speed (see command "F01 026"). Command "L11 060" at line 36 causes a delay of 60 seconds, while the welding apparatus continues to weld in a constant voltage mode.

The apparatus then switches to a constant current mode at line 362, with the command "A01 125" (which sets amps to 125 amps), without extinguishing the arc. The command at line 364 ("L11 060") then delays for 60 seconds while the welding apparatus continues to weld in a constant current mode.

The commands "F01 000" stops the motor, the apparatus delays 1.5 seconds (to finish the weld), the wire is switched off ("Y02 016"), and the apparatus ramps down to 0 amps in 0.3 seconds, with commands "L03 00.3" and "A02 00.0", at lines 372-375. The command "Y02 013" switches the oscillator off. After a delay of 4 seconds, the MIG gas is switched off with the command "Y02 015". Finally, the MIG torch is switched up with the command at lines 382-383, and the apparatus halts ("H02 000").

Thus, the apparatus can reconfigure itself from a constant voltage mode to a constant current mode, or vice versa, even during a weld, without requiring hardware reconfiguration or even extinguishing the arc.

A TIG touch start procedure is shown in "Listing No. 4", which is incorporated herein by reference. The procedure is explained by the comments to the right of each user command.

The present invention includes a method of controlling a welding apparatus, which includes one or more steps. First, the step of sensing a first welding sample may be performed. This welding sample may be a sample of a voltage reading, or a current reading. In the case of voltage, the value would be $V_t$. The second step of sensing a second welding sample would be performed. The second welding sample would similarly be indicative of either a voltage or a current. The second valve sensed would be, in the case of voltage, $V_{t+1}$.

The step of computing a first derivative parameter would be performed by setting $V_d = V_{t+1} - V_t$. That is, the first and second welding samples would be subtracted.

The step of computing a difference parameter would then be performed. The error parameter $V_e$ would be computed by subtracting the second welding sample from a predetermined control parameter $V_{ref}$.

The step of looking up an adjustment parameter from a table of predetermined correction factors would be performed. The location of the table which would be used to yield the correction factor would be determined by using the computed values $V_d$ and $V_e$.

The value returned from the look-up table would then be used to adjust elements which control the welding current or voltage. The timing circuits controlling the firing angle of the SCR bank 58 would be updated by the CPU 50 using the adjustment parameter.

The present invention also includes a method for touch starting the arc welding supply, for example, in a TIG welding mode. The steps of such a method may include the steps of setting a small voltage, for example ½ volt or 1 volt, between the work piece and the welding lead. (Note that, in contrast with the present invention, a conventional welding power supply would be at maximum voltage on the order of 80 volts at this point.)

The step of touching the tip to the work piece would then be performed. The current would be sensed to determine when the current started to flow, or the voltage could be sensed to determine when the voltage dropped to zero (indicating that the tip was shorted to the work piece). When current starts to flow, the welding power supply should be set to provide 1 amp constant current, or some other predetermined value which is preferably low. If desired, background voltage supply could be turned on, when setting the 1 amp constant current mode. The tip could be withdrawn slightly from the work piece in order to draw a thin weak arc. Note that in a conventional welding power supply, the current jumps to the set current value, which can result in a spot weld and the electrode can stick to the work piece.

The method includes the step of sensing the current or voltage to determine whether a thin arc has been successfully drawn between the work piece and the welding tip. If the flow of current is sensed (which will be held) at a low value) then a thin arc has been successfully drawn. If the flow of current is not sensed, then the background voltage should be turned off, and the procedure should return to the initial step of no current and a low voltage on the order of 1 volt.

If a thin arc is successfully sensed, the step of ramping up the current to a predetermined desired value for welding may be accomplished. A typical current level desired may be on the order of 100 amps at 15 volts.

Conventional methods which have been attempted to start a TIG welding procedure include the use of high frequency pulses on the order of 15,000 to 20,000 volts. These high frequency currents can emit significant electromagnetic interference which can cause the malfunction of a robot welding device, as well as other equipment sensitive to EMI or RFI. Conventional attempts to scratch start can damage the tungsten tip of the welding electrode, as well as contaminate the work piece metal with tungsten.

It is desirable in a MIG touch start procedure to first heat the wire white hot momentarily to soften it before ramping up to full current. This lessens the tendency of the wire to "explode", and results in a smoother transition into the weld.

The present invention includes a preferred MIG start procedure. Such a procedure may include the steps of lowering the MIG torch, setting a constant voltage of a low predetermined value (such as 5 volts), switching the wire on, and testing for current. If the current equals 0, then the wire has not touched the part. The current is detected, and when it is not zero, the apparatus may, if desired, delay for a short predetermined period of time until the wire is, preferably, white hot. The voltage is ramped to a predetermined welding voltage over a predetermined period of time (for example, 19 volts). This will turn the wire to plasma and start the arc more smoothly than a conventional welding device, which is typically set at maximum voltage initially. The apparatus may communicate information through interfaces 71 or 72 which may be used to speed up the MIG wire feed rate to accomplish a smoother weld start.

The present invention also includes the method of arc tracking or seam tracking during a weld. Sometimes registering a part with a robot is a problem. It may oftentimes be desirable to detect the location of a seam in a part which is to be welded, and to constantly monitor tracking of the seam during welding. Using a feature sometimes referred to as arc length sensing, a robot can monitor welding conditions and interpret when the welding electrode is over the center of a seam which is being welded. The apparatus may monitor the voltage or current to determine whether the seam is being correctly tracked during welding. During a constant voltage welding mode, the current will be proportional to the length of the arc. During a constant current welding mode, the voltage will be proportional to the length of the arc. Thus, current or voltage can be monitored or sampled to provide information concerning whether welding is taking place correctly in the center of a seam, or whether the seam is not being properly tracked. Digital samples of parameters being monitored may be transmitted during welding to a robot or host computer so that corrections may be made for tracking purposes, as required.

The present invention also includes the method of bio-feedback. In this method, the voltage or current or both are sensed and a dip in the voltage or the current is interpreted by the CPU 50 as a command to increase or decrease the current or voltage a predetermined step value. Upper limits, as well as lower limits, may be set on the amount by which the voltage or current will be stepped up or down using bio-feedback. Bio-feedback may be used to eliminate the foot switches typically used with conventional TIG welding devices.

In an arc tracking mode, a change in the voltage or current may be interpreted as an indication that a command should be given by the CPU 50 to a robot device to correct movement of the work piece in a manner which will reestablish the correct value of voltage or current.

In a preferred embodiment, the welding transformer 57 is a constant voltage transformer. Tight coupling is provided between the primary and secondary windings. The transformer 57 is preferably designed to deliver high current, for example 1200 amps, at voltages on the order of 35 volts. The transformer 57 is preferably of a type which provides a very precise constant voltage.

Constant current can be achieved using the disclosed structure through software control.

The present invention provides the capability of being able to wander over a part, sensing a background voltage and evaluating the voltage sensed in order to detect the topography of a part, which may be interpreted to reveal a proper position in which to activate welding current, based upon an evaluation of the sensed voltage or current. The voltage would be proportional to the arc length, assuming a constant arc current. If the electrode is maintained at a fixed height as the robot wanders over the part, the arc length information will depict the shape of the surface of the part. A robot could use this feature to measure an unknown part, remember where a seam is detected to be located, and then weld a path recorded in memory based upon such measurements. Using the feature of arc length sense, a seam which is to be welded could be automatically tracked by a robot device, or otherwise.

As described above, six interrupts are generated for each period of the AC cycle (one interrupt for each SCR 100 that is to be fired). The six interrupts divide the period of the AC wave form into six subperiods, which under typical conditions are preferably equal. Each interrupt is used as a reference for firing each individual SCR 100. In some circumstances, it is desirable to make the subperiods unequal.

The present invention provides the capability of individual settings for the firing angle of each SCR. Thus, imperfections in individual SCRs may be matched, complex wave forms may be generated, and greater flexibility is possible. More significantly, this capability may be used to compensate for phase mismatches in a power source, where the three phase power, for example, is not at exactly 120 degree phase shifts.

One additional example of an application when this invention's capability of individually adjusting the firing angle for each SCR 100 has significant advantages, is a welding mode which may be referred to as a "low spatter MIG mode". This mode may be similar to a mode commonly referred to in the art as "pulsed spray welding".

The significant features of the low spatter MIG mode may be best understood by reference to two conventional MIG modes commonly referred to in the art as (1) the "short arc" mode, and (2) the "spray transfer" mode. In the short arc mode, the wire used for welding typically touches the part being welded as it melts into the molten pool of metal at the weld site. In the spray transfer mode, the wire melts into the molten pool without touching the part.

The low spatter MIG mode may be thought of as a hybrid mode. In the low spatter MIG mode, the apparatus effectively switches back and forth between a relatively high and a relatively low voltage. In practice, this results in a low voltage in between the instants when the wire is burned away or melted at high voltage. For example, where in a conventional welding procedure a welding device might run at 19 volts, the present invention might operate in the low spatter MIG mode rapidly switching back and forth between, for example, 15 volts and 28 volts (which might result in a nominal or average voltage of 19 volts).

The low spatter MIG mode may be accomplished in accordance with the present invention by staggering the firing angles of the SCRs 100. By doing so, the output waveform on the common welding lead 81 will typically have a sawtooth-like waveform superimposed upon the DC voltage output. The average firing angle of the SCRs, and the average voltage, may remain the same.

The low spatter MIG mode reduces spatter (i.e., the number of sparks flying from the weld). The low spatter MIG mode has the advantage of minimizing the amount of metal wasted due to spatter during welding. In some applications, this can be significant.

The low spatter MIG mode offers additional advantages which are believed to be even more significant. This mode is believed to result in less overall heat input to the metal part to be welded. The heat input per inch (of weld) should be significantly lower. High temperatures eat costly energy and can easily distort parts being treated, sometimes even requiring post-finishing machining to restore dimensional tolerances.

The low spatter MIG mode provides operation over a wide range of wire feed rates. In the disclosed apparatus, an operator may easily adjust the rate of welding by conveniently adjusting the wire feed rate (because the amps will be automatically adjusted by the apparatus). The operator will be able to conveniently adjust the amount of metal deposited during a weld, as desired. A relatively low deposition rate may be achieved with the present invention, as compared with conventional devices.

In the illustrated embodiment, the low spatter MIG mode may be accomplished by staggering the SCR firing angles. The SCR firing angles may be staggered using the user code commands "H14 XXX" and "H15 XXX". The command "H14" is used to set the value of the variable "DIG" used in "Listing No. 1" to adjust the amount of time that the SCR firing angles may be delayed or advanced. The command "H15" is used to adjust the staggering of the SCR firing angles by adjusting the value of the variable "RASP" in "Listing No. 1".

Referring to the sawtooth-like wave form that is superimposed upon the DC voltage output at the common welding lead 81, the variable "DIG" affects how high the sawtooth-like "teeth" are, while the variable "RASP" affects the spacing of the "teeth", and can be used to make the "teeth" further apart.

For example, the command "H14 001" sets "DIG" =1. This causes each SCR 100 to fire at a time spaced one unit from the mean firing time (determined by the six equal subperiods of the AC cycle). The command "H15 001" sets "RASP" =1 and results, in this example, in the first SCR 100 firing one unit of time-early, the second SCR 100 firing one unit of time late, the third SCR 100 firing one unit of time early, the fourth SCR 100 firing one unit of time late, the fifth SCR 100 firing one unit of time early, and the sixth SCR 100 firing one unit of time late.

The command "H14 002" ("DIG" =2) causes the SCRs 100 to fire two units of time spaced from the mean, in the order determined by the variable "RASP". The command "H14 003" sets "DIG" =3, etc.

The command "H15 002" sets "RASP" =2. In such a case, the first SCR 100 would fire early, the second SCR 100 would fire early, the third SCR 100 would fire late, the fourth SCR 100 would fire late, the fifth SCR 100 would fire early, and the sixth SCR 100 would fire early, etc.

The combination of commands "H14 002" and "H15 001" have yielded satisfactory results in practice.

The disclosed invention offers significant features and can accomplish significant results unavailable with most conventional welding devices.

For example, in a tungsten inert gas (TIG) mode, the disclosed apparatus may be used to affect agitation of the pool of molten metal at the weld site. This can have significant advantages, for example, where alloys of different metals which tend to separate when molten are being used. Agitation of the molten metal can be used to keep such alloys generally evenly distributed in the molten pool.

The present invention may be advantageously used to help penetrate oxide films. The low spatter MIG mode, for example, may be used.

The present invention may be used, for example, to run a TIG mode in reverse polarity (electrode positive), or a MIG mode in straight polarity (electrode negative). These features may be used to affect the structure of a weld and to allow additional performance features of a weld. In a MIG weld of straight polarity, the metal tends to lay on top of the weld. This is typically not a stable process in conventional welding machines, but is stable in the present invention. The present invention may be used to put down weld deposits of low dilution, and maintain stability.

A feature of the present invention that is potentially of great significance, involves the ability to control the dilution rate of a weld. This feature may be used to affect, and control, the metallurgy of a weld. The invention may be used to empirically achieve a desired metallurgy of a weld, and once achieved, the invention is capable of faithfully reproducing the same weld due to its ability to remember a detailed welding procedure and repeatedly follow such procedure exactly. Human operated conventional welding devices are not capable of such repeatability. The present invention may be used to achieve minimal dilution rates significantly better than prior art devices. The article entitled "Surface Magic: Making Metals Tougher", published in *High Technology* (March 1983) (which is incorporated herein by reference), states that the following dilution percentages are achievable with conventional welding:

Gas tungsten-arc and plasma-arc welding: 5–15%;
Stick welding (bare electrode): 20–25%;
Stick welding (coated electrode): 30–40%;
Submerged arc welding: 40–50%.

The present invention can achieve significant minimal dilution rates, believed to be on the order of 5% or less.

The present invention may be used to precisely control the temperature of a weld, a feature not available in conventional welding devices.

The present invention provides a significant advantage in its ability to achieve unusually long "stick out lengths" of the wire used in MIG welding. "Stick out length" is sometimes defined in the art as the length of the welding wire or wire electrode, between the contact tip and the arc. In *Welding Handbook* (7th ed., Vol. 2 1978), published by the American Welding Society, stick out length is defined at page 139 as "electrode extension". This *Welding Handbook*, Volumes 1 through 5, are all incorporated herein by reference. The stick out length is the distance between the last point of electrical contact, usually the contact tip, and the end of the electrode, which usually ends at the arc.

Conventional welding devices are believed to be able to achieve typical stick out lengths of a MIG wire electrode of ½ inch. The present invention is capable of achieving stick out lengths as great as 3 inches (for 0.035 wire). These long stick out lengths have significant advantages. Such unusually long stick out lengths enable the apparatus to conveniently preheat the electrode wire and to utilize whole new concepts in nozzle design.

The wire electrode acts as a resistor over its length between the last point of electrical contact and the arc. The current flowing through the wire electrode tends to preheat the electrode, and this action is significantly improved by achieving long stick out lengths. This feature is believed to assist greatly in achieving extreme deposition rates.

Although the operation of the invention is not completely understood, the present invention is capable of controlling welding parameters so tightly, that long stick out lengths are believed to be achievable as a result.

Typical nozzle designs must use complicated water cooled arrangements due to the close proximity of the nozzle to the hot arc. Long stick out lengths permit new concepts in nozzle design, by allowing location of the nozzle at a point spaced from the arc a sufficient distance to permit lower temperature designs. New materials like ceramic materials may be used in the nozzle design.

ALTERNATIVE EMBODIMENTS

The present disclosure illustrates a presently preferred embodiment of the invention. Other embodiments of the invention may be advantageous in some applications.

For example, the disclosed arc welding circuit outputs a DC signal on the common welding lead 81. In some applications, it may be desirable to utilize an AC current. For example, it may be advantageous to weld a metal such as aluminum using AC current in a constant current mode. Alternating current is sometimes used in the case of aluminum to remove or inhibit the formation of an oxide film which would otherwise interfere with the maintenance of a good arc.

The illustrated example utilizes three phase power. Signal phase power could be used. That is, the welding transformers 57 could be single phase. Also, for example, six phase power could be used. Three SCRs could be used instead of six.

The transformer 57 could be eliminated. The secondary windings 99 could be eliminated and replaced with windings on a three phase alternator, such as a portable diesel alternator. Such a configuration would provide an excellent portable welding apparatus. The disclosed invention is especially powerful in its ability to synchronize with a power source that varies in frequency.

Greater resolution of voltage or current samples could be achieved by using a ten bit or greater A/D converter 132. This could result in 0.025 volt resolution, or greater. For example, a fourteen bit A/D converter 132 could be utilized.

A sample and hold technique could also be used. However, such techniques are not necessary in a preferred embodiment. The voltage reading is taken so fast in comparison to the rate of change of the voltage, that the voltage may be considered to remain constant as a practical matter during the short time involved in taking the reading.

The illustrated embodiment uses an averaging type voltage or current reading. The circuit employs capacitors and resistors to, in effect, integrate voltage sample inputs. Alternatively, op amp circuits could be placed in the invention and configured to result in a time RMS A/D reading circuit so that the digital value returned by A/D converter 132 represented the value of the time RMS voltage being read.

A cathode ray tube (CRT) could be used in lieu of, or in addition to, the output displays 75. A printer may be coupled to, e.g., current loop interface 71. The printer may be used to print voltage or current, or both, for time intervals (say each second) during a welding procedure. This information may be used for quality control. If an abnormal reading occurred in the print out, it could be indicative of a flaw in the weld. Quality control can be critical in some applications, such as welds on a pipeline or aircraft.

A smart interface chip could be provided to time the output displays 75. Thus, the responsibility for strobing the LED displays 75 and keeping them lit could be transferred to a smart interface chip which could then maintain the same display until changed or updated by the CPU 50.

In some dedicated applications, the flexibility and programmability by the illustrated preferred embodiment may not be needed. In such event, the CPU 50 may be replaced by a programmed logic array (PLA), for example. Predetermined welding procedures could be stored in either ROM 51 or RAM 52, and could be selected by a menu driven routine, for example. The look up tables could be predetermined and stored in ROM 51 or RAM 52. In any embodiment the look up tables may be stored in ROM 51 if it is not desired to modify the look up tables.

APPENDIX

LISTING NO. 1

```
PAGE     1          83-FEB-83       WSAVE.S68

1                              NAM     SAVE DEFIFINES
 2                              OPT     S,O,NOG 3
 4          0100   SP1CR        EQU     $100        PRIMARY SERIAL I/O PORT
 5          0101   SP1DR        EQU     SP1CR+1
 6          2000   SP2CR        EQU     $2000       SECONDARY SERIAL I/O PORT
 7          2001   SP2DR        EQU     SP2CR+1
 8          4000   PIA          EQU     $4000       SEE NEXT PAGE
 9          4004   PIA2         EQU     PIA+4       SEE NEXT PAGE
10          2000   TIMCRX       EQU     $2000
11          2001   TIMCR2       EQU     TIMCRX+1
12          2002   TIMBF1       EQU     TIMCRX+2    6X LINE FREQ IRQ
13          2004   TIMBF2       EQU     TIMCRX+4    SERIAL PORT BAUD RATE
14          2006   TIMBF3       EQU     TIMCRX+6    NMI FREQ MEASURE
15          8000   SCRCRX       EQU     $8000
16          8001   SCRCR2       EQU     SCRCRX+1
17          8002   SCRBF1       EQU     SCRCRX+2    SCR FIRING ANGLE
18          8004   SCRBF2       EQU     SCRCRX+4       "
19          8006   SCRBF3       EQU     SCRCRX+6       "
20          003C   LINEF        EQU     60          HZ
21          0006   LINEF1       EQU     6           LINEF/10
22
23                           *
24                           * I/O PORT SIGNAL DIFINITIONS
25                           *
26                           *
27                           * PIA #1 U13 (CLOSEST TO THE CPU)
28                           * ADDRESS = $4000-$4003
29                           * PIN  # NAME SENSE FUNCTION
30                           *
31                           * 2  PA0  IN  ADC BIT 0
32                           * 3  PA1  IN  ADC BIT 1
33                           * 4  PA2  IN  ADC BIT 2
34                           * 5  PA3  IN  ADC BIT 3
35                           * 6  PA4  IN  ADC BIT 4
36                           * 7  PA5  IN  ADC BIT 5
37                           * 8  PA6  IN  ADC BIT 6
38                           * 9  PA7  IN  ADC BIT 7
39                           * 40 CA1  IRQ NOT USED
40                           * 39 CA2  OUT MAIN XFORMR CONTACTOR
41                           *
```

```
42          * 10 PB0 OUT LED MPX ADDR
43          * 11 PB1 OUT LED MPX ADDR
44          * 12 PB2 OUT SCR1A FIRE ENABLE
45          * 13 PB3 OUT SCR1B FIRE ENABLE
46          * 14 PB4 OUT SCR2A FIRE ENABLE
47          * 15 PB5 OUT SCR2B FIRE ENABLE
48          * 16 PB6 OUT SCR3A FIRE ENABLE
49          * 17 PB7 OUT SCR3B FIRE ENABLE
50          * 18 CB1 IRQ NOT USED TIED HI
51          * 19 CB2 OUT BACKGROUND CONTROL
52          *
53          *
54          * PIA #2 U14 (CLOSEST TO OUTSIDE EDGE OF BOARD)
55          * ADDRESS = $4004-$4007
56          * 2 PA0 IN NOT USED, RESERVED
57          * 3 PA1 IN NOT USED, RESERVED
58          * 4 PA2 IN LINE POLARITY SENSE
59          * 5 PA3 OUT CURRENT GAIN SELECT
60          * 6 PA4 OUT CURRENT GAIN SELECT
61          * 7 PA5 OUT ADC SOURCE SELECT
62          * 8 PA6 OUT SWITCH MPX LO ADDR
63          * 9 PA7 OUT SWITCH MPX HI ADDR
64          * 40 CA1 IRQ NOT USED
65          * 39 CA2 OUT GO CONVERT,SANITY ACK
66          *
67          *
68          * 10 PB0 OUT LED, RELAY DATA
69          * 11 PB1 OUT LED, RELAY DATA
70          * 12 PB2 OUT LED, RELAY DATA
71          * 13 PB3 OUT LED, RELAY DATA
72          * 14 PB4 I/O LED, RELAY, SENSE DATA
73          * 15 PB5 I/O LED, RELAY, SENSE DATA
74          * 16 PB6 I/O LED, RELAY, SENSE DATA
75          * 17 PB7 I/O LED, RELAY, SENSE DATA
76          * 18 CB1 IRQ NOT USED TIED HI
77          * 19 CB2 OUT RELAY LATCH STROBE
78          *
79
80            *
81            *
82            *
83            *
84     0001            ORG     1
85     0001    IRQCR   RMB     2
86     0003    STEP    RMB     1
87     0004    ERRORT  RMB     2
88     0006    TEMP    RMB     2
89     0008    ANGLHI  RMB     2
90     000A    ANGAIL  RMB     2
91     000C    ANGLLO  RMB     2
92     000E    FIRING  RMB     2
93     0010    LFOSC   RMB     5
94     0015    PSHIFT  RMB     4
95            *
96            *
97            *
98            *
99            *
100           *
101           *
102           *
103           *
```

```
104             *
105   0019     USRCNT    RMB    1
106   001A     SWFLG1    RMB    1
107   001B     SWFLG2    RMB    1
108   001C     SUBSAV    RMB    2
109   001E     RASP      RMB    3
110             *
111             *
112             *
113   0021     DIG       RMB    1
114   0022     SETING    RMB    1
115   0023     ARANGE    RMB    1
116   0024     CLK2      RMB    2
117   0026     CLK1      RMB    2
118   0028     RELAYS    RMB    1
119   0029     LESTOP    RMB    1
120   002A     HESTOP    RMB    1
121   002B     RUNWAI    RMB    1
122   002C     SSTEP     RMB    1
123   002D     ARCONF    RMB    1
124             *
125   002E     PWRSWT    RMB    1
126             *
127             *
128             *
129             *
130             *
131   002F     KEYPAD    RMB    1
132   0030     HISNSW    RMB    1
133   0031     LOSNSW    RMB    1
134   0032     SUBCNT    RMB    1
135   0033     OPMASK    RMB    1
136   0034     RHLED     RMB    1
137   0035     MIDLED    RMB    1
138   0036     LHLED     RMB    1
139   0037     LEDCLK    RMB    1
140   0038     XFORMR    RMB    1
141   0039     OVSAM     RMB    8
142   0041     DISAM     RMB    8
143             *
144             *
145             *
146             *
147             *
148             *
149             *
150             *
151   0049     NEWRDY    RMB    1
152   004A     AUXACT    RMB    1
153   004B     RETRY     RMB    1
154   004C     LRCBYT    RMB    1
155   004D     OPCODE    RMB    1
156   004E     OPERND    RMB    1
157   004F     HUNS      RMB    1
158   0050     TENS      RMB    1
159   0051     ONES      RMB    1
160   0052     KEYSPD    RMB    1
```

```
161  0053          PARMPX   RMB   2
162  0055          CRCRFG   RMB   3
163  0058          ERRORN   RMB   1
164  0059          XMPNT1   RMB   2
165  005A          XMPNT2   RMB   2
166  005D          IOXSAV   RMB   2
167  005F          CRRCNT   RMB   1
168  0060          RDPNT1   RMB   2
169  0062          RDPNT2   RMB   2
170  0064          RUNPC    RMB   2
171  0066          ITYPE    RMB   1
172  0067          ILNUM    RMB   1
173  006A          ICMD     RMB   1
174  0069          IOPR     RMB   1
175  006A          MFACT    RMB   1
176  006B          MRATE    RMB   1
177  006C          MOFF     RMB   2
178  006E          NMFACT   RMB   1
179  006F          NMRATE   RMB   1
180  0070          NMOFF    RMB   2
181
182                   *
183                   *
184                   *
185                   *
186       6000                ORG   $6000
187                   *
188                   *
189       004B       ETMAX    EQU   75
190       0096       ETSIZE   EQU   ETMAX+ETMAX
191  6000            TERRM    RMB   ETSIZE
192  6096            TERRNM   RMB   ETSIZE
193                   *
194                   *
195                   *
196       00C8       XMBFLN   EQU   200
197       01C2       RDBFLN   EQU   450
198  612C            XMBUF    RMB   XMBFLN
199  61F4            RDBUF    RMB   RDBFLN
200                   *
201  63B6            RAMPM    RMB   17
202                   *
203                   *
204                   *
205                   *
206                   *
207                   *
208                   *
209                   *
210                   *
211                   *
212                   *
213                   *
214  63C7            LOGDAT   RMB   6
215  63CD            LOGGER   RMB   3
216                   *
217                   *
218                   *
```

```
219
220                   *
221                   *
222                   *
223                   *
224        03E8   BRAML    EQU    1000
225        A818            ORG    $A40A-BRAML-8
226   A818       STALE    RMB    1
227   A811       CRCWRD   RMB    2
228   A813                RMB    1
229   A814       STRTPC   RMB    2
230   A816       LNUM     RMB    2
231   A818       PGMRAM   RMB    BRAML
232                       END
0    ERROR(S) DETECTED IN PASS 2

1                                NAM    WELDER MAIN PROGRAM SECTION
2          F000                  ORG    $F000
3          F000 8E 63FF  START   LDS    #$63FF
4          F003 BD 0000          JSR    START0
5          F006 BD 073B          JSR    KEYLED
6          F009 BD DC87  TOP     JSR    LINEIN
7          F00C 96 66            LDA A  ITYPE
8          F00E 81 58            CMP A  #'X
9          F010 26 07            BNE    NOIMM
10         F012 8D 1E            BSR    IMMINS
11         F014 7F A066          CLR    ITYPE
12         F017 20 ED            BRA    TOP-3
13         F019 7D 0028 NOIMM    TST    RUNWAI
14         F01C 27 E8            BEQ    TOP-3
15         F01E 8D 34            BSR    RUNINS
16         F020 20 E7            BRA    TOP 17
18         F022          PROCAD  FDB    DOCI
19         F024                  FDB    DOCMD
20         F026                  FDB    DOFEED
21         F028                  FDB    DOMISC
22         F02A                  FDB    DOTIME
23         F02C                  FDB    DOTEST
24         F02E                  FDB    DOCV
25         F030                  FDB    DOCOIL
26                       *
27                       *
28                       *
29         F032 86 07   IMMINS   LDA A  #7
30         F034 BD 0294          JSR    OUTCH
31         F037 96 68            LDA A  ICMD
32         F039 16               TAB
33         F03A C4 1F            AND B  #$1F
34         F03C D7 4D            STA B  OPCODE
35         F03E D6 69            LDA B  IOPR
36         F040 D7 4E            STA B  OPERND
37         F042 44               LSR A
38         F043 44               LSR A
39         F044 44               LSR A
```

```
40      F045 44                         LSR  A
41      F046 44                         LSR  A
42      F047 48                         ASL  A
43      F048 CE F022                    LDX  #PROCAD
44      F04B BD D1C3                    JSR  ADDAX
45      F04E FE 00                      LDX  0,X
46      F050 96 40                      LDA A OPCODE
47      F052 6E 00                      JMP  0,X
48
49                          *
50                          *
51                          *
52      F054 DE 64   RUNINS LDX  RUNPC
53      F056 A6 00                      LDA A 0,X
54      F058 16                         TAB
55      F059 C4 1F                      AND B #$1F
56      F05B 27 1A                      BEQ  NXTINS
57      F05D 36                         PSH A
58      F05E E6 01                      LDA B 1,X
59      F060 44                         LSR  A
60      F061 44                         LSR  A
61      F062 44                         LSR  A
62      F063 44                         LSR  A
63      F064 44                         LSR  A
64      F065 48                         ASL  A
65      F066 CE F022                    LDX  #PROCAD
66      F069 BD D1C3                    JSR  ADDAX
67      F06C 32                         PUL  A
68      F06D 84 1F                      AND A #$1F
69      F06F 97 40                      STA A OPCODE
70      F071 D7 4E                      STA B OPERND
71      F073 EE 00                      LDX  0,X
72      F075 AD 00                      JSR  0,X
73                          *
74                          *
75                          *
76                          *
77                          *
78      F077 DE 64   NXTINS LDX  RUNPC
79      F079 08                         INX
80      F07A 08                         INX
81      F07B 8C A400                    CPX  #PGMRAM+BRAM1
82      F07E 26 05                      BNE  *+7
83      F080 86 04                      LDA A #4
84      F082 BD 08E9                    JSR  ERROR
85      F085 DF 64                      STX  RUNPC
86      F087 BD D73B                    JSR  KEYLED
87      F08A 7D 002C                    TST  SSTEP
88      F08D 2B F8                      BMI  *-6
89      F08F 27 03                      BEQ  *+5
90      F091 07                         TPA
91      F092 97 2C                      STA A SSTEP
92      F094 39                         RTS
```

```
93
94                              *
95                              *
96                              *
97      FA95 81 03     DOCI     CMP A   #3
98      FA97 23 60              BHI     DOCIA
99      FA99 36                 PSH A
100     FA9A 37                 PSH B
101     FA9B 7F 63C6            CLR     RAMPM+16
102     FA9E 96 2E              LDA A   PWRSWT
103     FAA0 7F 002E            CLR     PWRSWT
104     FAA3 81 02              CMP A   #2
105     FAA5 27 15              BEQ     DOCIA
106     FAA7 36                 PSH A
107     FAA8 BD D8B8            JSR     CALCAT
108     FAAB 96 41              LDA A   DISAM
109     FAAD 97 22              STA A   SETING
110     FAAF 32                 PUL A
111     FAB0 81 03              CMP A   #3
112     FAB2 23 08              BLS     DOCIA
113     FAB4 CE 1FFF            LDX     #$1FFF
114     FAB7 DF 0A              STX     ANGALL
115     FAB9 BD 02E2            JSR     COPYAL
116     FABC 33        DOCIA    PUL B
117     FABD 32                 PUL A
118     FABE 81 01              CMP A   #1
119     FAC0 26 15              BNE     DOCI2
120     FAC2 5D                 TST B
121     FAC3 26 09              BNE     DOCI1
122     FAC5 7A 002E            DEC     PWRSWT
123     FAC8 7F 0020            CLR     ARCONF
124     FACB 7E D8CD            JMP     DASH
125     FACE D7 22     DOCI1    STA B   SETING
126     FAD0 86 02              LDA A   #2
127     FAD2 97 20              STA A   ARCONF
128     FAD4 97 2E              STA A   PWRSWT
129     FAD6 39                 RTS
130     FAD7 F7 63C5   DOCI2    STA B   RAMPM+15
131     FADA 96 22              LDA A   SETING
132     FADC 1A                 SBA
133     FADD 27 EF              BEQ     DOCI1
134     FADF 24 05              BCC     *+7
135     FAE1 40                 NEG A
136     FAE2 C6 01              LDA B   #1
137     FAE4 20 02              BRA     *+4
138     FAE6 C6 FF              LDA B   #$FF
139     FAE8 F7 63C4            STA B   RAMPM+14
140     FAEB BD DDDD            JSR     RAMP
141     FAEE 96 40              LDA A   OPCODE
142     FAF0 97 63C6            STA A   RAMPM+16
143     FAF3 81 02              CMP A   #2
144     FAF5 27 09              BEQ     DOCI1+2
145     FAF7 86 02              LDA A   #2
146     FAF9 97 20              STA A   ARCONF
147     FAFB 97 2E              STA A   PWRSWT
148     FAFD BD 073B            JSR     KEYLED
149     FB00 7D 63C6            TST     RAMPM+16
```

```
150   F103 26 F8              BNE         *-6
151   F105 39                 RTS
152   F106 D0 41    DOCIA     SUB B       DISAM
153   F108 07                 TPA
154   F109 97 1B              STA A       SWFLG2
155   F10B 39                 RTS
156
157   F10C CE A816  DOCMD     LDX         #PGMRAM-2
158   F10F 81 0F              CMP A       #15
159   F111 23 03              BLS         *+5
160   F113 CE A1FE            LDX         #PGMRAM-2+488
161   F116 DF 55              STX         CRCREG
162   F118 17                 TBA
163   F119 DB 56              ADD B       CRCREG+1
164   F11B D7 56              STA B       CRCREG+1
165   F11D 24 03              BCC         *+5
166   F11F 7C 0055            INC         CRCREG
167   F122 9B 56              ADD A       CRCREG+1
168   F124 97 56              STA A       CRCREG+1
169   F126 24 03              BCC         *+5
170   F128 7C 0055            INC         CRCREG
171   F12B 96 4D              LDA A       OPCODE
172   F12D 4A                 DEC A       *
173   F12E 26 05              BNE         *+7
174   F130 DE 55   BRANCH     LDX         CRCREG
175   F132 DF 64              STX         RUNPC
176   F134 39                 RTS
177   F135 4A                 DEC A       *
178   F136 26 06              BNE         *+8
179   F138 7D 001A            TST         SWFLG1
180   F13B 26 F3              BNE         BRANCH
181   F13D 39                 RTS
182   F13E 4A                 DEC A       *
183   F13F 26 06              BNE         *+8
184   F141 7D 001A            TST         SWFLG1
185   F144 27 EA              BEQ         BRANCH
186   F146 39                 RTS
187   F147 4A                 DEC A       *
188   F148 26 06              BNE         *+8
189   F14A 96 1B              LDA A       SWFLG2
190   F14C 06                 TAP
191   F14D 27 E1              BEQ         BRANCH
192   F14F 39                 RTS
193   F150 4A                 DEC A       *
194   F151 26 06              BNE         *+8
195   F153 96 1B              LDA A       SWFLG2
196   F155 06                 TAP
197   F156 25 D8              BCS         BRANCH
198   F158 39                 RTS
199   F159 4A                 DEC A       *
200   F15A 26 08              BNE         *+10
201   F15C 96 1B              LDA A       SWFLG2
202   F15E 06                 TAP
203   F15F 27 02              BEQ         *+4
204   F161 24 CD              BCC         BRANCH
205   F163 39                 RTS
206   F164 4A                 DEC A       *
```

```
207    F165  26 06          BNE      *+8
208    F167  7D 0019        TST      USRCNT
209    F16A  27 C6          BEQ      BRANCH
210    F16C  39             RTS
211    F16D  4A             DEC A    *
212    F16E  26 06          BNE      *+8
213    F170  7D 0019        TST      USRCNT
214    F173  26 BD          BNE      BRANCH
215    F175  39             RTS
216    F176  4A             DEC A    *
217    F177  26 06          BNE      *+8
218    F179  7D 0041        TST      DISAM
219    F17C  27 B2          BEQ      BRANCH
220    F17E  39             RTS
221    F17F  4A             DEC A    *
222    F180  26 06          BNE      *+8
223    F182  7D 63C6        TST      RAMPM+16
224    F185  26 A9          BNE      BRANCH
225    F187  39             RTS
226    F188  4A             DEC A    *
227    F189  26 0B          BNE      *+13
228    F18B  7D 0026        TST      CLK1
229    F18E  26 05          BNE      *+7
230    F190  7D 0024        TST      CLK2
231    F193  27 9B          BEQ      BRANCH
232    F195  39             RTS
233    F196  4A             DEC A    *
234    F197  26 0B          BNE      *+13
235    F199  7D 0026        TST      CLK1
236    F19C  26 92          BNE      BRANCH
237    F19E  7D 0024        TST      CLK2
238    F1A1  26 8D          BNE      BRANCH
239    F1A3  39             RTS
240    F1A4  4A             DEC A    *
241    F1A5  26 10          BNE      *+18
242    F1A7  DE 1C          LDX      SUBSAV
243    F1A9  27 05          BEQ      *+7
244    F1AB  86 02          LDA A    #2
245    F1AD  7E D0E9        JMP      ERROR
246    F1B0  DE 64          LDX      RUNPC
247    F1B2  DF 1C          STX      SUBSAV
248    F1B4  7E F130        JMP      BRANCH
249    F1B7  4A             DEC A    *
250    F1B8  26 0A          BNE      *+12
251    F1BA  DE 55          LDX      CRCREG
252    F1BC  08             INX
253    F1BD  08             INX
254    F1BE  FF A014        STX      STRTPC
255    F1C1  7E DA41        JMP      PUTCRC
256    F1C4  4A             DEC A    *
257    F1C5  26 0A          BNE      *+12
258    F1C7  DE 55          LDX      CRCREG
259    F1C9  08             INX
260    F1CA  08             INX
261    F1CB  FF A016        STX      LNUM
262    F1CE  7E DA41        JMP      PUTCRC
263    F1D1  39             RTS
```

```
264
265                              *
266                              *
267                              *
268     F102 86 08   DOFEED   LDA  A   #8
269     F104 97 4B            STA  A   RETRY
270     F106 96 4D   FEED1    LDA  A   OPCODE
271     F108 8B 20            ADD  A   #$20
272     F10A BD D14D          JSR      AUXSND-3
273     F10D 96 4E            LDA  A   OPERND
274     F10F 44               LSR  A
275     F1E0 44               LSR  A
276     F1E1 44               LSR  A
277     F1E2 44               LSR  A
278     F1E3 BD D150          JSR      AUXSND
279     F1E6 96 4E            LDA  A   OPERND
280     F1E8 84 0F            AND  A   #$F
281     F1EA BD D150          JSR      AUXSND
282     F1ED BD D161          JSR      AUXFIN
283     F1F0 BD D173          JSR      REPLY
284     F1F3 81 06            CMP  A   #6
285     F1F5 27 0F            BEQ      FEED2
286     F1F7 7A 004B          DEC      RETRY
287     F1FA 27 05            BEQ      FEED3
288     F1FC BD D167          JSR      PURGE
289     F1FF 20 D5            BRA      FEED1
290     F201 86 05   FEED3    LDA  A   #5
291     F203 7E D8E9          JMP      ERROR
292     F206 39      FEED2    RTS
293
294     F207 4A      DOMISC   DEC  A   *
295     F208 26 07            BNE      *+9
296     F20A DE 64            LDX      RUNPC
297     F20C 09               DEX
298     F20D 09               DEX
299     F20E DF 64            STX      RUNPC
300     F210 39               RTS
301     F211 4A               DEC  A   *
302     F212 26 0A            BNE      *+12
303     F214 D7 20            STA  B   RUNWAI
304     F216 26 03            BNE      *+5
305     F218 7E 0124          JMP      HLTALL
306     F21B 7E D8CD          JMP      DASH
307     F21E 4A               DEC  A   *
308     F21F 26 07            BNE      *+9
309     F221 5D               TST  B
310     F222 27 31            BEQ      *+3
311     F224 07               TPA
312     F225 97 2C            STA  A   SSTEP
313     F227 39               RTS
314     F228 4A               DEC  A   *
315     F229 26 09            BNE      *+11
316     F22B DB 19            ADD  B   USRCNT
317     F22D 24 02            BCC      *+4
318     F22F C6 FF            LDA  B   #$FF
319     F231 D7 19            STA  B   USRCNT
320     F233 39               RTS
```

```
321    F233 4A              DEC A    *
322    F235 26 09           BNE      *+11
323    F237 96 19           LDA A    USRCNT
324    F239 10              SBA
325    F23A 24 01           BCC      *+3
326    F23C 4F              CLR A
327    F23D 97 19           STA A    USRCNT
328    F23F 39              RTS
329    F240 4A              DEC A    *
330    F241 26 03           BNE      *+5
331    F243 D7 19           STA B    USRCNT
332    F245 39              RTS
333    F246 4A              DEC A    *
334    F247 26 06           BNE      *+8
335    F249 D0 19           SUB B    USRCNT
336    F24B 07              TPA
337    F24C 97 18           STA A    SWFLG2
338    F24E 39              RTS
339    F24F 4A              DEC A    *
340    F250 26 0B           BNE      *+13
341    F252 86 34           LDA A    #$34
342    F254 5D              TST B
343    F255 27 02           BEQ      *+4
344    F257 86 3C           LDA A    #$3C
345    F259 B7 4003         STA A    PIA+3
346    F25C 39              RTS
347
348    F25D 4A              DEC A    *
349    F25E 26 0B           BNE      *+13
350    F260 86 34           LDA A    #$34
351    F262 5D              TST B
352    F263 27 02           BEQ      *+4
353    F265 86 3C           LDA A    #$3C
354    F267 B7 4001         STA A    PIA+1
355    F26A 39              RTS
356    F26B 4A              DEC A    *
357    F26C 26 09           BNE      *+11
358    F26E DB 22           ADD B    SETING
359    F270 24 02           BCC      *+4
360    F272 C6 FF           LDA B    #$FF
361    F274 D7 22           STA B    SETING
362    F276 39              RTS
363    F277 4A              DEC A    *
364    F278 26 09           BNE      *+11
365    F27A 96 22           LDA A    SETING
366    F27C 10              SBA
367    F27D 24 01           BCC      *+3
368    F27F 4F              CLR A
369    F280 97 22           STA A    SETING
370    F282 39              RTS
371    F283 4A              DEC A    *
372    F284 26 44           BNE      H13
373    F286 D7 58           STA B    ERRORN
374    F288 4F       FLASH  CLR A
375    F289 BD DBCF         JSR      DASH+2
376    F28C 86 02           LDA A    #2
377    F28E 97 37           STA A    LEDCLK
```

```
378    F290 8D 22              BSR       FLASHS
379    F292 25 19              BCS       FLASH2
380    F294 7D 0037            TST       LEDCLK
381    F297 26 F7              BNE       *-7
382    F299 96 5B              LDA  A    ERRORN
383    F29B BD D1D1            JSR       DSPDN
384    F29E 86 03              LDA  A    #3
385    F2A0 97 37              STA  A    LEDCLK
386    F2A2 8D 10              BSR       FLASHS
387    F2A4 25 07              BCS       FLASH2
388    F2A6 7D 0037            TST       LEDCLK
389    F2A9 26 F7              BNE       *-7
390    F2AB 20 DA              BRA       FLASH
391    F2AD 96 2F     FLASH2   LDA  A    KEYPAD
392    F2AF 84 40              AND  A    #$40
393    F2B1 26 FA              BNE       FLASH2
394    F2B3 39                 RTS
395
396    F2B4 96 2A     FLASHS   LDA  A    HESTOP
397    F2B6 94 30              AND  A    HISNSW
398    F2B8 26 0E              BNE       FLASH1
399    F2BA 96 29              LDA  A    LESTOP
400    F2BC 94 31              AND  A    LOSNSW
401    F2BE 26 08              BNE       FLASH1
402    F2C0 96 2F              LDA  A    KEYPAD
403    F2C2 84 C0              AND  A    #$C0
404    F2C4 26 02              BNE       FLASH1
405    F2C6 0C                 CLC
406    F2C7 39                 RTS
407    F2C8 0D        FLASH1   SEC
408    F2C9 39                 RTS
409
410    F2CA 4A        H13      DEC  A    *
411    F2CB 26 11              BNE       *+19
412    F2CD DE 1C              LDX       SUBSAV
413    F2CF 26 05              BNE       *+7
414    F2D1 86 03              LDA  A    #3
415    F2D3 7E D0E9            JMP       ERROR
416    F2D6 DF 64              STX       RUNPC
417    F2D8 CE 0000            LDX       #0
418    F2DB DF 1C              STX       SUBSAV
419    F2DD 39                 RTS
420    F2DE 4A                 DEC  A    *
421    F2DF 26 03              BNE       *+5
422    F2E1 D7 21              STA  B    DIG
423    F2E3 39                 RTS
424    F2E4 4A                 DEC  A    *
425    F2E5 26 03              BNE       *+5
426    F2E7 D7 1E              STA  B    RASP
427    F2E9 39                 RTS
428    F2EA 39                 RTS
429
430                              *
431                              *
432                              *
433                              *
```

```
434   F2EB  4A          DOTIME   DEC  A   *
435   F2EC  26 2D                BNE      *+15
436   F2EE  17                   TBA
437   F2EF  BD DAC1              JSR      STCLK2
438   F2F2  BD D738              JSR      KEYLED
439   F2F5  7D 8A24              TST      CLK2
440   F2F8  26 F8                BNE      *-6
441   F2FA  39                   RTS
442   F2FB  4A                   DEC  A   *
443   F2FC  26 04                BNE      *+6
444   F2FE  17                   TBA
445   F2FF  7E DAC1              JMP      STCLK2
446   F302  4A                   DEC  A   *
447   F303  26 07                BNE      *+9
448   F305  B7 63C2     L3       STA  A   RAMPH+12
449   F308  F7 63C3              STA  B   RAMPH+13
450   F30B  39                   RTS
451   F30C  80 08                SUB  A   #8
452   F30E  26 0D                BNE      *+15
453   F310  17                   TBA
454   F311  BD DAB5              JSR      STCLK1
455   F314  BD D738              JSR      KEYLED
456   F317  7D 8A26              TST      CLK1
457   F31A  26 F8                BNE      *-6
458   F31C  39                   RTS
459   F31D  4A                   DEC  A   *
460   F31E  26 04                BNE      *+6
461   F320  17                   TBA
462   F321  7E DAB5              JMP      STCLK1
463   F324  4A                   DEC  A   *
464   F325  26 03                BNE      *+5
465   F327  07                   TPA
466   F328  20 DB                BRA      L3
467   F32A  4A                   DEC  A   *
468   F32B  26 07                BNE      *+9
469   F32D  F7 63CF              STA  B   LOGGER+2
470   F330  F7 63CE              STA  B   LOGGER+1
471   F333  39                   RTS
472   F334  39                   RTS
473
474                              *
475                              *
476                              *
477                              *
478   F335  5A          DOTEST   DEC  B
479   F336  37                   PSH  B
480   F337  36                   PSH  A
481   F338  86 11                LDA  A   #$11
482   F33A  5D                   TST  B
483   F33B  27 04                BEQ      *+6
484   F33D  48                   ASL  A
485   F33E  5A                   DEC  B
486   F33F  26 FC                BNE      *-2
487   F341  84 F8                AND  A   #$F8
488   F343  33                   PUL  B
489   F344  C1 01                CMP  B   #1
490   F346  26 11                BNE      TESTSW
```

```
491   F348 33              PUL B
492   F349 C1 03           CMP B  #3
493   F34B 22 06           BHI    *+8
494   F34D 97 29           STA A  LESTOP
495   F34F 7F 002A         CLR    HESTOP
496   F352 39              RTS
497   F353 97 2A           STA A  HESTOP
498   F355 7F 0029         CLR    LESTOP
499   F358 39              RTS
500   F359 33       TESTSW PUL B
501   F35A C1 03           CMP B  #3
502   F35C 22 05           BHI    *+7
503   F35E 94 31           AND A  LOSNSW
504   F360 97 1A           STA A  SWFLG1
505   F362 39              RTS
506   F363 94 30           AND A  HISNSW
507   F365 97 1A           STA A  SWFLG1
508   F367 39              RTS
509
510                  *
511                  *
512                  *
513   F368 81 03    DOCV   CMP A  #3
514   F36A 22 60           BHI    DOCV4
515   F36C 36              PSH A
516   F36D 37              PSH B
517   F36E 7F 63C6         CLR    RAMPM+16
518   F371 96 2E           LDA A  PWRSWT
519   F373 7F 002E         CLR    PWRSWT
520   F376 81 01           CMP A  #1
521   F378 27 15           BEQ    DOCVA
522   F37A 36              PSH A
523   F37B BD DB55         JSR    CALCVT
524   F37E 96 39           LDA A  OVSAM
525   F380 97 22           STA A  SETING
526   F382 32              PUL A
527   F383 81 03           CMP A  #3
528   F385 23 08           BLS    DOCVB
529   F387 CE 1FFF         LDX    #$1FFF
530   F38A DF 0A           STX    ANGALL
531   F38C BD D2E2         JSR    COPYAL
532   F38F 33       DOCVB  PUL B
533   F390 32              PUL A
534   F391 81 01           CMP A  #1
535   F393 26 15           BNE    DOCV2
536   F395 5D              TST B
537   F396 26 09           BNE    DOCV1
538   F398 7A 002E         DEC    PWRSWT
539   F39B 7F 002D         CLR    ARCONF
540   F39E 7E 08CD         JMP    DASH
541   F3A1 D7 22    DOCV1  STA B  SETING
542   F3A3 86 01           LDA A  #1
543   F3A5 97 2D           STA A  ARCONF
544   F3A7 97 2E           STA A  PWRSWT
545   F3A9 39              RTS
546   F3AA F7 63C5  DOCV2  STA B  RAMPM+15
547   F3AD 96 22           LDA A  SETING
```

```
548   F3AF 10                   SBA
549   F3B0 27 EF                BEQ    DOCV1
550   F3B2 24 05                BCC    *+7
551   F3B4 40                   NEG A
552   F3B5 C6 01                LDA B  #1
553   F3B7 20 02                BRA    *+4
554   F3B9 C6 FF                LDA B  #$FF
555   F3BB F7 63C4              STA B  RAMPM+14
556   F3BE BD 0000              JSR    RAMP
557   F3C1 96 40                LDA A  OPCODE
558   F3C3 B7 63C6              STA A  RAMPM+16
559   F3C6 81 02                CMP A  #2
560   F3CA 27 09                BEQ    DOCV1+2
561   F3CA 86 01                LDA A  #1
562   F3CC 97 20                STA A  ARCONF
563   F3CF 97 2E                STA A  PWRSWT
564   F3D0 BD 073B              JSR    KEYLED
565   F3D3 7D 63C6              TST    RAMPM+16
566   F3D6 26 F8                BNE    *-6
567   F3D8 39                   RTS
568   F3D9 D0 39      DOCV4     SUB B  OVSAM
569   F3DB 07                   TPA
570   F3DC 97 1B                STA A  SWFLG2
571   F3DE 39                   RTS
572
573                      *
574                      *
575                      *
576                      *
577   F3DF 81 01      DOCOTL    CMP A  #1
578   F3E1 26 04                BNE    *+6
579   F3E3 7F 0828              CLR    RELAYS
580   F3E6 39                   RTS
581   F3E7 CE F407              LDX    #RLYMAP
582   F3EA 5A                   DEC B
583   F3EB 17                   TBA
584   F3EC 81 07                CMP A  #7
585   F3EE 23 02                BLS    *+4
586   F3F0 80 0A                SUB A  #10
587   F3F2 BD D1C3              JSR    ADDAX
588   F3F5 A6 00                LDA A  0,X
589   F3F7 C1 07                CMP B  #7
590   F3F9 22 05                BHI    *+7
591   F3FB 9A 28                ORA A  RELAYS
592   F3FD 97 28                STA A  RELAYS
593   F3FF 39                   RTS
594   F400 94 28                AND A  RELAYS
595   F402 98 28                EOR A  RELAYS
596   F404 97 28                STA A  RELAYS
597   F406 39                   RTS
598   F407           RLYMAP     FCB    1,2,4,8,$10,$20,$40,$80
599
600         FFF8               ORG    $FFF8
601   FFF8                     FDB    IRQSR
602   FFFA                     FDB    START
603   FFFC                     FDB    NMISR
604   FFFE                     FDB    START
605                            END
0  ERROR(S) DETECTED IN PASS 2
```

```
                                    NAM     WELDER UTILITY ROUTINES
 1
 2          D000                    ORG     $D000

3
 4    D000 CE D656  START0  LDX     #IRQOUT
 5    D003 DF 01            STX     IROCR
 6    D005 CE D2F5          LDX     #NMISR
 7    D008 FF 63C5          STX     $63C5
 8    D00B CE D306          LDX     #IRQBR
 9    D00E FF 63C1          STX     $63C1
10    D011 CE 0004          LDX     #ERRORT
11    D014 6F 00            CLR     0,X
12    D016 08              INX
13    D017 8C 0080          CPX     #$80
14    D01A 26 F8            BNE     *-6
15    D01C CE 4000          LDX     #PIA
16    D01F 6F 01            CLR     1,X
17    D021 6F 03            CLR     3,X
18    D023 6F 05            CLR     5,X
19    D025 6F 07            CLR     7,X
20    D027 4F              CLR A
21    D028 A7 00            STA A   0,X
22    D02A 4A              DEC A
23    D02B A7 02            STA A   2,X
24    D02D A7 06            STA A   6,X
25    D02F 86 F8            LDA A   #$F8
26    D031 A7 04            STA A   4,X
27    D033 86 34            LDA A   #$34
28    D035 A7 03            STA A   3,X
29    D037 A7 05            STA A   5,X
30    D039 C6 03            LDA B   #3
31    D03B E7 02            STA B   2,X
32    D03D C6 C0            LDA B   #$C0
33    D03F E7 04            STA B   4,X
34    D041 C6 3C            LDA B   #$3C
35    D043 E7 07            STA B   7,X
36    D045 6F 06            CLR     6,X
37    D047 A7 07            STA A   7,X
38    D049 E7 01            STA B   1,X
39                     *
40                     *
41                     *
42    D04B 86 02            LDA A   #$02
43    D04D B7 2001          STA A   TIMCR2
44    D050 B7 2000          STA A   TIMCRX
45    D053 4C              INC A
46    D054 B7 2001          STA A   TIMCR2
47    D057 86 02            LDA A   #$02
48    D059 B7 2000          STA A   TIMCRX
49    D05C CE 0986          LDX     #2486
50    D05F DF 1A            STX     LFOSC
51    D061 FF 2002          STX     TIMBF1
52    D064 CE FFFF          LDX     #$FFFF
53    D067 FF 2006          STX     TIMBF3
54                     *
55    D06A 86 A2            LDA A   #$A2
56    D06C B7 8001          STA A   SCRCR2
```

```
57    D06F B7 000A              STA A   SCRCRX
58    D072 4C                   INC A
59    D073 B7 8A01              STA A   SCRCR2
60    D076 4A                   DEC A
61    D077 B7 800A              STA A   SCRCRX
62    D07A CE 206C              LDX     #83P8
63    D07D DF 8A                STX     ANGALL
64    D07F BD D2E2              JSR     COPYAL
65    D082 8D 14                BSR     SETSP
66    D084 BD D124              JSR     HLTALL
67    D087 01                   NOP
68    D088 0E                   CLI
69    D089 3E                   WAI
70    D08A BD DA29              JSR     TSTCRC
71    D08D 24 08                BCC     *+10
72    D08F 86 01                LDA A   #1
73    D091 BD D0E9              JSR     ERROR
74    D094 7E D441              JMP     PUTCRC
75    D097 39                   RTS
76
77                       *
78    D098 86 03   SETSP  LDA A   #3
79    D09A B7 8100              STA A   SP1CR
80    D09D B7 200A              STA A   SP2CR
81    D0A0 CE 0005              LDX     #5
82    D0A3 FF 2004              STX     TIMBF2
83    D0A6 CE 612C              LDX     #XMBUF
84    D0A9 6F 00                CLR     0,X
85    D0AB 08                   INX
86    D0AC 8C 6387              CPX     #RDBUF+RDBFLN+1
87    D0AF 26 F8                BNE     *-6
88    D0B1 CE 612C              LDX     #XMBUF
89    D0B4 DF 59                STX     XMPNT1
90    D0B6 DF 5B                STX     XMPNT2
91    D0B8 CE 61F4              LDX     #RDBUF
92    D0BB DF 60                STX     RDPNT1
93    D0BD DF 62                STX     RDPNT2
94    D0BF 7F 805F              CLR     CRRCNT
95    D0C2 86 91                LDA A   #$91
96    D0C4 B7 8100              STA A   SP1CR
97    D0C7 A6 19                LDA A   #$19
98    D0C9 B7 200B              STA A   SP2CR
99    D0CC 39                   RTS
100
101   D0CD 86 02   DASH   LDA A   #2
102   D0CF 16                   TAB
103   D0D0 20 10                BRA     SLEEP+4
104   D0D2 86 1E   SMILE  LDA A   #$1E
105   D0D4 C6 E0                LDA B   #$E0
106   D0D6 20 0A                BRA     SLEEP+4
107   D0D8 86 1E   FROWN  LDA A   #$1E
108   D0DA C6 A2                LDA B   #$A2
109   D0DC 20 04                BRA     SLEEP+4
110   D0DE 86 08   SLEEP  LDA A   #8
111   D0E0 C6 E2                LDA B   #$E2
112   D0E2 97 36                STA A   LHLED
113   D0E4 D7 35                STA B   MIDLED
```

```
114  D0E6 97 34              STA A   RHLED
115  D0EA 39                 RTS
116
117                  *
118                  *
119  D0E9 97 58      ERROR   STA A   ERRORN
120  D0EB 8D 37              BSR     HLTALL
121  D0ED 20 1E              BRA     ERROR1
122  D0EF 96 2F              LDA A   KEYPAD
123  D0F1 84 80              AND A   #$80
124  D0F3 27 0C              BEQ     ERRORA
125  D0F5 DE 64              LDX     RUNPC
126  D0F7 BD D04F            JSR     DLNUM
127  D0FA 96 2F              LDA A   KEYPAD
128  D0FC 84 80              AND A   #$80
129  D0FE 26 FA              BNE     *-4
130  D100 39                 RTS
131  D101 96 37      ERRORA  LDA A   LEDCLK
132  D103 2B EA              BMI     ERROR+6
133  D105 27 06              BEQ     ERROR1
134  D107 81 28              CMP A   #40
135  D109 22 0A              BHI     ERROR2
136  D10B 20 E2              BRA     ERROR+6
137  D10D 8D C9      ERROR1  BSR     FROWN
138  D10F 86 84              LDA A   #127+5
139  D111 97 37              STA A   LEDCLK
140  D113 20 DA              BRA     ERROR+6
141  D115 96 58      ERROR2  LDA A   ERRORN
142  D117 BD D1D1            JSR     DSPDN
143  D11A 86 6E              LDA A   #$6E
144  D11C 97 36              STA A   LHLED
145  D11E 86 05              LDA A   #5
146  D120 97 37              STA A   LEDCLK
147  D122 20 CB              BRA     ERROR+6
148
149                  *
150  D124 A6 FA      HLTALL  LDA A   #250
151  D126 97 38              STA A   XFORMR
152  D128 86 FF              LDA A   #$FF
153  D12A 97 2E              STA A   PWRSWT
154  D12C 86 20              LDA A   #$20
155  D12E 8D 20              BSR     AUXSND
156  D130 CE 0656            LDX     #IRQOUT
157  D133 DF 01              STX     IRQCR
158  D135 7F 63CF            CLR     LOGGER+1
159  D138 7F 63C6            CLR     RAMPM+16
160  D13B CE AA19            LDX     #USRCNT
161  D13E 6F 00              CLR     0,X
162  D140 08                 INX
163  D141 8C 002E            CPX     #PWRSWT
164  D144 26 F8              BNE     *-6
165  D146 86 34              LDA A   #$34
166  D148 B7 4003            STA A   PIA+3
167  D14B 20 05              BRA     SMILE
168
169                  *
170                  *
```

```
171                    *
172                    *
173                    *
174   D14D 7F 004C          CLR   LRCBYT
175   D150 36       AUXSND  PSH A
176   D151 98 4C            EOR A LRCBYT
177   D153 97 4C            STA A LRCBYT
178   D155 B6 2008          LDA A SP2CR
179   D158 47               ASR A
180   D159 47               ASR A
181   D15A 24 F9            BCC   *-5
182   D15C 32               PUL A
183   D15D B7 2009          STA A SP2DR
184   D160 39               RTS
185   D161 96 4C    AUXFIN  LDA A LRCBYT
186   D163 8A 80            ORA A #$80
187   D165 20 E9            BRA   AUXSND
188                    *
189   D167 4F       PURGE   CLR A
190   D168 C6 14            LDA B #20
191   D16A 8D E4            BSR   AUXSND
192   D16C 7D 2009          TST   SP2DR
193   D16F 5A               DEC B
194   D170 26 F8            BNE   *-6
195   D172 39               RTS
196                    *
197   D173 CE 0000  REPLY   LDX   #0
198   D176 09               DEX
199   D177 27 0B            BEQ   TIMOUT
200   D179 B6 2008          LDA A SP2CR
201   D17C 47               ASR A
202   D17D 24 F7            BCC   REPLY+3
203   D17F B6 2009          LDA A SP2DR
204   D182 0C               CLC
205   D183 39               RTS
206   D184 4F       TIMOUT  CLR A
207   D185 0D               SEC
208   D186 39               RTS
209
210                    *
211                    *
212   D187 5F               CLR B
213   D188 D7 33    WRTLED  STA B DPMASK
214   D18A 96 4F            LDA A HUNS
215   D18C 8D 2A            BSR   GDIGIT
216   D18E 81 FC            CMP A #$FC
217   D190 26 01            BNE   *+3
218   D192 4F               CLR A
219   D193 81 FD            CMP A #$FD
220   D195 26 02            BNE   *+4
221   D197 86 01            LDA A #1
222   D199 97 36            STA A LHLED
223   D19B 96 50            LDA A TENS
224   D19D 8D 19            BSR   GDIGIT
225   D19F 7D 0036          TST   LHLED
226   D1A2 26 0B            BNE   *+13
227   D1A4 81 FC            CMP A #$FC
```

```
228   01A6 26 01              BNE         *+3
229   01A8 4F                 CLR    A
230   01A9 81 FD              CMP    A    #$FD
231   01AB 26 02              BNE         *+4
232   01AD 86 01              LDA    A    #1
233   01AF 97 35              STA    A    MIDLED
234   01B1 96 51              LDA    A    ONES
235   01B3 8D 03              BSR         GDIGIT
236   01B5 97 34              STA    A    RHLED
237   01B7 39                 RTS
238   01B8 CE 0A88  GDIGIT    LDX         #NUMA
239   01BB 8D 06              BSR         ADDAX
240   01BD A6 00              LDA    A    0,X
241   01BF 44                 LSR    A
242   01C0 58                 ASL    B
243   01C1 49                 ROL    A
244   01C2 39                 RTS
245
246   01C3 DF 06   ADDAX      STX         TEMP
247   01C5 9B 07              ADD    A    TEMP+1
248   01C7 97 07              STA    A    TEMP+1
249   01C9 24 03              BCC         *+5
250   01CB 7C 0006            INC         TEMP
251   01CE DE 06              LDX         TEMP
252   01D0 39                 RTS
253
254                 *
255   01D1 8D 49   DJPDN      BSR         CODEI
256   01D3 20 82              BRA         WRTLED-1

257
258                 *
259   01D5 8D 07   WVOLTS     BSR         CODEV
260   01D7 BD 0253            JSR         LOGV
261   01DA C6 40              LDA    B    #$40
262   01DC 20 AA              BRA         WRTLED
263                 *
264                 *
265   01DE CE 0000 CODEV      LDX         #0
266   01E1 DF 4F              STX         HUNS
267   01E3 81 31              CMP    A    #49
268   01E5 23 07              BLS         *+9
269   01E7 80 32              SUB    A    #50
270   01E9 7C 004F            INC         HUNS
271   01EC 20 F5              BRA         *-9
272   01EE 81 04   CODEV1     CMP    A    #4
273   01F0 23 07              BLS         *+9
274   01F2 80 05              SUB    A    #5
275   01F4 7C 0050            INC         TENS
276   01F7 20 F5              BRA         *-9
277   01F9 48                 ASL    A
278   01FA 97 51              STA    A    ONES
279   01FC 39                 RTS
280                 *
281                 *
282                 *
283   01FD D6 23   WAMPS      LDA    B    ARANGE
```

```
284   D1FF 27 0D              BEQ    LOAMP
285   D201 5A                 DEC B
286   D202 27 06              BEQ    MIDAMP
287   D204 8D 34    HIAMP     BSR    CODETH
288   D206 8D 50              BSR    LOGA
289   D208 20 C9              BRA    DSPON+2
290   D20A 8D 02    MIDAMP    BSR    CODEV
291   D20C 20 F8              BRA    HIAMP+2
292   D20E 8D 0C    LOAMP     BSR    CODEI
293   D210 20 F4              BRA    HIAMP+2
294                    *
295                    *
296                    *
297                    *
298   D212 C1 09    DAMPS     CMP B  #9
299   D214 23 F8              BLS    LOAMP
300   D216 C1 13              CMP B  #19
301   D218 23 F0              BLS    MIDAMP
302   D21A 20 EA              BRA    HIAMP
303
304                    *
305   D21C CE 0000  CODEI     LDX    #0
306   D21F DF 4F              STX    HUNS
307   D221 81 63              CMP A  #99
308   D223 23 07              BLS    *+9
309   D225 80 64              SUB A  #100
310   D227 7C 004F            INC    HUNS
311   D22A 20 F5              BRA    *-9
312   D22C 81 09    CODE2D    CMP A  #9
313   D22E 23 07              BLS    *+9
314   D230 80 0A              SUB A  #10
315   D232 7C 0050            INC    TENS
316   D235 20 F5              BRA    *-9
317   D237 97 51              STA A  ONES
318   D239 39                 RTS
319                    *
320   D23A CE 0000  CODETH    LDX    #0
321   D23D DF 4F              STX    HUNS
322   D23F 81 F9              CMP A  #249
323   D241 23 02              BLS    *+4
324   D243 86 F9              LDA A  #249
325   D245 81 18              CMP A  #24
326   D247 23 07              BLS    *+9
327   D249 80 19              SUB A  #25
328   D24B 7C 004F            INC    HUNS
329   D24E 20 F5              BRA    *-9
330   D250 48                 ASL A
331   D251 20 98              BRA    CODEV1
332                    *
333                    *
334                    *
335   D253 CE 63C7  LOGV      LDX    #LOGDAT
336   D256 20 03              BRA    *+5
337   D258 CE 63CA  LOGA      LDX    #LOGDAT+3
338   D25A 96 4F              LDA A  HUNS
339   D25D AB 30              ADD A  #$30
340   D25F A7 00              STA A  0,X
```

```
341   D261 96 50              LDA  A  TENS
342   D263 8B 30              ADD  A  #$30
343   D265 A7 01              STA  A  1,X
344   D267 96 51              LDA  A  ONES
345   D269 8B 30              ADD  A  #$30
346   D26B A7 02              STA  A  2,X
347   D26D 39                 RTS
348
349                   *
350                   *
351                   *
352                   *
353                   *
354   D26E DF 50    INCH      STX     IOXSAV
355   D270 DE 60              LDX     RDPNT1
356   D272 A6 00              LDA  A  0,X
357   D274 6F 00              CLR     0,X
358   D276 08                 INX
359   D277 8C 6386            CPX     #RDBUF+RDBFLN
360   D27A 26 03              BNE     *+5
361   D27C CE 61F4            LDX     #RDBUF
362   D27F DF 60              STX     RDPNT1
363   D281 81 8D              CMP  A  #$8D
364   D283 27 08              BEQ     *+10
365   D285 81 8D              CMP  A  #$8D
366   D287 27 04              BEQ     *+6
367   D289 DE 50              LDX     IOXSAV
368   D28B 0C                 CLC
369   D28C 39                 RTS
370   D28D 7A 805F            DEC     CRRCNT
371   D290 DE 50              LDX     IOXSAV
372   D292 0D                 SEC
373   D293 39                 RTS
374                   *
375                   *
376                   *
377   D294 DF 50    OUTCH     STX     IOXSAV
378   D296 DE 58              LDX     XMPNT2
379   D298 A7 00              STA  A  0,X
380   D29A 08                 INX
381   D29B 8C 61F4            CPX     #XMBUF+XMBFLN
382   D29E 26 03              BNE     *+5
383   D2A0 CE 612C            LDX     #XMBUF
384   D2A3 DF 58              STX     XMPNT2
385   D2A5 7D 804A            TST     AUXACT
386   D2A8 26 05              BNE     *+7
387   D2AA 86 81              LDA  A  #$81
388   D2AC B7 A10A            STA  A  SP1CR
389   D2AF DE 50              LDX     IOXSAV
390   D2B1 39                 RTS
391                   *
392                   *
393                   *
394   D2B2 DE 58    WAIXMB    LDX     XMPNT2
395   D2B4 9C 59              CPX     XMPNT1
396   D2B6 26 FA              BNE     WAIXMB
397   D2B8 39                 RTS
```

```
398
399                            *
400                            *
401                            *
402                            *
403                            *
404
405                            *
406   D2B9 96 0B    DECR   LDA A   ANGALL+1
407   D2BB 9B 05           ADD A   ERROR+1
408   D2BD 97 0B           STA A   ANGALL+1
409   D2BF 96 0A           LDA A   ANGALL
410   D2C1 99 04           ADC A   ERROR
411   D2C3 81 23           CMP A   #$23
412   D2C5 23 02           BLS     *+4
413   D2C7 86 23           LDA A   #$23
414   D2C9 97 0A           STA A   ANGALL
415   D2CB 20 15           BRA     COPYAL
416                            *
417   D2CD 96 0B    INCR   LDA A   ANGALL+1
418   D2CF 90 05           SUB A   ERROR+1
419   D2D1 97 0B           STA A   ANGALL+1
420   D2D3 96 0A           LDA A   ANGALL
421   D2D5 92 04           SBC A   ERROR
422   D2D7 97 0A           STA A   ANGALL
423   D2D9 2A 07           BPL     COPYAL
424   D2DB 7F 000A         CLR     ANGALL
425   D2DE 86 02           LDA A   #2
426   D2E0 97 0B           STA A   ANGALL+1
427                            *
428   D2E2 96 0B    COPYAL LDA A   ANGALL+1
429   D2E4 97 0D           STA A   ANGLLO+1
430   D2E6 97 09           STA A   ANGLHI+1
431   D2E8 D6 21           LDA B   DIG
432   D2EA 96 0A           LDA A   ANGALL
433   D2EC 1B              ABA
434   D2ED 97 0C           STA A   ANGLLO
435   D2EF 96 0A           LDA A   ANGALL
436   D2F1 10              SBA
437   D2F2 97 08           STA A   ANGLHI
438   D2F4 39              RTS
439
440                            *
441                            *
442                            *
443                            *
444                            *
445                            *
446   D2F5 FE 2006  NMISR  LDX     TIMBF3
447   D2F8 DF 12           STX     LFOSC+2
448   D2FA CE FFE7         LDX     #$FFE7
449   D2FD FF 2006         STX     TIMBF3
450   D300 86 05           LDA A   #5
451   D302 97 14           STA A   LFOSC+4
452   D304 01              NOP
453   D305 3B              RTI
```

```
454                         *
455   D306 F6 0100  IRQSR    LDA B  SP1CR
456   D309 2A 43             BPL    IRQSR1
457   D30B 54                LSR B
458   D30C 25 1F             BCS    RCVDAT
459                         *
460   D30E DE 59             LDX    XMPNT1
461   D310 9C 5B             CPX    XMPNT2
462   D312 26 07             BNE    XMDAT
463   D314 86 91             LDA A  #$91
464   D316 B7 0100           STA A  SP1CR
465   D319 01                NOP
466   D31A 3B                RTI
467   D31B A6 00   XMDAT     LDA A  0,X
468   D31D B7 0101           STA A  SP1DR
469   D320 08                INX
470   D321 8C 61F4           CPX    #XMBUF+XMBFLN
471   D324 26 03             BNE    *+5
472   D326 CE 612C           LDX    #XMBUF
473   D329 DF 59             STX    XMPNT1
474   D32A 01                NOP
475   D32C 3B                RTI
476                         *
477   D32D B6 0101 RCVDAT    LDA A  SP1DR
478   D330 DE 62             LDX    RDPNT2
479   D332 A7 00             STA A  0,X
480   D334 08                INX
481   D335 BC 6386           CPX    #RDBUF+RDBFLN
482   D338 26 03             BNE    *+5
483   D33A CE 61F4           LDX    #RDBUF
484   D33D DF 62             STX    RDPNT2
485   D33F 81 8D             CMP A  #$8D
486   D341 27 06             BEQ    *+8
487   D343 81 8D             CMP A  #$D
488   D345 27 02             BEQ    *+4
489   D347 01                NOP
490   D348 3B                RTI
491   D349 7C 005F           INC    CRRCNT
492   D34C 01                NOP
493   D34D 3B                RTI
494
495   D34E C6 3C   IRQSP1    LDA B  #$3C
496   D350 F7 4005           STA B  PIA2+1
497   D353 96 03             LDA A  STEP
498   D355 4C                INC A
499   D356 81 05             CMP A  #5
500   D358 23 01             BLS    *+3
501   D35A 4F                CLR A
502   D35B 97 03             STA A  STEP
503   D35D C6 34             LDA B  #$34
504   D35F F7 4005           STA B  PIA2+1
505   D362 7D 001E           TST    RASP
506   D365 27 19             BEQ    NORASP
507                         *
508                         *
509   D367 7A 001F           DEC    RASP+1
510   D36A 26 07             BNE    *+9
```

```
511   D36C  D6 1E              LDA  B   RASP
512   D36E  D7 1F              STA  B   RASP+1
513   D370  73 8A2A            COM      RASP+2
514   D373  7D 8828            TST      RASP+2
515   D376  2B 04              BMI      *+6
516   D378  DE 88              LDX      ANGLHI
517   D37A  20 06              BRA      NORASP+2
518   D37C  DE 8C              LDX      ANGLLO
519   D37E  20 02              BRA      NORASP+2
520   D380  DE 8A     NORASP   LDX      ANGALL
521   D382  DF 8E              STX      FIRING
522   D384  CE FFFF            LDX      #$FFFF
523   D387  F6 4802            LDA  B   PIA+2
524   D38A  7D 8A38            TST      XFORMR
525   D38D  26 03              BNE      *+5
526   D38F  7E D460            JMP      SETFIN
527                             *
528   D392  81 02              CMP  A   #2
529   D394  22 08              BHI      H3
530   D396  81 01              CMP  A   #1
531   D398  27 25              BEQ      SET1A
532   D39A  23 0E              BLS      SET3A
533   D39C  20 39              BRA      SET2A
534   D39E  81 04     H3       CMP  A   #4
535   D3A0  27 05              BEQ      *+7
536   D3A2  23 7A              BLS      SET3A
537   D3A4  7E D445            JMP      SET2A
538   D3A7  7E D42D            JMP      SET1A
539
540                             *
541                             *
542   D3AA  FF 8802   SET3A    STX      SCRBF1
543   D3AD  DE 8E              LDX      FIRING
544   D3AF  FF 8806            STX      SCRBF3
545   D3B2  C4 F3              AND  B   #$F3
546   D3B4  CA 08              ORA  B   #$08
547   D3B6  B6 4804            LDA  A   PIA2
548   D3B9  85 04              BIT  A   #4
549   D3BB  26 35              BNE      TOBODN
550   D3BD  20 46              BRA      TOLATE
551   D3BF  FF 8804   SET1A    STX      SCRBF2
552   D3C2  DE 8E              LDX      FIRING
553   D3C4  FF 8802            STX      SCRBF1
554   D3C7  C4 CF              AND  B   #$CF
555   D3C9  CA 20              ORA  B   #$20
556   D3CB  B6 4804            LDA  A   PIA2
557   D3CE  85 04              BIT  A   #4
558   D3D0  27 31              BEQ      TOLATE-2
559   D3D2  7A 8803            DEC      STEP
560   D3D5  20 2C              BRA      TOLATE-2
561   D3D7  FF 8806   SET2A    STX      SCRBF3
562   D3DA  DE 8E              LDX      FIRING
563   D3DC  FF 8804            STX      SCRBF2
564   D3DF  C4 3F              AND  B   #$3F
565   D3E1  CA 80              ORA  B   #$80
566   D3E3  B6 4804            LDA  A   PIA2
567   D3E6  85 04              BIT  A   #4
```

```
568  03E8 27 19              BEQ    TOLATE-2
569  03EA 7A 0003            DEC    STEP
570  03ED 7A 0003            DEC    STEP
571  03F0 20 11              BRA    TOLATE-2
572                    *
573                    *
574                    *
575                    *
576                    *
577  03F2 7D 0015  TOSOON    TST    FSHIFT
578  03F5 2A 07              BPL    *+9
579  03F7 CE 0001            LDX    #1
580  03FA DF 15              STX    FSHIFT
581  03FC 20 62              BRA    SETFIN
582  03FE DE 15              LDX    FSHIFT
583  0400 08                 INX
584  0401 DF 15              STX    FSHIFT
585  0403 20 5B              BRA    SETFIN
586                    *
587  0405 7D 0015  TOLATE    TST    FSHIFT
588  0408 2B 07              BMI    *+9
589  040A CE FFFF            LDX    #$FFFF
590  040D DF 15              STX    FSHIFT
591  040F 20 4F              BRA    SETFIN
592  0411 DE 15              LDX    FSHIFT
593  0413 09                 DEX
594  0414 DF 15              STX    FSHIFT
595  0416 20 48              BRA    SETFIN
596
597                    *
598                    *
599  0418 FF 0002  SET3A     STX    SCRBF1
600  041B DE 0E              LDX    FIRING
601  041D FF 0006            STX    SCRBF3
602  0420 C4 F3              AND B  #$F3
603  0422 CA 04              ORA B  #$04
604  0424 B6 4004            LDA A  PIA2
605  0427 85 04              BIT A  #4
606  0429 27 C7              BEQ    TOSOON
607  042B 20 D8              BRA    TOLATE
608  042D FF 0004  SET1B     STX    SCRBF2
609  0430 DE 0E              LDX    FIRING
610  0432 FF 0002            STX    SCRBF1
611  0435 C4 CF              AND B  #$CF
612  0437 CA 10              ORA B  #$10
613  0439 B6 4004            LDA A  PIA2
614  043C 85 04              BIT A  #4
615  043E 26 20              BNE    SETFIN
616  0440 7A 0003            DEC    STEP
617  0443 20 1B              BRA    SETFIN
618  0445 FF 0006  SET2B     STX    SCRBF3
619  0448 DE 0E              LDX    FIRING
620  044A FF 0004            STX    SCRBF2
621  044D C4 3F              AND B  #$3F
622  044F CA 40              ORA B  #$40
623  0451 B6 4004            LDA A  PIA2
624  0454 85 04              BIT A  #4
```

```
625   D456 26 08            BNE    SETFIN
626   D458 7A 0003          DEC    STEP
627   D458 7A 0003          DEC    STEP
628   D45E 20 08            BRA    SETFIN
629
630                    *
631   D460 17      SETFIN    TBA
632   D461 DA 2E            ORA  B  PWRSWT
633   D463 CA 03            ORA  B  #3
634   D465 F7 4002          STA  B  PIA+2
635   D468 4C               INC  A
636   D469 84 03            AND  A  #3
637   D46B 36               PSH  A
638   D46C 27 0E            BEQ    DISRHD
639   D46E A1 03            CMP  A  #3
640   D470 27 18            BEQ    SUBSTP
641   D472 4A               DEC  A
642   D473 27 0E            BEQ    DISLHD
643   D475 96 35            LDA  A  MIDLED
644   D477 B7 4006          STA  A  PIA2+2
645   D47A 20 73            BRA    DISOUT
646   D47C 96 34  DISRHD    LDA  A  RHLED
647   D47E B7 4006          STA  A  PIA2+2
648   D481 20 6C            BRA    DISOUT
649   D483 96 36  DISLHD    LDA  A  LHLED
650   D485 B7 4006          STA  A  PIA2+2
651   D488 20 65            BRA    DISOUT
652
653                    *
654   D48A 96 32  SUBSTP    LDA  A  SUBCNT
655   D48C 84 C0            AND  A  #$C0
656   D48E 8B 40            ADD  A  #$40
657   D490 97 32            STA  A  SUBCNT
658   D492 81 C0            CMP  A  #$C0
659   D494 27 35            BEQ    SRELAY
660                    *
661   D496 86 30            LDA  A  #$30
662   D498 B7 4007          STA  A  PIA2+3
663   D49B CE 0F34          LDX    #$0F34
664   D49E FF 4006          STX    PIA2+2
665                    *
666   D4A1 B6 4004          LDA  A  PIA2
667   D4A4 84 3F            AND  A  #$3F
668   D4A6 9A 32            ORA  A  SUBCNT
669   D4A8 B7 4004          STA  A  PIA2
670                    *
671   D4AB 96 32            LDA  A  SUBCNT
672   D4AD 27 0C            BEQ    RDLOSW
673   D4AF 81 40            CMP  A  #$40
674   D4B1 27 10            BEQ    RDHISW
675
676                    *
677   D4B3 B6 4006          LDA  A  PIA2+2
678   D4B6 43               COM  A
679   D4B7 97 2F            STA  A  KEYPAD
680   D4B9 20 21            BRA    SURFIN
681                    *
```

```
682   D4BB 86 4006  RDLOSW   LDA A   PIA2+2
683   D4BE 43                COM A
684   D4BF 97 31             STA A   LOSNSW
685   D4C1 20 19             BRA     SUBFIN
686                      *
687   D4C3 86 4006  RDHISW   LDA A   PIA2+2
688   D4C6 43                COM A
689   D4C7 97 30             STA A   HISNSW
690   D4C9 20 11             BRA     SUBFIN
691                      *
692   D4CB 96 2B    SRELAY   LDA A   RELAYS
693   D4CD B7 4006           STA A   PIA2+2
694   D4D0 86 3C             LDA A   #$3C
695   D4D2 B7 4007           STA A   PIA2+3
696   D4D5 86 34             LDA A   #$34
697   D4D7 B7 4007           STA A   PIA2+3
698   D4DA 20 13             BRA     DISOUT
699                      *
700   D4DC 86 C0    SUBFIN   LDA A   #$C0
701   D4DE BA 4004           ORA A   PIA2
702   D4E1 B7 4004           STA A   PIA2
703   D4E4 86 3B             LDA A   #$3B
704   D4E6 B7 4007           STA A   PIA2+3
705   D4E9 CE FF34           LDX     #$FF34
706   D4EC FF 4006           STX     PIA2+2

707
708   D4EF 32       DISOUT   PUL A
709   D4F0 C4 FC             AND B   #$FC
710   D4F2 1B                ABA
711   D4F3 B7 4002           STA A   PIA+2
713                      *
714                      *
715                      *
716                      *
717   D4F6 B6 4004           LDA A   PIA2
718   D4F9 8A 20             ORA A   #$20
719   D4FB B7 4004           STA A   PIA2
720                      *
721   D4FE D6 3C             LDA B   DVSAM+3
722   D500 B6 4000           LDA A   PIA
723   D503 97 3C             STA A   DVSAM+3
724   D505 10                SBA
725   D506 97 3A             STA A   DVSAM+1
726   D508 07                TPA
727   D509 97 3B             STA A   DVSAM+2
728   D50B B6 4000           LDA A   PIA
729   D50E 1B                ABA
730   D50F 46                ROR A
731   D510 24 01             BCC     *+3
732   D512 4C                INC A
733   D513 97 39             STA A   DVSAM
734   D515 98 3E             AND A   DVSAM+5
735   D517 97 3E             STA A   DVSAM+5
736   D519 24 03             BCC     *+5
737   D51B 7C 003F           INC     DVSAM+6
738   D51E 7A 003D           DEC     DVSAM+4
```

```
739    D521 26 BF              BNE         *+17
740    D523 96 3F              LDA    A    DVSAM+6
741    D525 7D 003E            TST         DVSAM+5
742    D528 2A 01              BPL         *+3
743    D52A 4C                 INC    A
744    D52B 97 40              STA    A    DVSAM+7
745    D52D CE 0000            LDX         #0
746    D530 DF 3E              STX         DVSAM+5
747
748    D532 86 3C              LDA    A    #$3C
749    D534 B7 4005            STA    A    PIA2+1
750    D537 01                 NOP
751    D538 01                 NOP
752    D539 86 34              LDA    A    #$34
753    D53B B7 4005            STA    A    PIA2+1
754    D53E 86 0B              LDA    A    #11
755    D540 4A                 DEC    A
756    D541 26 FD              BNE         *-1
757
758                      *
759    D543 D6 44              LDA    B    DISAM+3
760    D545 B6 4000            LDA    A    PIA
761    D548 97 44              STA    A    DISAM+3
762    D54A 1B                 BBA
763    D54B 97 42              STA    A    DISAM+1
764    D54D 07                 TPA
765    D54E 97 43              STA    A    DISAM+2
766    D550 B6 4000            LDA    A    PIA
767    D553 1B                 ABA
768    D554 46                 ROR    A
769    D555 24 01              BCC         *+3
770    D557 4C                 INC    A
771    D558 97 41              STA    A    DISAM
772    D55A 9B 46              ADD    A    DISAM+5
773    D55C 97 46              STA    A    DISAM+5
774    D55E 24 03              BCC         *+5
775    D560 7C 0047            INC         DISAM+6
776    D563 7A 0045            DEC         DISAM+4
777    D566 26 0F              BNE         *+17
778    D568 96 47              LDA    A    DISAM+6
779    D56A 7D 0046            TST         DISAM+5
780    D56D 2A 01              BPL         *+3
781    D56F 4C                 INC    A
782    D570 97 48              STA    A    DISAM+7
783    D572 CE 0000            LDX         #0
784    D575 DF 46              STX         DISAM+5
785                      *
786    D577 B6 4004            LDA    A    PIA2
787    D57A 84 DF              AND    A    #$DF
788    D57C B7 4004            STA    A    PIA2
789    D57F 7C 0049            INC         NEWRDY
790
791                      *
792                      *
793                      *
794    D582 7D 63C6            TST         RAMPM+16
795    D585 27 37              BEQ         RAMP6
```

```
796    D587 FE 63BD             LDX     RAMPM+7
797    D58A 27 06               BEQ     RAMP2
798    D58C 09        RAMP1     DEX
799    D58D FF 63BD             STX     RAMPM+7
800    D590 20 2C               BRA     RAMP6
801    D592 B6 63BC   RAMP2     LDA  A  RAMPM+6
802    D595 27 06               BEQ     RAMP3
803    D597 4A                  DEC  A
804    D598 B7 63BC             STA  A  RAMPM+6
805    D59B 20 EF               BRA     RAMP1
806    D59D 96 22    RAMP3      LDA  A  SETING
807    D59F B1 63C5             CMP  A  RAMPM+15
808    D5A2 27 0A               BEQ     RAMP5
809    D5A4 BB 63C4             ADD  A  RAMPM+14
810    D5A7 97 22               STA  A  SETING
811    D5A9 BD DE8A             JSR     RAMP4
812    D5AC 20 1A               BRA     RAMP6
813    D5AE 7F 63C6  RAMP5      CLR     RAMPM+16
814    D5B1 4D                  TST  A
815    D5B2 26 0A               BNE     RAMP6
816    D5B4 7F 8A2D             CLR     ARCONF
817    D5B7 86 FF               LDA  A  #$FF
818    D5B9 97 2E               STA  A  PWRSWT
819    D5BB 7E D656             JMP     IRQOUT
820                     *
821                     *
822                     *
823    D5BE 96 2E    RAMP6      LDA  A  PWRSWT
824    D5C0 4A                  DEC  A
825    D5C1 27 0A               BEQ     FIXCV
826    D5C3 4A                  DEC  A
827    D5C4 27 3C               BEQ     FIXCA
828    D5C6 4A                  DEC  A
829    D5C7 26 F2               BNE     RAMP6-3
830    D5C9 DE 01               LDX     IRQCR
831    D5CB 6E 00               JMP     0,X
832                     *
833                     *
834
835                     *
836    D5CD D6 39    FIXCV      LDA  B  DVSAM
837    D5CF D1 22               CMP  B  SETING
838    D5D1 22 1A               BHI     DECRV
839    D5D3 26 03               BNE     INCRV
840    D5D5 7E D656             JMP     IRQOUT
841    D5D8 96 22    INCRV      LDA  A  SETING
842    D5DA 10                  SBA
843    D5DB CE 6896             LDX     #TERRNM
844    D5DE D6 3B               LDA  B  DVSAM+2
845    D5E0 54                  LSR  B
846    D5E1 24 03               BCC     *+5
847    D5E3 CE 68A0             LDX     #TERRM
848    D5E6 8D 4F               BSR     TBLOOK
849    D5E8 BD D2CD             JSR     INCR
850    D5EB 20 EB               BRA     INCRV-3
851    D5ED D0 22    DECRV      SUB  B  SETING
852    D5EF 17                  TBA
```

```
853   D5F0 CE 6000              LDX   #TERRM
854   D5F3 D6 38                LDA B DVSAM+2
855   D5F5 54                   LSR A
856   D5F6 24 03                BCC   *+5
857   D5F8 CE 6096              LDX   #TERRNM
858   D5FB 8D 3A                BSR   TBLOOK
859   D5FD BD 0289              JSR   DECR
860   D600 20 D3                BRA   INCRV-3
861                       *
862   D602 D6 41    FIXCA       LDA B DISAM
863   D604 D1 22                CMP B SETING
864   D606 22 1A                BHI   DECRA
865   D608 26 03                BNE   INCRA
866   D60A 7E 0656              JMP   IRQOUT
867   D60D 96 22    INCRA       LDA A SETING
868   D60F 10                   SBA
869   D610 CE 6096              LDX   #TERRNM
870   D613 D6 43                LDA B DISAM+2
871   D615 54                   LSR A
872   D616 24 03                BCC   *+5
873   D618 CE 6000              LDX   #TERRM
874   D61B 8D 1A                BSR   TBLOOK
875   D61D BD 02CD              JSR   INCR
876   D620 20 E8                BRA   INCRA-3
877   D622 D0 22    DECRA       SUB B SETING
878   D624 17                   TBA
879   D625 CE 6000              LDX   #TERRM
880   D628 D6 43                LDA B DISAM+2
881   D62A 54                   LSR A
882   D62B 24 03                BCC   *+5
883   D62D CE 6096              LDX   #TERRNM
884   D630 8D 05                BSR   TBLOOK
885   D632 BD 0289              JSR   DECR
886   D635 20 D3                BRA   INCRA-3
887
888                       *
889   D637 81 4A    TBLOOK      CMP A #ETMAX-1
890   D639 23 02                BLS   *+4
891   D63B 86 4A                LDA A #ETMAX-1
892   D63D 16                   TAB
893   D63E DF 84                STX   ERRORT
894   D640 9B 85                ADD A ERRORT+1
895   D642 24 03                BCC   *+5
896   D644 7C 0084              INC   ERRORT
897   D647 1B                   ABA
898   D648 24 03                BCC   *+5
899   D64A 7C 0084              INC   ERRORT
900   D64D 97 85                STA A ERRORT+1
901   D64F DE 84                LDX   ERRORT
902   D651 EE 00                LDX   0,X
903   D653 DF 84                STX   ERRORT
904   D655 39                   RTS
905
906                       *
907   D656 96 11    IRQOUT      LDA A LFOSC+1
908   D658 D6 10                LDA B LFOSC
909   D65A 9B 16                ADD A FSHIFT+1
```

```
910  D65C 09 15          ADC B   FSHIFT
911  D65E D7 17          STA B   FSHIFT+2
912  D660 97 18          STA A   FSHIFT+3
913  D662 DE 17          LDX     FSHIFT+2
914  D664 FF 28A2        STX     TIMBF1
915  D667 7D 0A14        TST     LFOSC+4
916  D66A 26 03          BNE     *+5
917  D66C 7E D739        JMP     NULRTI
918
919                  *
920                  *
921                  *
922  D66F 01             NOP
923  D670 0E             CLI
924  D671 96 13          LDA A   LFOSC+3
925  D673 D6 12          LDA B   LFOSC+2
926  D675 43             COM A
927  D676 53             COM B
928  D677 54             LSR B
929  D678 46             ROR A
930  D679 54             LSR B
931  D67A 46             ROR A
932  D67B 54             LSR B
933  D67C 46             ROR A
934  D67D 97 11          STA A   LFOSC+1
935  D67F D7 10          STA B   LFOSC
936  D681 74 0A10 DIVFRQ LSR     LFOSC
937  D684 76 0A11        ROR     LFOSC+1
938  D687 74 0A10        LSR     LFOSC
939  D68A 76 0A11        ROR     LFOSC+1
940  D68D 9B 11          ADD A   LFOSC+1
941  D68F D9 10          ADC B   LFOSC
942  D691 7A 0A14        DEC     LFOSC+4
943  D694 26 EB          BNE     DIVFRQ
944  D696 97 11          STA A   LFOSC+1
945  D698 C1 03          CMP B   #3
946  D69A 22 02          BHI     *+4
947  D69C C6 03          LDA B   #3
948  D69E D7 10          STA B   LFOSC
949                  *
950                  *
951                  *
952                  *
953                  *
954
955                  *
956                  *
957                  *
958  D6A0 7A 0A25        DEC     CLK2+1
959  D6A3 26 14          BNE     *+22
960  D6A5 86 06          LDA A   #LINEF1
961  D6A7 97 25          STA A   CLK2+1
962  D6A9 7D 0A24        TST     CLK2
963  D6AC 27 03          BEQ     *+5
964  D6AE 7A 0A24        DEC     CLK2
965  D6B1 7D 0A37        TST     LEDCLK
966  D6B4 27 03          BEQ     *+5
967  D6B6 7A 0A37        DEC     LEDCLK
```

```
968
969   06A9 7A 8A27          DEC    CLK1+1
970   06AC 26 32            BNE    LOGSND-2
971   06AE 86 3C            LDA  A #LINEF
972   06C0 97 27            STA  A CLK1+1
973   06C2 7D 8A26          TST    CLK1
974   06C5 27 03            BEQ    *+5
975   06C7 7A 8A26          DEC    CLK1
976   06CA 7D 8A3A          TST    XFORMR
977   06CD 27 03            BEQ    *+5
978   06CF 7A 8A3A          DEC    XFORMR
979
980                    *
981                    *
982                    *
983   06D2 7D 63CE          TST    LOGGER+1
984   06D5 27 62            BEQ    NULRTI
985   06D7 7D 8B20          TST    ARCONF
986   06DA 27 42            BEQ    LOGWAI
987   06DC 7D 63CF          TST    LOGGER+2
988   06DF 27 11            BEQ    LOGSND
989   06E1 CE 072E          LDX    #LOGMSG
990   06E4 C6 0A            LDA  B #11
991   06E6 8D 3C            BSR    LOGOUT
992   06E8 86 01            LDA  A #1
993   06EA B7 63CD          STA  A LOGGER
994   06ED 7F 63CF          CLR    LOGGER+2
995   06F0 20 47            BRA    NULRTI
996   06F2 7A 63CD  LOGSND  DEC    LOGGER
997   06F5 26 42            BNE    NULRTI
998   06F7 B6 63CE          LDA  A LOGGER+1
999   06FA B7 63CD          STA  A LOGGER
1000  06FD CE 63C7          LDX    #LOGDAT
1001  0700 C6 02            LDA  B #2
1002  0702 8D 20            BSR    LOGOUT
1003  0704 86 2E            LDA  A #$2E
1004  0706 BD 0294          JSR    OUTCH
1005  0709 5C               INC  B
1006  070A 8D 18            BSR    LOGOUT
1007  070C 86 20            LDA  A #$20
1008  070E BD 0294          JSR    OUTCH
1009  0711 C6 03            LDA  B #3
1010  0713 8D 0F            BSR    LOGOUT
1011  0715 C6 02            LDA  B #2
1012  0717 CE 072E          LDX    #LOGMSG
1013  071A 8D 08            BSR    LOGOUT
1014  071C 20 1B            BRA    NULRTI
1015  071E 07       LOGWAI  TPA
1016  071F B7 63CF          STA  A LOGGER+2
1017  0722 20 15            BRA    NULRTI
1018  0724 A6 00    LOGOUT  LDA  A 0,X
1019  0726 08               INX
1020  0727 BD 0294          JSR    OUTCH
1021  072A 5A               DEC  B
1022  072B 26 F7            BNE    LOGOUT
1023  072D 39               RTS
1024  072E      LOGMSG      FCB    $D,$A
```

```
1025   D73A                       FCC    /NEW LOG/
1026   D737                       FCB    $D,$A
1027   D739 01         NULRTI     NOP
1028   D73A 3B                    RTI
1029                  *
1030                  *
1031                  *
1032                  *
1033                  *
1034
1035                  *
1036                  *
1037                  *
1038                  *
1039   D73B D6 2A      KEYLFD     LDA B  HESTOP
1040   D73D D4 30                 AND B  HISNSW
1041   D73F 26 18                 BNE    ESTOP
1042   D741 D6 29                 LDA B  LESTOP
1043   D743 D4 31                 AND B  LOSNSW
1044   D745 26 12                 BNE    ESTOP
1045   D747 D6 2F                 LDA B  KEYPAD
1046   D749 C4 F8                 AND B  #$F8
1047   D74B 26 03                 BNE    *+5
1048   D74D 7E D904               JMP    NOKEY
1049                  *
1050   D750 7D 082B               TST    RUNWAI
1051   D753 27 41                 BEQ    NOTRUN
1052                  *
1053   D755 C5 80                 BIT B  #$80
1054   D757 27 11                 BEQ    NOSTOP
1055                  *
1056                  *
1057   D759 BD D124   ESTOP       JSR    HLTALL
1058   D75C DE 64                 LDX    RUNPC
1059   D75E BD D84F               JSR    DLNUM
1060   D761 D6 2F                 LDA B  KEYPAD
1061   D763 C4 F8                 AND B  #$F8
1062   D765 26 FA                 BNE    *-4
1063   D767 7E D904               JMP    NOKEY
1064                  *
1065   D76A 7D 082C   NOSTOP      TST    SSTEP
1066   D76D 27 0A                 BEQ    NOSTP0
1067   D76F C5 40                 BIT B  #$40
1068   D771 27 06                 BEQ    NOSTP0
1069   D773 86 3F                 LDA A  #$3F
1070   D775 97 2C                 STA A  SSTEP
1071   D777 20 E3                 BRA    ESTOP+3
1072                  *
1073   D779 96 22     NOSTP0      LDA A  SETING
1074   D77B C5 10                 BIT B  #$10
1075   D77D 27 06                 BEQ    NOSTP1
1076   D77F 4D                    TST A
1077   D780 27 11                 BEQ    NOSTP3
1078   D782 4A                    DEC A
1079   D783 20 09                 BRA    NOSTP2
1080   D785 C5 20     NOSTP1      BIT B  #$20
1081   D787 27 0A                 BEQ    NOSTP3
```

```
1082  0789 81 FF              CMP A   #$FF
1083  078A 27 06              BEQ     NOSTP3
1084  078D 4C                 INC A
1085  078E 97 22    NOSTP2    STA A   SETING
1086  0790 BD DA78            JSR     DLYKEY
1087  0793 7E D90A  NOSTP3    JMP     NOKEY+4
1088
1089                *
1090                *
1091  0796 C5 80    NOTRUN    BIT B   #$80
1092  0798 27 0D              BEQ     NOTSRS
1093                *
1094  079A BD D124            JSR     HLTALL
1095  079D FE A014            LDX     STRTPC
1096  07A0 8D 57              BSR     ID16B
1097  07A2 FF A014            STX     STRTPC
1098  07A5 20 10              BRA     KEYFIN
1099  07A7 C5 40    NOTSRS    BIT B   #$40
1100  07A9 27 0A              BEQ     NOTLN
1101                *
1102  07AB FE A016            LDX     LNUM
1103  07AE 8D 49              BSR     ID16B
1104  07B0 FF A016            STX     LNUM
1105  07B3 20 02              BRA     KEYFIN
1106                *
1107  07B5 8D 10    NOTLN     BSR     ID8B
1108  07B7 D6 2F    KEYFIN    LDA B   KEYPAD
1109  07B9 C4 F8              AND B   #$F8
1110  07BB 26 D9              BNE     NOTRUN
1111  07BD BD 0A41            JSR     PUTCRC
1112  07C0 86 FF              LDA A   #$FF
1113  07C2 97 38              STA A   XFORMR
1114  07C4 7E D904            JMP     NOKEY
1115                *
1116                *
1117                *
1118  07C7 86 21    ID8B      LDA A   #$21
1119  07C9 97 52              STA A   KEYSPD
1120  07CB FE A016            LDX     LNUM
1121  07CE A6 00              LDA A   0,X
1122  07D0 D6 2F              LDA B   KEYPAD
1123  07D2 C5 10              BIT B   #$10
1124  07D4 27 06              BEQ     ID8B1
1125  07D6 4D                 TST A
1126  07D7 27 0C              BEQ     ID8B2
1127  07D9 4A                 DEC A
1128  07DA 20 09              BRA     ID8B2
1129  07DC C5 20    ID8B1     BIT B   #$20
1130  07DE 27 0E              BEQ     ID8B3
1131  07E0 81 FF              CMP A   #$FF
1132  07E2 27 01              BEQ     ID8B2
1133  07E4 4C                 INC A
1134  07E5 A7 00    ID8B2     STA A   0,X
1135  07E7 8D 0D              BSR     ID8B4
1136  07E9 BD DA7A            JSR     DLYKEY
1137  07EC 20 DD              BRA     ID8B+4
1138  07EE C4 F8    ID8B3     AND B   #$F8
```

```
1139  D7F0 27 04              BEQ     ID884
1140  D7F2 8D 02              BSR     ID884
1141  D7F4 20 D1              BRA     ID88
1142  D7F6 7E DADC   ID884    JMP     GFDSP
1143
1144                  *
1145                  *
1146                  *
1147  D7F9 86 21     ID16A    LDA A   #$33
1148  D7FB 97 52              STA A   KEYSPD
1149  D7FD D6 2F              LDA B   KEYPAD
1150  D7FF C5 10              BIT B   #$10
1151  D801 27 03              BEQ     ID16A1
1152  D803 09                 DEX
1153  D804 20 05              BRA     ID16A2
1154  D806 C5 20     ID16A1   BIT B   #$20
1155  D808 27 08              BEQ     ID16A3
1156  D80A 08                 INX
1157  D80B 8D 19     ID16A2   BSR     ID16A4
1158  D80D 8D 4A              BSR     DLNUM
1159  D80F 8D 67              BSR     DLYKEY
1160  D811 DE 53              LDX     PARMPX
1161  D813 20 E4              BRA     ID16A+4
1162  D815 8D 0F     ID16A3   BSR     ID16A4
1163  D817 C4 F8              AND B   #$F8
1164  D819 27 34              BEQ     DLNUM
1165  D81B C1 C8              CMP B   #$C8
1166  D81D 26 03              BNE     *+5
1167  D81F 7E D894            JMP     RUNPGM
1168  D822 8D 2B              BSR     DLNUM
1169  D824 20 D3              BRA     ID16A
1170                  *
1171                  *
1172                  *
1173  D826 DF 06     ID16A4   STX     TEMP
1174                  *
1175  D828 CE A01A            LDX     #PGMRAM
1176  D82B DF 53              STX     PARMPX
1177  D82D 96 07              LDA A   TEMP+1
1178  D82F 90 54              SUB A   PARMPX+1
1179  D831 96 06              LDA A   TEMP
1180  D833 92 53              SBC A   PARMPX
1181  D835 2A 03              BPL     *+5
1182  D837 DE 53              LDX     PARMPX
1183  D839 39                 RTS
1184                  *
1185  D83A CE A3FF            LDX     #$A3FF
1186  D83D DF 53              STX     PARMPX
1187  D83F 96 54              LDA A   PARMPX+1
1188  D841 90 07              SUB A   TEMP+1
1189  D843 96 53              LDA A   PARMPX
1190  D845 92 06              SBC A   TEMP
1191  D847 2A 03              BPL     *+5
1192  D849 DE 53              LDX     PARMPX
1193  D84B 39                 RTS
1194  D84C DE 06              LDX     TEMP
1195  D84E 39                 RTS
```

```
1196
1197                    *
1198                    *
1199                    *
1200    D84F DF 53   DLNUM       STX     PARMPX
1201    D851 CE A018             LDX     #PGMRAM
1202    D854 DF 06               STX     TEMP
1203    D856 96 54               LDA A   PARMPX+1
1204    D858 9A 07               SUB A   TEMP+1
1205    D85A D6 53               LDA B   PARMPX
1206    D85C D2 06               SBC B   TEMP
1207    D85E CE 0000 DLNUM1      LDX     #0
1208    D861 DF 4F               STX     HUNS
1209    D863 5D                  TST B
1210    D864 27 09               BEQ     *+11
1211    D866 80 64               SUB A   #100
1212    D868 C2 00               SBC B   #0
1213    D86A 7C 004F             INC     HUNS
1214    D86D 20 F4               BRA     *-10
1215    D86F BD D221             JSR     CODE1+5
1216    D872 BD D187             JSR     WRTLED-1
1217    D875 DE 53               LDX     PARMPX
1218    D877 39                  RTS
1219                    *
1220                    *
1221                    *
1222    D878 D6 52   DLYKEY      LDA B   KEYSPD
1223    D87A 5A                  DEC B
1224    D87B 27 0E               BEQ     WAIT00
1225    D87D D7 52               STA B   KEYSPD
1226    D87F CE 52FF             LDX     #$52FF
1227    D882 C1 1A               CMP B   #26
1228    D884 22 08               BHI     WAIT00+3
1229    D886 CE 16FF             LDX     #$16FF
1230    D889 20 03               BRA     WAIT00+3
1231    D88B CE 04FF WAIT00      LDX     #$04FF
1232    D88E 09                  DEX
1233    D88F 08                  INX
1234    D890 09                  DEX
1235    D891 26 FB               BNE     *-3
1236    D893 39                  RTS
1237
1238                    *
1239    D894 BD D8CD RUNPGM      JSR     DASH
1240    D897 B6 A015             LDA A   STRTPC+1
1241    D89A 84 FE               AND A   #$FE
1242    D89C B7 A015             STA A   STRTPC+1
1243    D89F 7F 004F             CLR     HUNS
1244    D8A2 D6 2F   KEYOR       LDA B   KEYPAD
1245    D8A4 C4 F0               AND B   #$F0
1246    D8A6 27 06               BEQ     *+8
1247    D8A8 DA 4F               ORA B   HUNS
1248    D8AA D7 4F               STA B   HUNS
1249    D8AC 20 F4               BRA     KEYOR
1250    D8AE D6 4F               LDA B   HUNS
1251    D8B0 C1 0A               CMP B   #$0A
1252    D8B2 27 12               BEQ     DNLDRM
```

```
1253  D8B4 C1 E0            CMP B  #$E0
1254  D8B6 27 45            BEQ    PUNCHT
1255  D8B8 C1 F0            CMP B  #$F0
1256  D8BA 27 33            BEQ    DNLDFN
1257                *
1258                *
1259  D8BC FE A814  RUNGO   LDX    STRTPC
1260  D8BF DF 64            STX    RUNPC
1261  D8C1 07               TPA
1262  D8C2 97 28            STA A  RUNWAI
1263  D8C4 20 29            BRA    DNLDFN
1264                *
1265                *
1266  D8C6 FE DE97  DNLDPM  LDX    CANPGM-4
1267  D8C9 FF A816          STX    LNUM
1268  D8CC FE DE99          LDX    CANPGM-2
1269  D8CF FF A814          STX    STRTPC
1270  D8D2 FE DE9B          LDX    CANPGM
1271  D8D5 DF 06            STX    TEMP
1272  D8D7 CE DE9F          LDX    #CANPGM+4
1273  D8DA AC DE9D  DNLDLP  CPX    CANPGM+2
1274  D8DD 27 10            BEQ    DNLDFN
1275  D8DF A6 00            LDA A  0,X
1276  D8E1 08               INX
1277  D8E2 DF 53            STX    PARMPX
1278  D8E4 DE 06            LDX    TEMP
1279  D8E6 A7 00            STA A  0,X
1280  D8E8 08               INX
1281  D8E9 DF 06            STX    TEMP
1282  D8EB DE 53            LDX    PARMPX
1283  D8ED 20 EB            BRA    DNLDLP
1284  D8EF D6 2F    DNLDFN  LDA B  KEYPAD
1285  D8F1 C4 F0            AND B  #$F0
1286  D8F3 26 FA            BNE    DNLDFN
1287  D8F5 BD DA41          JSR    PUTCRC
1288  D8F8 31               INS
1289  D8F9 31               INS
1290  D8FA 7E D9D4          JMP    NOKEY
1291
1292                *
1293                *
1294                *
1295  D8FD 86 A817  PUNCHT  LDA A  LNUM+1
1296  D900 B0 A815          SUB A  STRTPC+1
1297  D903 96 A816          LDA A  LNUM
1298  D906 B2 A814          SBC A  STRTPC
1299  D909 25 E4            BCS    DNLDFN
1300  D90B FE A816          LDX    LNUM
1301  D90E DF 64            STX    RUNPC
1302  D910 BD DA56          JSR    UPDATE-6
1303  D913 FE A814          LDX    STRTPC
1304  D916 FF A816          STX    LNUM
1305                *
1306  D919 BD D9CA          JSR    LEADER
1307  D91C C6 07    PUNLP   LDA B  #7
1308  D91E CE DAA8          LDX    #EOLDAT
1309  D921 BD D724          JSR    LOGOUT
```

```
1310  D924 FE A816         LDX    LNUM
1311  D927 08              INX
1312  D928 BD DA5C         JSR    UPDATE
1313  D92A BD DA5C         JSR    UPDATE
1314  D92E FE A816         LDX    LNUM
1315  D931 BD 084F         JSR    DLNUM
1316  D934 8D 76           BSR    PUNIT
1317  D936 BD D2B2         JSR    WAIXMB
1318  D939 BD DADC         JSR    GFDSP
1319  D93C 96 4F           LDA A  HUNS
1320  D93E 8B 08           ADD A  #8
1321  D940 CE DA8A         LDX    #NUMA
1322  D943 BD D1C3         JSR    ADDAX
1323  D946 A6 00           LDA A  0,X
1324  D948 BD D294         JSR    OUTCH
1325  D94B 5F              CLR B
1326  D94C 8D 64           BSR    PUNIT0
1327  D94E FE A816         LDX    LNUM
1328  D951 08              INX
1329  D952 FF A816         STX    LNUM
1330  D955 BD DADC         JSR    GFDSP
1331  D958 8D 52           BSR    PUNIT
1332  D95A FE A816         LDX    LNUM
1333  D95D 9C 64           CPX    RUNPC
1334  D95F 27 10           BEQ    PUN99
1335  D961 09              DEX
1336  D962 9C 64           CPX    RUNPC
1337  D964 27 0B           BEQ    PUN99
1338  D966 08              INX
1339  D967 08              INX
1340  D968 FF A816         STX    LNUM
1341  D96B 96 2F           LDA A  KEYPAD
1342  D96D 84 80           AND A  #$80
1343  D96F 27 AB           BEQ    PUNLP
1344
1345                                *
1346  D971 C6 06    PUN99  LDA B  #6
1347  D973 CE DAA8         LDX    #EOLDAT
1348  D976 BD D724         JSR    LOGOUT
1349  D979 8D 4F           BSR    LEADER
1350  D97B BD D2B2         JSR    WAIXMB
1351  D97E CE DAAF         LDX    #CKSMSG
1352  D981 C6 06           LDA B  #6
1353  D983 BD D724         JSR    LOGOUT
1354  D986 7F 0833         CLR    DPMASK
1355  D989 96 55           LDA A  CRCREG
1356  D98B BD D21C         JSR    CODEI
1357  D98E 8D 1C           BSR    PUNIT
1358  D990 96 56           LDA A  CRCREG+1
1359  D992 BD D21C         JSR    CODEI
1360  D995 8D 15           BSR    PUNIT
1361  D997 C6 06           LDA B  #6
1362  D999 CE DAA8         LDX    #EOLDAT
1363  D99C BD D724         JSR    LOGOUT
1364  D99F BD D2B2         JSR    WAIXMB
1365  D9A2 8D 26           BSR    LEADER
1366  D9A4 DE 64           LDX    RUNPC
```

```
1367  D9A6 FF A816            STX    LNUM
1368  D9A9 7E D8EF            JMP    DNLDFN
1369                   *
1370  D9AC D6 33     PUNIT    LDA B  OPMASK
1371  D9AE 96 4F              LDA A  HUNS
1372  D9B0 8D 0D              BSR    PUNIT1
1373  D9B2 96 50     PUNIT0   LDA A  TENS
1374  D9B4 8D 09              BSR    PUNIT1
1375  D9B6 96 51              LDA A  ONES
1376  D9B8 8D 05              BSR    PUNIT1
1377  D9BA 86 20              LDA A  #$20
1378  D9BC 7E D294            JMP    OUTCH
1379  D9BF 8B 30     PUNIT1   ADD A  #$30
1380  D9C1 BD D294            JSR    OUTCH
1381  D9C4 86 2E              LDA A  #'.
1382  D9C6 58                 ASL B
1383  D9C7 25 F6              BCS    PUNIT1+2
1384  D9C9 39                 RTS
1385                   *
1386  D9CA C6 32     LEADER   LDA B  #50
1387  D9CC 4F                 CLR A
1388  D9CD BD D294            JSR    OUTCH
1389  D9D0 5A                 DEC B
1390  D9D1 26 F9              BNE    *-5
1391  D9D3 39                 RTS
1392
1393  D9D4 86 21     NOKEY    LDA A  #$21
1394  D9D6 97 52              STA A  KEYJPD
1395  D9D8 7D 0029            TST    RUNWAI
1396  D9DB 26 1F              BNE    DOLEDS
1397  D9DD 7D 002D            TST    ARCONF
1398  D9E0 26 1A              BNE    DOLEDS
1399  D9E2 96 38              LDA A  XFORMR
1400  D9E4 81 FA              CMP A  #$FA
1401  D9E6 23 03              BLS    *+5
1402  D9E8 7E DADC            JMP    GFDSP
1403  D9EB 4D                 TST A
1404  D9EC 27 03              BEQ    *+5
1405  D9EE 7E D8D2            JMP    SMILE
1406                   *
1407  D9F1 BD D8DE            JSR    SLEEP
1408  D9F4 86 34              LDA A  #$34
1409  D9F6 B7 4001            STA A  PIA+1
1410  D9F9 7E D886            JMP    WAITRA-5

1411
1412  D9FC 86 FA     DOLEDS   LDA A  #$FA
1413  D9FE 97 38              STA A  XFORMR
1414  DA00 7D 002D            TST    ARCONF
1415  DA03 27 21              BEQ    LEDFIN+1
1416  DA05 96 37              LDA A  LEDCLK
1417  DA07 2B 1C              BMI    LEDFIN
1418  DA09 27 06              BEQ    LEDVOL
1419  DA0B 81 28              CMP A  #$28
1420  DA0D 22 0D              BHI    LEDAMP
1421  DA0F 20 14              BRA    LEDFIN
1422  DA11 96 48     LEDVOL   LDA A  DVSAM+7
```

```
1423   DA13 BD D105            JSR     WVOLTS
1424   DA16 86 84              LDA A   #127+5
1425   DA18 97 37              STA A   LEDCLK
1426   DA1A 20 09              BRA     LEDFIN
1427   DA1C 96 48    LEDAMP    LDA A   DISAM+7
1428   DA1E BD D1FD            JSR     WAMPS
1429   DA21 86 05              LDA A   #5
1430   DA23 97 37              STA A   LEDCLK
1431   DA25 39       LEDFIN    RTS
1432   DA26 7E DFCD            JMP     DASH
1434                     *
1435   DA29 CE A3FF  TSTCRC    LDX     #PGMRAM+BRAML-1
1436   DA2C 8D 2E              BSR     UPDATE-6
1437   DA2E 8D 2C              BSR     UPDATE
1438   DA30 8C A81B            CPX     #CRCWRD-1
1439   DA33 26 F9              BNE     *-5
1440   DA35 DE 55              LDX     CRCREG
1441   DA37 26 02              BNE     *+4
1442   DA39 0C                 CLC
1443   DA3A 39                 RTS
1444   DA3B 07                 TPA
1445   DA3C B7 A81B            STA A   STALE
1446   DA3F 0D                 SEC
1447   DA40 39                 RTS 1448
1449                     *
1450   DA41 CE A3FF  PUTCRC    LDX     #PGMRAM+BRAML-1
1451   DA44 8D 1B              BSR     UPDATE-6
1452   DA46 8D 14              BSR     UPDATE
1453   DA48 8C A81C            CPX     #CRCWRD+1
1454   DA4B 26 F9              BNE     *-5
1455   DA4D DE 55              LDX     CRCREG
1456   DA4F FF A81B            STX     CRCWRD
1457   DA52 7F A81B            CLR     STALE
1458   DA55 39                 RTS 1459
1460                     *
1461   DA56 86 AA              LDA A   #$AA
1462   DA58 97 55              STA A   CRCREG
1463   DA5A 97 56              STA A   CRCREG+1
1464   DA5C 86 08    UPDATE    LDA A   #8
1465   DA5E 97 57              STA A   CRCREG+2
1466   DA60 E6 00              LDA B   0,X
1467   DA62 4F       KRANKN    CLR A
1468   DA63 54                 LSR B
1469   DA64 49                 ROL A
1470   DA65 98 56              EOR A   CRCREG+1
1471   DA67 97 56              STA A   CRCREG+1
1472   DA69 84 01              AND A   #1
1473   DA6B 27 08              BEQ     ROTAC
1474   DA6D 86 02              LDA A   #2
1475   DA6F 98 56              EOR A   CRCREG+1
1476   DA71 97 56              STA A   CRCREG+1
1477   DA73 86 40              LDA A   #$40
1478   DA75 98 55    ROTAC     EOR A   CRCREG
```

```
1479  DA77 44              LSR A
1480  DA78 76 0056         ROR    CRCREG+1
1481  DA7B 24 02           BCC    *+4
1482  DA7D 8A 80           ORA A  #$80
1483  DA7F 97 55           STA A  CRCREG
1484  DA81 7A 0057         DEC    CRCREG+2
1485  DA84 26 DC           BNE    KRANKN
1486  DA86 09              DEX
1487  DA87 39              RTS
1488
1489                  *
1490                  *
1491                  *
1492  DA88         NUMB    FCB    $FC
1493  DA89                 FCB    $9A
1494  DA8A                 FCB    $7A
1495  DA8B                 FCB    $DA
1496  DA8C                 FCB    $96
1497  DA8D                 FCB    $CE
1498  DA8E                 FCB    $EE
1499  DA8F                 FCB    $98
1500  DA90                 FCB    $FE
1501  DA91                 FCB    $9E
1502  DA92                 FCB    $8E
1503  DA93                 FCB    $E6
1504  DA94                 FCB    $6C
1505  DA95                 FCB    $F2
1506  DA96                 FCB    $6E
1507  DA97                 FCB    $2E
1508                  *
1509  DA98                 FCB    $8E
1510  DA99                 FCB    $6C
1511  DA9A                 FCB    $2E
1512  DA9B                 FCB    $86
1513  DA9C                 FCB    $64
1514  DA9D                 FCB    $3E
1515  DA9E                 FCB    $F4
1516  DA9F                 FCB    $D6
1517  DAA0                 FCC    /ACFHLPUY/
1518  DAA8         EOLDAT  FCB    $D,0,0,$A,0,0,'N
1519  DAAF         CKSMSG  FCC    /CKSM= /
1520
1521                  *
1522  DAB5 36      STCLK1  PSH A
1523  DAB6 86 3C           LDA A  #LINEF
1524  DAB8 97 27           STA A  CLK1+1
1525  DABA 32              PUL A
1526  DABB 97 26           STA A  CLK1
1527  DABD 7F 0024         CLR    CLK2
1528  DAC0 39              RTS
1529
1530                  *
1531  DAC1 36      STCLK2  PSH A
1532  DAC2 86 86           LDA A  #LINEF1
1533  DAC4 97 25           STA A  CLK2+1
1534  DAC6 32              PUL A
```

```
1535   0AC7 97 24              STA A   CLK2
1536   0AC9 7F 0026            CLR     CLK1
1537   0ACC 39                 RTS 1538
1539                    *
1540   0ACD C1 0A     TIMEY    CMP B   #10
1541   0ACF 23 03              BLS     *+5
1542   0AD1 5F                 CLR B   1.
1543   0AD2 20 02              BRA     *+4
1544   0AD4 C6 40              LDA B   #$40
1545   0AD6 BD D21C            JSR     CODE1
1546   0AD9 7E D188            JMP     WRTLED
1547
1548                    *
1549                    *
1550   0ADC FE A016   GFDSP    LDX     LNUM
1551   0ADF DF 4F              STX     HUNS
1552   0AE1 77 005A            ASR     HUNS+1
1553   0AE4 25 31              BCS     OPRFMT
1554   0AE6 A6 00              LDA A   0,X
1555   0AE8 44                 LSR A
1556   0AE9 44                 LSR A
1557   0AEA 44                 LSR A
1558   0AEB 44                 LSR A
1559   0AEC 44                 LSR A
1560   0AED 8B 10              ADD A   #16
1561   0AEF 97 4F              STA A   HUNS
1562   0AF1 A6 00              LDA A   0,X
1563   0AF3 84 1F              AND A   #$1F
1564   0AF5 7F 0050            CLR     TENS
1565   0AF8 BD D22C            JSR     CODE20
1566   0AFB 5F                 CLR B
1567   0AFC 96 4F              LDA A   HUNS
1568   0AFE BD D188            JSR     GDIGIT
1569   0B01 97 36              STA A   LHLED
1570   0B03 96 50              LDA A   TENS
1571   0B05 BD D188            JSR     GDIGIT
1572   0B08 81 FC              CMP A   #$FC
1573   0B0A 26 01              BNE     *+3
1574   0B0C 4F                 CLR A
1575   0B0D 97 35              STA A   MIDLED
1576   0B0F 96 51              LDA A   ONES
1577   0B11 BD D188            JSR     GDIGIT
1578   0B14 97 34              STA A   RHLED
1579   0B16 39                 RTS
1580   0B17 A6 00     OPRFMT   LDA A   0,X
1581   0B19 36                 PSH A
1582   0B1A 09                 DEX
1583   0B1B A6 00              LDA A   0,X
1584   0B1D 16                 TAB
1585   0B1E C4 1F              AND B   #$1F
1586   0B20 44                 LSR A
1587   0B21 44                 LSR A
1588   0B22 44                 LSR A
1589   0B23 44                 LSR A
1590   0B24 44                 LSR A
```

```
1591  DB25 48              ASL   A
1592  DB26 CE DB31         LDX   #DSPVCT
1593  DB29 BD D1C3         JSR   ADDAX
1594  DB2C EE 00           LDX   0,X
1595  DB2E 32              PUL   A
1596  DB2F 6E 00           JMP   0,X
1597
1598  DB31        DSPVCT   FDB   DAMPS
1599  DB33                 FDB   CMDOPR
1600  DB35                 FDB   DSPDN
1601  DB37                 FDB   DSPDN
1602  DB39                 FDB   TIMEX
1603  DB3B                 FDB   DSPDN
1604  DB3D                 FDB   MVOLTS
1605  DB3F                 FDB   DSPDN 1606
1607  DB41 C1 0F   CMDOPR  CMP B #15
1608  DB43 22 06           BHI   *+8
1609                *
1610  DB45 5F              CLR   B
1611  DB46 48              ASL   A
1612  DB47 59              ROL   B
1613  DB48 7E DB5E         JMP   DLNUM1
1614                *
1615  DB4B 5F              CLR   B
1616  DB4C 48              ASL   A
1617  DB4D 59              ROL   B
1618  DB4E 8B E0           ADD   A #$E0
1619  DB50 C9 01           ADC   B #1
1620  DB52 7E DB5E         JMP   DLNUM1
1621
1622                *
1623                *
1624                *
1625                *
1626                *
1627                *
1628  DB55 CE 0110 CALCVT  LDX   #$0110
1629  DB58 DF 6A           STX   MFACT
1630  DB5A CE 8001         LDX   #$8001
1631  DB5D DF 6C           STX   MOFF
1632  DB5F CE 0104         LDX   #$0104
1633  DB62 DF 6E           STX   NMFACT
1634  DB64 CE 8004         LDX   #$8004
1635  DB67 DF 70           STX   NMOFF
1636                *
1637                *
1638                *
1639                *
1640  DB69 96 6A           LDA A MFACT
1641  DB6B DE 6C           LDX   MOFF
1642  DB6D FF 6000         STX   TERRM
1643  DB70 CE 6000         LDX   #TERRM
1644  DB73 D6 68   CALOP6  LDA B MRATE
```

```
1645  DB75 36            PSH A
1646  DB76 AB 01         ADD A   1,X
1647  DB78 A7 03         STA A   3,X
1648  DB7A A6 00         LDA A   0,X
1649  DB7C 24 01         BCC     *+3
1650  DB7E 4C            INC A
1651  DB7F A7 02         STA A   2,X
1652  DB81 08            INX
1653  DB82 08            INX
1654  DB83 8C 6096       CPX     #TERRM+ETSIZE
1655  DB86 27 07         BEQ     CALOP7
1656  DB88 32            PUL A
1657  DB89 5A            DEC B
1658  DB8A 26 E9         BNE     CALOP6+2
1659  DB8C 4C            INC A
1660  DB8D 20 E4         BRA     CALOP6
1661
1662                          *
1663                          *
1664                          *
1665                          *
1666  DB8F 32    CALOP7  PUL A
1667  DB90 96 6E         LDA A   NMFACT
1668  DB92 DE 70         LDX     NMOFF
1669  DB94 FF 6096       STX     TERRNM
1670  DB97 CE 6096       LDX     #TERRNM
1671  DB9A D6 6F CALOP8  LDA B   NMRATE
1672  DB9C 36            PSH A
1673  DB9D AB 01         ADD A   1,X
1674  DB9F A7 03         STA A   3,X
1675  DBA1 A6 00         LDA A   0,X
1676  DBA3 24 01         BCC     *+3
1677  DBA5 4C            INC A
1678  DBA6 A7 02         STA A   2,X
1679  DBA8 08            INX
1680  DBA9 08            INX
1681  DBAA 8C 612C       CPX     #TERRNM+ETSIZE
1682  DBAD 27 07         BEQ     CALOP9
1683  DBAF 32            PUL A
1684  DBB0 5A            DEC B
1685  DBB1 26 E9         BNE     CALOP8+2
1686  DBB3 4C            INC A
1687  DBB4 20 E4         BRA     CALOP8
1688  DBB6 32    CALOP9  PUL A
1689  DBB7 39            RTS
1690
1691                          *
1692                          *
1693                          *
1694                          *
1695                          *
1696                          *
1697  DBB8 CE 8F00 CALCAT LDX    #$8F00
1698  DBBB DF 6A         STX     MFACT
1699  DBBD CE 80F1       LDX     #$80F1
1700  DBC0 DF 6C         STX     MOFF
1701  DBC2 CE 8600       LDX     #$8600
```

```
1702  DBC5 DF 6E              STX    NMFACT
1703  DBC7 CE 0001             LDX    #$0001
1704  DBCA DF 70              STX    NMOFF
1705                    *
1706                    *
1707                    *
1708                    *
1709  DBCC 96 6A              LDA A  MFACT
1710  DBCE CE 608A             LDX    #TERRM
1711  DBD1 D6 6D              LDA B  MOFF+1
1712  DBD3 36       CALOP1    PSH A
1713  DBD4 6F 00              CLR    0,X
1714  DBD6 E7 01              STA B  1,X
1715  DBD8 08                 INX
1716  DBD9 08                 INX
1717  DBDA 8C 6096             CPX    #TERRM+ETSIZE
1718  DBDD 27 09              BEQ    CALOP3
1719  DBDF 4A                 DEC A
1720  DBE0 26 F2              BNE    CALOP1+1
1721  DBE2 32                 PUL A
1722  DBE3 90 6B              SUB A  MRATE
1723  DBE5 5C                 INC B
1724  DBE6 20 EA              BRA    CALOP1
1725
1726                    *
1727                    *
1728                    *
1729                    *
1730  DBE8 32       CALOP3    PUL A
1731  DBE9 96 6E              LDA A  NMFACT
1732  DBEB CE 6096             LDX    #TERRNM
1733  DBEE D6 71              LDA B  NMOFF+1
1734  DBF0 36       CALOP2    PSH A
1735  DBF1 6F 00              CLR    0,X
1736  DBF3 E7 01              STA B  1,X
1737  DBF5 08                 INX
1738  DBF6 08                 INX
1739  DBF7 8C 612C             CPX    #TERRNM+ETSIZE
1740  DBFA 27 09              BEQ    CALOP4
1741  DBFC 4A                 DEC A
1742  DBFD 26 F2              BNE    CALOP2+1
1743  DBFF 32                 PUL A
1744  DC00 90 6F              SUB A  NMRATE
1745  DC02 5C                 INC B
1746  DC03 20 EB              BRA    CALOP2
1747  DC05 32       CALOP4    PUL A
1748  DC06 39                 RTS
1749
1750                    *
1751                    *
1752                    *
1753                    *
1754  DC07 7D 0066  LINEIN    TST    ITYPE
1755  DC0A 26 05              BNE    *+7
1756  DC0C 7D 005F             TST    CRRCNT
1757  DC0F 26 09              BNE    *+11
1758  DC11 7D A010             TST    STALE
1759  DC14 27 03              BEQ    *+5
```

```
1760  DC16 7E 0A41          JMP   PUTCRC
1761  DC19 39               RTS
1762  DC1A BD D26E          JSR   INCH
1763  DC1D 84 7F            AND A #$7F
1764  DC1F 81 58            CMP A #'X
1765  DC21 27 12            BEQ   PASS
1766  DC23 81 4E            CMP A #'N
1767  DC25 27 0E            BEQ   PASS
1768  DC27 81 57            CMP A #'W
1769  DC29 26 03            BNE   *+5
1770  DC2B 7E FC0B          JMP   $FC0B
1771  DC2E 81 54            CMP A #'T
1772  DC30 26 05            BNE   LINEIN
1773  DC32 7E FC4E          JMP   $FC4E
1774  DC35 97 66    PASS    STA A ITYPE
1775  DC37 81 58            CMP A #'X
1776  DC39 27 05            BEQ   *+7
1777  DC3B BD DD4A          JSR   RDN3
1778  DC3E 97 67            STA A ILNUM
1779  DC40 BD DCC6          JSR   ICHAR
1780  DC43 25 2A            BCS   ABDCMD
1781  DC45 36               PSH A
1782  DC46 7F 0055          CLR   CRCREG
1783  DC49 BD DD29          JSR   RDN2
1784  DC4C 84 1F            AND A #$1F
1785  DC4E 33               PUL B
1786  DC4F CE DCFA          LDX   #OKCHAR+10
1787  DC52 E1 00            CMP B 0,X
1788  DC54 27 08            BEQ   *+10
1789  DC56 08               INX
1790  DC57 8B 20            ADD A #$20
1791  DC59 7C 0055          INC   CRCREG
1792  DC5C 20 F4            BRA   *-10
1793  DC5E 97 68            STA A ICMD
1794  DC60 96 55            LDA A CRCREG
1795  DC62 48               ASL A
1796  DC63 CE DCA2          LDX   #INVECT
1797  DC66 BD 01C3          JSR   ADDAX
1798  DC69 EE 00            LDX   0,X
1799  DC6B AD 00            JSR   0,X
1800  DC6D 20 0C            BRA   OPROK
1801
1802  DC6F 7F 0066 ABDCMD   CLR   ITYPE
1803  DC72 81 0D            CMP A #$0D
1804  DC74 27 91            BEQ   LINEIN
1805  DC76 BD D26E          JSR   INCH
1806  DC79 20 F4            BRA   ABDCMD
1807  DC7B 97 69    OPROK   STA A IOPR
1808  DC7D 96 66            LDA A ITYPE
1809  DC7F 81 4E            CMP A #'N
1810  DC81 26 84            BNE   LINEIN
1811  DC83 7F 0066          CLR   ITYPE
1812  DC86 CE A818          LDX   #PGMRAM
1813  DC89 96 67            LDA A ILNUM
1814  DC8B 16               TAB
1815  DC8C BD 01C3          JSR   ADDAX
1816  DC8F 17               TBA
```

```
1817  DC90 BD D1C3              JSR     ADDAX
1818  DC93 96 68                LDA A   ICMD
1819  DC95 A7 00                STA A   0,X
1820  DC97 96 69                LDA A   IOPR
1821  DC99 A7 01                STA A   1,X
1822  DC9B 07                   TPA
1823  DC9C B7 A010              STA A   STALE
1824  DC9F 7E DC07              JMP     LINEIN 1825
1826  DCA2          INVERT      FDB     RDNAMP
1827  DCA4                      FDB     RDLNUM
1828  DCA6                      FDB     RDN2
1829  DCA8                      FDB     RDN2
1830  DCAA                      FDB     RDN2
1831  DCAC                      FDB     RDN2
1832  DCAE                      FDB     RDN3
1833  DCB0                      FDB     RDN2
1834
1835                *
1836                *
1837                *
1838  DCB2 8D 2B    INUM        BSR     SKIPSP
1839  DCB4 20 02                BRA     INUM1+2
1840  DCB6 8D 23    INUM1       BSR     INSKIP
1841  DCB8 81 39                CMP A   #'9
1842  DCBA 23 02                BLS     *+4
1843  DCBC 0D                   SEC
1844  DCBD 39                   RTS
1845  DCBE 81 2F                CMP A   #$2F
1846  DCC0 23 FA                BLS     *-4
1847  DCC2 84 0F                AND A   #$F
1848  DCC4 0C                   CLC
1849  DCC5 39                   RTS
1850                *
1851                *
1852                *
1853  DCC6 8D 0C    ICHAR       BSR     SKIPSP
1854  DCC8 20 02                BRA     ICHAR1+2
1855  DCCA 8D 0F    ICHAR1      BSR     INSKIP
1856  DCCC 81 39                CMP A   #'9
1857  DCCE 23 02                BLS     *+4
1858  DCD0 0C                   CLC
1859  DCD1 39                   RTS
1860  DCD2 0D                   SEC
1861  DCD3 39                   RTS
1862                *
1863                *
1864                *
1865                *
1866  DCD4 8D 05    SKIPSP      BSR     INSKIP
1867  DCD6 81 2A                CMP A   #$2A
1868  DCD8 27 FA                BEQ     SKIPSP
1869  DCDA 39                   RTS
1870  DCDB BD D26E  INSKIP      JSR     INCH
```

```
1871  DCDE 84 7F            AND  A   #$7F
1872  DCE0 CE DCFA          LDX      #OKCHAR
1873  DCE3 A1 00            CMP  A   0,X
1874  DCE5 26 01            BNE      *+3
1875  DCE7 39               RTS
1876  DCE8 08               INX
1877  DCE9 8C DD04          CPX      #OKCHAR+20
1878  DCEC 26 F5            BNE      *-9
1879  DCEE 20 EB            BRA      INSKIP
1880  DCF0         OKCHAR   FCC      /0123456789ACFHLPUY/
1881  DD02                  FCB      $20,$0
1882                  *
1883  DD04 D6 50   MPYTEN   LDA  B   TENS
1884  DD06 D7 4F            STA  B   HUNS
1885  DD08 D6 51            LDA  B   ONES
1886  DD0A D7 50            STA  B   TENS
1887  DD0C 97 51            STA  A   ONES
1888  DD0E 39               RTS
1889
1890  DD0F CE 000A ZEREAD   LDX      #0
1891  DD12 DF 4F            STX      HUNS
1892  DD14 DF 50            STX      TENS
1893  DD16 8D 9A            BSR      INUM
1894  DD18 25 0E            BCS      *+16
1895  DD1A 97 51            STA  A   ONES
1896  DD1C 8D 9A            BSR      INUM1
1897  DD1E 25 08            BCS      *+10
1898  DD20 8D E2            BSR      MPYTEN
1899  DD22 8D 92            BSR      INUM1
1900  DD24 25 F2            BCS      *+4
1901  DD26 8D DC            BSR      MPYTEN
1902  DD28 39               RTS
1903                  *
1904                  *
1905                  *
1906                  *
1907  DD29 8D E4   RDN2     BSR      ZEREAD
1908  DD2B 4F               CLR  A
1909  DD2C D6 4F            LDA  B   HUNS
1910  DD2E 5D               TST  B
1911  DD2F 27 05            BEQ      *+7
1912  DD31 8B 64            ADD  A   #100
1913  DD33 5A               DEC  B
1914  DD34 20 F8            BRA      *-6
1915  DD36 D6 50            LDA  B   TENS
1916  DD38 5D               TST  B
1917  DD39 27 05            BEQ      *+7
1918  DD3B 8B 0A            ADD  A   #10
1919  DD3D 5A               DEC  B
1920  DD3E 20 F8            BRA      *-6
1921  DD40 D6 51            LDA  B   ONES
1922  DD42 5D               TST  B
1923  DD43 27 04            BEQ      *+6
1924  DD45 4C               INC  A
1925  DD46 5A               DEC  B
1926  DD47 20 F9            BRA      *-5
1927  DD49 39               RTS
```

```
1928
1929                       *
1930                       *
1931                       *
1932                       *
1933   DD4A 8D C3    RDN3   BSR   ZEREAD
1934   DD4C 4F              CLR A
1935   DD4D D6 4F            LDA B  HUNS
1936   DD4F 5D              TST B
1937   DD50 27 05            BEQ  *+7
1938   DD52 8B 32            ADD A  #50
1939   DD54 5A              DEC B
1940   DD55 20 F8            BRA  *-6
1941   DD57 D6 50            LDA B  TENS
1942   DD59 5D              TST B
1943   DD5A 27 05            BEQ  *+7
1944   DD5C 8B 05            ADD A  #5
1945   DD5E 5A              DEC B
1946   DD5F 20 F8            BRA  *-6
1947   DD61 D6 51            LDA B  ONES
1948   DD63 54              LSR B
1949   DD64 5D              TST B
1950   DD65 27 04            BEQ  *+6
1951   DD67 4C              INC A
1952   DD68 5A              DEC B
1953   DD69 20 F9            BRA  *-5
1954   DD6B 39              RTS
1955
1956                       *
1957                       *
1958                       *
1959   DD6C D6 68    RDLNUM LDA B  ICMD
1960   DD6E C4 1F            AND B  #$1F
1961   DD70 C1 0F            CMP B  #15
1962   DD72 23 06            BLS  RDN3
1963                       *
1964                       *
1965   DD74 8D 99            BSR  ZEREAD
1966   DD76 96 51            LDA A  ONES
1967   DD78 8B 02            ADD A  #2
1968   DD7A 19              DAA
1969   DD7B 16              TAB
1970   DD7C C4 0F            AND B  #$F
1971   DD7E D7 51            STA B  ONES
1972   DD80 0C              CLC
1973   DD81 84 F0            AND A  #$F0
1974   DD83 27 01            BEQ  *+3
1975   DD85 0D              SEC
1976   DD86 96 50            LDA A  TENS
1977   DD88 89 01            ADC A  #1
1978   DD8A 19              DAA
1979   DD8B 16              TAB
1980   DD8C C4 0F            AND B  #$F
1981   DD8E D7 50            STA B  TENS
1982   DD90 0C              CLC
1983   DD91 84 F0            AND A  #$F0
1984   DD93 27 01            BEQ  *+3
```

```
1985   DD95 0D             SEC
1986   DD96 96 4F           LDA  A   HUNS
1987   DD98 89 05           ADC  A   #5
1988   DD9A 19              DAA
1989   DD9B 84 0F           AND  A   #$F
1990   DD9D 97 4F           STA  A   HUNS
1991   DD9F 20 AB           BRA      RDN3+2
1992                    *
1993                    *
1994                    *
1995                    *
1996   DDA1 96 68   PDNAMP  LDA  A   ICMD
1997   DDA3 84 1F           AND  A   #$1F
1998   DDA5 81 09           CMP  A   #9
1999   DDA7 23 8C           BLS      RDN2
2000   DDA9 81 13           CMP  A   #19
2001   DDAB 23 90           BLS      RDN3
2002
2003                    *
2004                    *
2005                    *
2006                    *
2007   DDAD BD DDBF RDN4    JSR      ZEREAD
2008   DDB0 4F              CLR  A
2009   DDB1 D6 4F           LDA  B   HUNS
2010   DDB3 5D              TST  B
2011   DDB4 27 05           BEQ      *+7
2012   DDB6 8B 19           ADD  A   #25
2013   DDB8 5A              DEC  B
2014   DDB9 20 F8           BRA      *-6
2015   DDBB D6 50           LDA  B   TENS
2016   DDBD 54              LSR  B
2017   DDBE 5D              TST  B
2018   DDBF 27 05           BEQ      *+7
2019   DDC1 8B 05           ADD  A   #5
2020   DDC3 5A              DEC  B
2021   DDC4 20 F8           BRA      *-6
2022   DDC6 D6 50           LDA  B   TENS
2023   DDC8 54              LSR  B
2024   DDC9 24 06           BCC      *+8
2025   DDCA D6 51           LDA  B   ONES
2026   DDCD CB 0A           ADD  B   #10
2027   DDCF 20 02           BRA      *+4
2028   DDD1 D6 51           LDA  B   ONES
2029   DDD3 54              LSR  B
2030   DDD4 54              LSR  B
2031   DDD5 5D              TST  B
2032   DDD6 27 04           BEQ      *+6
2033   DDD8 4C              INC  A
2034   DDD9 5A              DEC  B
2035   DDDA 20 F9           BRA      *-5
2036   DDDC 39              RTS
2037
2038                    *
2039                    *
2040                    *
2041                    *
2042                    *
```

```
2043            *
2044            *
2045            *
2046            *
2047            *
2048            *
2049            *
2050            *
2051            *
2052            *
2053            *
2054            *
2055            *
2056            *
2057            *
2058            *
2059  DDDD CE 63B6  RAMP   LDX    #RAMPM
2060  DDE0 6F 00           CLR    0,X
2061  DDE2 08              INX
2062  DDE3 8C 63C2         CPX    #RAMPM+12
2063  DDE6 26 F8           BNE    *-6
2064  DDE8 CE 63B6         LDX    #RAMPM
2065  DDEB A7 03           STA A  3,X
2066  DDED A6 0D           LDA A  13,X
2067  DDEF 26 03           BNE    *+5
2068  DDF1 4C              INC A
2069  DDF2 6F 0C           CLR    12,X
2070  DDF4 5F              CLR B
2071  DDF5 6D 0C           TST    12,X
2072  DDF7 26 18           BNE    TIM360
2073            *
2074            *
2075            *
2076            *
2077  DDF9 48    TIM36     ASL A
2078  DDFA 59              ROL B
2079  DDFB 48              ASL A
2080  DDFC 59              ROL B
2081  DDFD A7 02           STA A  2,X
2082  DDFF E7 01           STA B  1,X
2083  DE01 48              ASL A
2084  DE02 59              ROL B
2085  DE03 48              ASL A
2086  DE04 59              ROL B
2087  DE05 48              ASL A
2088  DE06 59              ROL B
2089  DE07 AB 02           ADD A  2,X
2090  DE09 A7 02           STA A  2,X
2091  DE0B E9 01           ADC B  1,X
2092  DE0D E7 01           STA B  1,X
2093  DE0F 20 3E           BRA    DIVLP-2
2094            *
2095            *
2096            *
2097            *
2098  DE11 A7 01  TIM360   STA A  1,X
2099  DE13 48              ASL A
```

| | | | | | | |
|---|---|---|---|---|---|---|
|2180|DE14|59| |ROL|B| |
|2181|DE15|48| |ASL|A| |
|2182|DE16|59| |ROL|B| |
|2183|DE17|48| |ASL|A| |
|2184|DE18|59| |ROL|B| |
|2185|DE19|36| |PSH|A| |
|2186|DE1A|37| |PSH|B| |
|2187|DE1B|AB|02| |ADD|A|2,X|
|2188|DE1D|A7|02| |STA|A|2,X|
|2189|DE1F|E9|01| |ADC|B|1,X|
|2110|DE21|E7|01| |STA|B|1,X|
|2111|DE23|24|02| |BCC|*+4|
|2112|DE25|6C|00| |INC|0,X|
|2113|DE27|33| |PUL|B| |
|2114|DE28|32| |PUL|A| |
|2115|DE29|48| |ASL|A| |
|2116|DE2A|59| |ROL|B| |
|2117|DE2B|48| |ASL|A| |
|2118|DE2C|59| |ROL|B| |
|2119|DE2D|36| |PSH|A| |
|2120|DE2E|37| |PSH|B| |
|2121|DE2F|AB|02| |ADD|A|2,X|
|2122|DE31|A7|02| |STA|A|2,X|
|2123|DE33|E9|01| |ADC|B|1,X|
|2124|DE35|E7|01| |STA|B|1,X|
|2125|DE37|24|02| |BCC|*+4|
|2126|DE39|6C|00| |INC|0,X|
|2127|DE3A|33| |PUL|B| |
|2128|DE3C|32| |PUL|A| |
|2129|DE3D|48| |ASL|A| |
|2130|DE3E|59| |ROL|B| |
|2131|DE3F|36| |PSH|A| |
|2132|DE40|37| |PSH|B| |
|2133|DE41|AB|02| |ADD|A|2,X|
|2134|DE43|A7|02| |STA|A|2,X|
|2135|DE45|E9|01| |ADC|B|1,X|
|2136|DE47|E7|01| |STA|B|1,X|
|2137|DE49|24|02| |BCC|*+4|
|2138|DE4B|6C|00| |INC|0,X|
|2139|DE4D|33| |PUL|B| |
|2140|DE4E|32| |PUL|A| |
|2141| | | | | | |
|2142| | | |*| | |
|2143| | | |*| | |
|2144| | | |*| | |
|2145|DE4F|C6|11| |LDA|B|#17|
|2146|DE51|A6|02|DIVLP|LDA|A|2,X|
|2147|DE53|A0|05| |SUB|A|5,X|
|2148|DE55|A7|08| |STA|A|8,X|
|2149|DE57|A6|01| |LDA|A|1,X|
|2150|DE59|A2|04| |SBC|A|4,X|
|2151|DE5B|A7|07| |STA|A|7,X|
|2152|DE5D|A6|00| |LDA|A|0,X|
|2153|DE5F|A2|03| |SBC|A|3,X|
|2154|DE61|A7|06| |STA|A|6,X|
|2155|DE63|25|13| |BCS|NOSET| |
|2156|DE65|A7|00| |STA|A|0,X|

```
2157  0E67 A6 07          LDA A   7,X
2158  0E69 A7 01          STA A   1,X
2159  0E6B A6 08          LDA A   8,X
2160  0E6D A7 02          STA A   2,X
2161  0E6F 0D             SEC
2162  0E70 69 0B          ROL     11,X
2163  0E72 69 0A          ROL     10,X
2164  0E74 69 09          ROL     9,X
2165  0E76 20 07          BRA     NOSET+7
2166  0E78 0C      NOSET  CLC
2167  0E79 69 0B          ROL     11,X
2168  0E7B 69 0A          ROL     10,X
2169  0E7D 69 09          ROL     9,X
2170  0E7F 64 03          LSR     3,X
2171  0E81 66 04          ROR     4,X
2172  0E83 66 05          ROR     5,X
2173  0E85 5A             DEC B
2174  0E86 26 C9          BNE     DIVLP
2175  0E88 E6 0B          LDA B   11,X
2176  0E8A B6 63BF RAMPA  LDA A   RAMPM+9
2177  0F8D B7 63BC        STA A   RAMPM+6
2178  0E90 FE 63C0        LDX     RAMPM+10
2179  0E93 FF 63BD        STX     RAMPM+7
2180  0E96 39             RTS
2181
2182                *
2183                *
2184                *
2185  0E97                 FDB     PGMRAM+6
2186  0E99                 FDB     PGMRAM+2
2187  0E9B         CANPGM  FDB     PGMRAM
2188  0E9D                 FDB     CANEND
2189  0E9F                 FCB     1,1,1,1,1,1
2190        0EA5   CANEND  EQU     *
2191  0EA5 BD 0000         JSR     STARTS
2192  0EA8 BD 073B         JSR     KEYED
2193  0EAB BD 0C07         JSR     LINEIN
2194  0EAE 20 F8           BRA     *-6
2195                       END
0     ERROR(S) DETECTED IN PASS 2
```

LISTING NO. 2

USER CODE

| | | | |
|---|---|---|---|
| 010 | F 1 | 200 | REVERSE TURNTABLE 100% ($ <F 1 200>) |
| 012 | P 2 | 2 | TEST INDEX (LOCAL SWITCH #2) |
| 014 | C 3 | 12 | IF OPEN GO TO LINE 12 |
| 016 | P 2 | 2 | TEST INDEX |
| 018 | C 2 | 16 | IF CLOSED GO TO LINE 16 |
| 020 | L 1 | .2 | DELAY .2 SECONDS |
| 022 | F 1 | 100 | FORWARD TURNTABLE 100% ($ <F 1 100>) |
| 024 | P 2 | 2 | TEST INDEX |
| 026 | C 3 | 24 | IF OPEN GO TO LINE 24 |
| 028 | F 1 | 0 | STOP TURNTABLE ($ <F 1 0>) |
| 030 | Y 2 | 4 | LOWER MIG TORCH (CLOSE RELAY #4) |
| 032 | P 2 | 1 | TEST TORCH IN POSITION (SWITCH #1) |

```
034    C 3  32        IF OPEN GO TO LINE 32
036    Y 2   5        SWITCH MIG GAS ON (CLOSE RELAY #5)
038    L 1  4.0       DELAY 4 SECONDS (PREFLOW TIME)
040    Y 2   6        SWITCH WIRE ON (CLOSE RELAY #6)
042    L 3   .2       DEFINE RAMP TIME .2 SECONDS
044    U 1  5.0       SET 5 VOLTS
046    Y 2   3        SWITCH OSCILATOR ON (CLOSE RELAY #3)
048    C 9  48        TEST ARC IF CURRENT = 0 RETRY START
050    U 3  22        RAMP TO 22.0 VOLTS
052    F 1  26        TURNTABLE FORWARD 26% ($ <F 1  26>)
```

LISTING NO. 3

MIG WELD (START CV CHANGE DURING WELD TO CC)

| LINE NUMBER | COMMAND | OPERAND |
|---|---|---|
| 334 | Y02 | |
| 335 | | 004 |
| 336 | P02 | |
| 337 | | 001 |
| 338 | C03 | |
| 339 | | 336 |
| 340 | Y02 | |
| 341 | | 005 |
| 342 | L01 | |
| 343 | | 02.0 |
| 344 | Y02 | |
| 345 | | 006 |
| 346 | L03 | |
| 347 | | 00.2 |
| 348 | U01 | |
| 349 | | 05.0 |
| 350 | Y02 | |
| 351 | | 003 |
| 352 | C09 | |
| 353 | | 352 |
| 354 | U03 | |
| 355 | | 19.0 |
| 356 | L01 | |
| 357 | | 01.0 |
| 358 | F01 | |
| 359 | | 026 |
| 360 | L11 | |
| 361 | | 060 |
| 362 | A01 | |
| 363 | | 125 |
| 364 | L11 | |
| 365 | | 060 |
| 366 | F01 | |
| 367 | | 000 |
| 368 | L01 | |
| 369 | | 01.5 |
| 370 | Y02 | |
| 371 | | 016 |
| 372 | L03 | |
| 373 | | 00.3 |
| 374 | A02 | |
| 375 | | 000 |

| | | |
|---|---|---|
| 376 | Y02 | |
| 377 | | 013 |
| 378 | L01 | |
| 379 | | 04.0 |
| 380 | Y02 | |
| 381 | | 015 |
| 382 | Y02 | |
| 383 | | 014 |
| 384 | H02 | |
| 385 | | 000 |

LISTING NO. 4

TIG TOUCH START

| LINE NUMBER | COMMAND | OPERAND | |
|---|---|---|---|
| 000 | H08 | | BACKGROUND OFF |
| 001 | | 000 | |
| 002 | U01 | | SET VOLTS 0 |
| 003 | | 00.0 | |
| 004 | Y02 | | SWITCH TIG TORCH DOWN |
| 005 | | 008 | |
| 006 | Y02 | | SWITCH TIG GAS ON |
| 007 | | 002 | |
| 008 | Y02 | | SWITCH TIG-TOUCH ON |
| 009 | | 007 | |
| 010 | U01 | | SET VOLTS 1 |
| 011 | | 01.0 | |
| 012 | C09 | | IF ARC FAIL RE-TRY |
| 013 | | 012 | |
| 014 | H08 | | BACKGROUND ON |
| 015 | | 001 | |
| 016 | A01 | | SET AMPS 1 |
| 017 | | 001 | |
| 018 | L01 | | DELAY .3 SECONDS |
| 019 | | 00.3 | |
| 020 | Y02 | | SWITCH TIG TOUCH OFF |
| 021 | | 017 | |
| 022 | U04 | | COMPARE VOLTS TO 5 |
| 023 | | 05.0 | |
| 024 | C06 | | IF LESS GO TO COMPARE |
| 025 | | 022 | |
| 026 | A01 | | SET AMPS 50 |
| 027 | | 050 | |
| 028 | L01 | | DELAY .6 SECONDS |
| 029 | | 00.6 | |
| 030 | U04 | | COMPARE VOLTS TO 40 |
| 031 | | 40.0 | |
| 032 | C05 | | IF GREATER GO TO START |
| 033 | | 000 | |
| 034 | L03 | | SET RAMP TIME 1 SECOND |
| 035 | | 01.0 | |
| 036 | A03 | | RAMP AMPS & WAIT TO 175 |
| 037 | | 175 | |

What is claimed is:

1. A microprocessor-controlled arc-welding apparatus, comprising:
   a transformer coupled to a source of electrical energy;
   a solid state control device coupled to the transformer for controlling the amount of electrical energy that is permitted to pass through the control device, the solid state control device being coupled to welding leads, the solid state control device being operable to produce a welding signal at the welding leads where the current or voltage of the welding signal is determined by the solid state control device, the solid state control device being responsive to a control signal to determine the current or voltage of the welding signal;
   a control loop including:
   (a) a sensor coupled to a welding lead for sensing the welding signal;
   (b) a memory;
   (c) a microprocessor coupled to the sensor and to the memory, the microprocessor being adapted to read signals representative of the welding signal sensed by the sensor, the microprocessor, in accordance with a program stored in the memory, being operable to compare the signals representative of the welding signal sensed by the sensor with control data in memory, the microprocessor being coupled in the control loop and operable to develop a control signal to signal the solid state control device to control the current or voltage of the welding signal produced by the solid state control device so that the welding signal has a current or voltage which is determined by the microprocessor in cooperation with the program stored in the memory; and,
   whereby said control loop is operable to directly control the welding signal in accordance with the program stored in the memory.

2. The microprocessor-controlled arc-welding apparatus according to claim 1, wherein:
   the microprocessor calculates a correction factor necessary to make the welding signal conform to a desired welding signal represented by control data in memory, the microprocessor being operable to generate a correction signal which is used to signal the solid state control device in order to adjust the welding signal so that the welding signal conforms to the desired welding signal.

3. The microprocessor-controlled arc-welding apparatus according to claim 1, wherein:
   the microprocessor looks up a correction factor in a lookup table necessary to make the welding signal conform to a desired welding signal represented by control data in memory, the microprocessor being operable to generate a correction signal which is used to signal the solid state control device in order to adjust the welding signal so that the welding signal conforms to the desired welding signal.

4. The microprocessor-controlled arc-welding apparatus according to claim 1, further comprising:
   bio-feedback means for interpreting a dip or pulse in the welding signal sensed by the sensor as a command to the microprocessor to signal the solid state control device to increase or decrease the current or voltage a predetermined step value.

5. The microprocessor-controlled arc-welding apparatus according to claim 1, further comprising:
   bio-feedback means for interpreting a dip in the welding signal sensed by the sensor as a command to the microprocessor to signal the solid state control device to increase the current or voltage a predetermined step value and for interpreting a pulse in the welding signal sensed by the sensor as a command to the microprocessor to signal the solid state control device to decrease the current or voltage a predetermined step value.

6. The microprocessor-controlled arc-welding apparatus according to claim 5, further comprising:
   bio-feedback limit means for setting upper limits on the amount by which the voltage or current may be stepped up or down by the bio-feedback means.

7. The microprocessor-controlled arc-welding apparatus according to claim 6, further comprising:
   second bio-feedback limit means for setting lower limits on the amount by which the voltage or current may be stepped up or down by the bio-feedback means.

8. The microprocessor-controlled arc-welding apparatus according to claim 1, further comprising:
   a welding electrode connected to the welding lead; and,
   seam tracking means for maintaining the welding electrode generally over a seam in a part being welding, the seam tracking means including robot means for positioning the welding electrode in response to a command signal, the microprocessor being operative to monitor the arc length by reading signals representative of the welding signal sensed by the sensor, the microprocessor, in accordance with a program stored in memory, being operative to generate command signals to the robot means to maintain the position of the welding electrode so that the welding electrode generally tracks the seam in the part being welded.

9. The microprocessor-controlled arc-welding apparatus according to claim 1, further comprising:
   program means wherein the microprocessor is operative to read a first signal representative of a first welding signal sensed by the sensor and to record a first welding data parameter in memory based upon said first signal, the microprocessor being operative to read a second signal representative of a second welding signal sensed by the sensor at a later point in time and to record a second welding data parameter in memory based upon said second signal, the microprocessor being operative to compute a first derivative parameter indicating the rate of change of the welding signal by subtracting the first welding data parameter form the second welding data parameter, the microprocessor being operative to develop a control signal to signal the solid state control device to control the current or voltage of the welding signal produced by the solid state control device, the control signal being determined by considering both the first derivative parameter and control data in memory so that the control signal is based in part upon the rate of change of the welding signal.

10. The microprocessor-controlled arc-welding apparatus according to claim 1, further comprising:
    user program means for instructing the microprocessor to perform a desired welding operation by user supplied software instructions;
    an executive program in memory responsive to the user supplied software instructions for controlling the microprocessor, the microprocessor being operative to signal the solid state control device to develop a welding signal determined by said user supplied software instructions.

11. The microprocessor-controlled arc-welding apparatus according to claim 1, wherein the microprocessor is operative to signal the solid state control device to control the current of the welding signal produced by the solid state control device so that the welding signal has a current which is controlled by the microprocessor in cooperation with the program stored in the memory, the voltage of the welding signal being variable, further comprising:

bio-feedback means for monitoring the voltage of the welding signal, the voltage of the welding signal being variable by an operator by movement of a welding electrode or torch connected to a welding lead, the bio-feedback means being operable to interpret certain changes in the voltage as a signal by an operator to increase or decrease the current of the welding signal.

12. The microprocessor-controlled arc-welding apparatus according to claim 11, wherein:

the bio-feedback means is operative to increase or decrease the current by a predetermined step value in response to changes in the voltage which are interpreted by the bio-feedback means as a signal by the operator to increase or decrease the current.

13. The microprocessor-controlled arc-welding apparatus according to claim 12, wherein:

a dip in the voltage is interpreted as a signal by the operator to increase the current, and a momentary increase in the voltage is interpreted as a signal by the operator to decrease the current.

14. The microprocessor-controlled arc-welding apparatus according to claim 12, wherein:

a dip in the voltage is interpreted as a signal by the operator to decrease the current, and a momentary increase in the voltage is interpreted as a signal by the operator to increase the current.

15. The microprocessor-controlled arc-welding apparatus according to claim 1, wherein the microprocessor is operative to signal the solid state control device to control the voltage of the welding signal produced by the solid state control device so that the welding signal has a voltage which is controlled by the microprocessor in cooperation with the program stored in the memory, the current of the welding signal being variable, further comprising:

bio-feedback means for monitoring the current of the welding signal, the current of the welding signal being variable by an operator by movement of a welding electrode or torch connected to a welding lead, the bio-feedback means being operable to interpret certain changes in the current as a signal by an operator to increase or decrease the voltage of the welding signal.

16. The microprocessor-controlled arc-welding apparatus according to claim 15, wherein:

the bio-feedback means is operative to increase or decrease the voltage by a predetermined step value in response to changes in the current which are interpreted by the bio-feedback means as a signal by the operator to increase or decrease the voltage.

17. The microprocessor-controlled arc-welding apparatus according to claim 16, wherein:

a dip in the current is interpreted as a signal by the operator to increase the voltage, and a momentary increase in the current is interpreted as a signal by the operator to decrease the voltage.

18. The microprocessor-controlled arc-welding apparatus according to claim 16, wherein:

a dip in the current is interpreted as a signal by the operator to decrease the voltage, and a momentary increase in the current is interpreted as a signal by the operator to increase the voltage.

19. The microprocessor-controlled arc-welding apparatus according to claim 1, wherein:

the microprocessor is operative to calculate a power parameter by multiplying a signal representative of the current of the welding signal sensed by the sensor with a signal representative of the voltage of the welding signal sensed by the sensor, the microprocessor being operative to determine a control signal necessary to maintain the power parameter constant, the microprocessor being operative to signal the solid state control device to control the current and voltage of the welding signal to thereby operate the microprocessor-controlled arc-welding apparatus in a constant power welding mode.

20. The microprocessor-controlled arc-welding apparatus according to claim 1, further comprising:

DIG/RASP means for superimposing a sawtooth-like wave form upon the welding signal, the microprocessor being operative to signal the solid state control device to superimpose rapid periodic variations upon the welding signal so that the welding signal rapidly and periodically deviates above and below an average value under microprocessor control.

21. A microprocessor-controlled arc-welding apparatus, comprising:

a transformer coupled to a source of electrical energy; a solid state switching device coupled to the transformer for controlling the amount of electrical energy that is permitted to pass through the control device, the solid state switching device being coupled to welding leads, the solid state switching device being operable to produce a welding signal at the welding leads where the current or voltage of the welding signal is determined by the solid state switching device;

a control loop including:

(a) a sensor coupled to a welding lead for sensing the welding signal;

(b) a memory;

(c) a microprocessor coupled to the sensor and to the memory, the microprocessor being adapted to read signals representative of the welding signal sensed by the sensor, the microprocessor, in accordance with a program stored in the memory, being operable to compare the signals representative of the welding signal sensed by the sensor with control data in memory, the microprocessor being operable to signal the solid state switching device to control the current or voltage of the welding signal produced by the solid state switching device so that the welding signal has a current or voltage which is determined by the microprocessor in cooperation with the program stored in the memory; and, a synchronization circuit coupled to the transformer, the synchronization circuit including a phase locked loop and a polarity detector adapted to detect the polarity of an alternating current signal applied to the transformer, the phase locked loop being locked to said alternating current signal, the phase locked loop being operable to determine the frequency of said alternating current signal, the polarity detector being operable to determine the phase error of the phase locked loop, the synchronization circuit being operable to permit the microprocessor to signal the solid state switching device to change states at a point in time which is synchronized with the alternating current signal.

22. The microprocessor-controlled arc-welding apparatus according to claim 21, further comprising:

bio-feedback means for interpreting a dip or momentary increase in the welding signal sensed by the sensor as a command to the microprocessor to signal the solid state switching device to increase or decrease the current or voltage a predetermined step value.

23. The microprocessor-controlled arc-welding apparatus according to claim 21, further comprising:

a welding electrode connected to the welding lead; and, seam tracking means for maintaining the welding electrode generally over a seam in a part being welded, the seam tracking means including robot means for positioning the welding electrode in response to a command signal, the microprocessor being operative to monitor the arc length by reading signals representative of the welding signal sensed by the sensor, the microprocessor, in accordance with a program stored in memory, being operative to generate command signals to the robot means to maintain the position of the welding electrode so that the welding electrode generally tracks the seam in the part being welded.

24. A microprocessor-controlled welding apparatus, comprising:

a transformer, the transformer having a primary winding and a secondary winding, the primary winding being adapted for coupling to a source of alternating current ("AC") electrical energy;

a solid state switching device, the solid state switching device being connected between the secondary winding of the transformer and a first common welding lead, the switching device being responsive to a gating signal to conduct current during a portion of an AC phase after the gating signal fires the switching device, the switching device being operable to generate a welding signal between the first common welding lead and a second welding lead coupled to the secondary winding of the transformer, the welding signal having a direct current voltage with an average magnitude which is determined by the switching device;

a sensor coupled to the first common welding lead for directly sensing the welding signal;

an input/output controller, the input/output controller being coupled to the sensor, the input/output controller being coupled to the switching device;

a memory;

a microprocessor, the microprocessor being coupled to the input/output controller and to the memory, the microprocessor being adapted to receive welding data signals from the sensor through the input/output controller, the microprocessor, in accordance with a program stored in memory, being operable to compare the welding data signals from the sensor with control data in memory, the microprocessor being operable to signal the switching device and to provide gating signals in accordance with a program stored in memory which fires the switching device at a time determined by the microprocessor so that the welding signal has a magnitude which is determined by the microprocessor;

the microprocessor being operable to read a welding data signal and to record a welding data parameter in memory based upon the welding data signal;

the microprocessor being operable to compute an error parameter indicating the extent to which the sensed welding signal fails to conform with program control by subtracting the welding data parameter from a control parameter selected by the microprocessor from control data in memory;

the microprocessor being operative to look up a memory location in a table stored in memory containing a plurality of predetermined gating parameters stored in memory locations, the table being adapted to quickly permit the microprocessor to determine a proper gating signal for the switching device, the memory location in the table being determined by the error parameter, the memory location containing a predetermined gating parameter representative of gating control to be applied to the switching device based upon the extent to which the sensed welding signal fails to conform with program control; and the microprocessor being operative to signal the switching device and to provide firing signals determined from the predetermined gating parameter obtained from the table.

25. The microprocessor-controlled welding apparatus according to claim 24, further comprising:

a synchronization circuit coupled to a winding of the transformer, the synchronization circuit including a phase locked loop and a zero crossing detector, the phase locked loop being operative to prove an indication of the frequency of the source of AC electrical energy, the zero crossing detector being operative to detect the phase error of the phase locked loop compared with the source of AC electrical energy, the synchronization circuit being operative to generate signals which may be used for firing the switching device in synchronization with the source of AC electrical energy.

26. A microprocessor-controlled welding apparatus, comprising:

a transformer, the transformer having a primary winding and a secondary winding, the primary winding being adapted for coupling to a source of alternating current ("AC") electrical energy;

a solid state switching device, the solid state switching device being connected between the secondary winding of the transformer and a first common welding lead, the switching device being responsive to a gating signal to conduct current during a portion of an AC phase after the gating signal fires the switching device, the switching device being operable to generate a welding signal between the first common welding lead and a second welding lead coupled to the secondary winding of the transformer, the welding signal having a direct current voltage with an average magnitude which is determined by the switching device;

a sensor coupled to the first common welding lead for directly sensing the welding signal;

an input/output controller, the input/output controller being coupled to the sensor, the input/output controller being coupled to the switching device;

a memory;

a microprocessor, the microprocessor being coupled to the input/output controller and to the memory, the microprocessor being adapted to receive welding data signals from the sensor through the input/output controller, the microprocessor, in accordance with a program stored in memory, being operable to compare the welding data signals from the sensor with control data in memory, the microprocessor being operable to signal the switching device and to provide gating signals in accordance with a program stored in memory which fires the switching device at a time determined by the microprocessor so that the welding signal has a magnitude which is determined by the microprocessor;

the microprocessor being operable to read a welding data signal and to record a welding data parameter in memory based upon the welding data signal;

the microprocessor being operable to compute an error parameter indicating the extent to which the sensed welding signal fails to conform with program control by subtracting the welding data parameter from a control parameter selected by the microprocessor from control data in memory;

the microprocessor being operative to calculate a gating parameter representative of gating control to be applied to the switching device based upon the extent to which the sensed welding signals fails to conform with program control, the microprocessor being operative to determine a proper gating signal for the switching device; and, the microprocessor being operative to signal the switching device and to provide firing signals determined from the predetermined gating parameter obtained from the calculation.

27. The microprocessor-controlled welding apparatus according to claim 26, further comprising:

a synchronization circuit coupled to a winding of the transformer, the synchronization circuit including a phase locked loop and a zero crossing detector, the phase locked loop being operative to provide an indication of the frequency of the source of AC electrical energy, the zero crossing detector being operative to detect the phase error of the phase locked loop compared with the source of AC electrical energy, the synchronization circuit being operative to generate signals which may be used for firing the switching device in synchronization with the source of AC electrical energy.

28. A microprocessor-controlled arc-welding apparatus, comprising:

a transformer coupled to a source of electrical energy;

a solid state control device coupled to the transformer for controlling the amount of electrical energy that is permitted to pass through the control device, the solid state control device being coupled to welding leads, the solid state control device being operable to produce a welding signal at the welding leads where the current or voltage of the welding signal is determined by the solid state control device, the solid state control device being responsive to a control signal to determine the current or voltage of the welding signal;

a control loop including:
  (a) a sensor coupled to a welding lead for sensing the welding signal;
  (b) a memory;
  (c) a microprocessor coupled to the sensor and to the memory, the microprocessor being adapted to read signals representative of the welding signal sensed by the sensor, the microprocessor, in accordance with a program stored in the memory, being operable to compare the signals representative of the welding signal sensed by the sensor with control data in memory, the microprocessor being coupled in the control loop and operable to develop a control signal to signal the solid state control device to control the current or voltage of the welding signal produced by the solid state control device so that the welding signal has a current or voltage which is determined by the microprocessor in cooperation with the program stored in the memory;

whereby said control loop is operable to directly control the welding signal in accordance with the program stored in the memory;

part movement means for controlling movement of a part being welded, the part movement means being responsive to a part movement signal from the microprocessor;

wire feed means for controlling the rate of feeding wire fore welding, the wire feed means being responsive to a wire feed signal from the microprocessor; and, program means for smoothly starting a welding operation, the microprocessor being operative to read signals representative of the welding signal sensed by the sensor and to determine when the welding signal should be increased, the microprocessor being operative to simultaneously signal the solid state control device to increase the voltage or current of the welding signal, to signal the part movement means to increase the rate of movement of the part being welded, and to signal the wire feed means to increase the rate of feeding wire for welding, the microprocessor being operative to generate synchronized control signals, part movement signals, and wire feed signals for smooth acceleration of welding.

29. The microprocessor-controlled arc-welding apparatus according to claim 28, further comprising:

DIG/RASP means for superimposing a sawtooth-like wave form upon the welding signal, the microprocessor being operative to signal the solid state control device to rapidly switch back and forth between a predetermined high welding signal and a predetermined low welding signal, the DIG/RASP means being operative to synchronize with an increasing welding signal for smooth acceleration of welding.

* * * * *

UNITED STATES PATENT AND TRADEMARK OFFICE
CERTIFICATE OF CORRECTION

PATENT NO. : 4,821,202

DATED : April 11, 1989

INVENTOR(S) : Clint A. Davis and Melvin P. Trail

It is certified that error appears in the above—identified patent and that said Letters Patent is hereby corrected as shown below:

The title should be "MICROPROCESSOR CONTROLLED WELDING APPARATUS".

Column 1, lines 48-49, delete "compute statistical information concerning the weld," (second occurrence).

Column 13, line 61, "1j10" should be -- 110 --.

Column 15, line 53, "1332" should be -- 132 --.

Column 19, line 66, "$v_t$" should be -- $V_t$ --.

Column 20, line 57, "$V_{ref}$to" should be -- $V_{ref}$ to --.

Column 21, line 51, "$v_{avg}$ is less than $v_{ref}$," should be -- $V_{avg}$ is less than $V_{ref}$, --.

Column 21, line 54, "$V_{ref}$is" should be -- $V_{ref}$ is --.

UNITED STATES PATENT AND TRADEMARK OFFICE
CERTIFICATE OF CORRECTION

PATENT NO. : 4,821,202
DATED : April 11, 1989
INVENTOR(S) : Clint A. Davis and Melvin P. Trail It is certified that error appears in the above—identified patent and that said Letters Patent is hereby corrected as shown below:

Column 23, lines 35-43, shouild read as follows:

-- "A" commands are commands to set amps in the welding apparatus. "A" commands take the form:

Ann XXX where the letter "A" identifies the command as an "A" command, "nn" is a two digit suffix which identifies the particular "A" command that is used, and "XXX" is a three digit operand field. For example, "A00 XXX" sets the amps to zero (the operand is not used in this command). --

Column 24, line 28, "XX" should be -- XXX --.

Column 24, line 32, ""C06" should be -- "C06" --.

Column 25, line 15, "O01" should be -- L01 --.

Column 34, line 6, after "programmability" insert --offered --.

UNITED STATES PATENT AND TRADEMARK OFFICE
CERTIFICATE OF CORRECTION

PATENT NO. : 4,821,202

DATED : April 11, 1989

INVENTOR(S) : Clint A. Davis and Melvin P. Trail

It is certified that error appears in the above-identified patent and that said Letters Patent is hereby corrected as shown below:

Column 152, line 36, "wire fore" should be -- wire for --.

Signed and Sealed this

Twentieth Day of March, 1990

Attest:

JEFFREY M. SAMUELS

Attesting Officer

Acting Commissioner of Patents and Trademarks